US012735188B2

(12) United States Patent
Carle et al.

(10) Patent No.: US 12,735,188 B2
(45) Date of Patent: Sep. 15, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US); Randy M. Vondrell, Newport, KY (US); Keith A. Miedema, Fairfield, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/330,645

(22) Filed: Sep. 16, 2025

(65) Prior Publication Data

US 2026/0015090 A1 Jan. 15, 2026

Related U.S. Application Data

(63) Continuation-in-part of application No. PCT/US2024/040754, filed on Aug. 2, 2024, which is (Continued)

(51) Int. Cl.
*B64D 27/12* (2006.01)

(52) U.S. Cl.
CPC .................................... *B64D 27/12* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS 3,335,960 A 8/1967 Alderson
3,637,323 A 1/1972 Chilman (Continued)

FOREIGN PATENT DOCUMENTS

CN 104992023 10/2015
CN 106446466 2/2017

(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

(Continued)

*Primary Examiner* — Ashesh Dangol
*Assistant Examiner* — Cindi M Curry
(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

20 Claims, 28 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 3,844,680 | A | 10/1974 | Saterdal | |
| 3,922,852 | A | 12/1975 | Drabek | |
| 5,079,916 | A | 1/1992 | Johnson | |
| 5,135,185 | A * | 8/1992 | Adamson | B64D 27/12 244/65 |
| 5,136,185 | A | 8/1992 | Fleming | |
| 5,282,719 | A | 2/1994 | Mccarty | |
| 5,836,743 | A | 11/1998 | Carvalho | |
| 8,371,105 | B2 | 2/2013 | Glynn | |
| 8,714,475 | B2 | 5/2014 | Gall | |
| 8,831,913 | B2 | 9/2014 | Holden | |
| 9,242,721 | B2 | 1/2016 | Neuteboom | |
| 9,567,090 | B2 | 2/2017 | Gallet | |
| 9,759,160 | B2 | 9/2017 | Sankrithi | |
| 10,040,559 | B2 | 8/2018 | Hoisington | |
| 10,100,653 | B2 | 10/2018 | Niergarth | |
| 10,442,541 | B2 | 10/2019 | Miller | |
| 10,669,881 | B2 | 6/2020 | Breeze-Stringfellow | |
| 10,907,495 | B2 | 2/2021 | Breeze-Stringfellow | |
| 11,136,109 | B2 | 10/2021 | Wood | |
| 11,236,680 | B2 | 2/2022 | Dennison | |
| 11,507,052 | B2 | 11/2022 | Sykes | |
| 11,572,827 | B1 * | 2/2023 | Khalid | B64C 7/02 |
| 12,000,344 | B2 | 6/2024 | Levisse | |
| 12,060,812 | B1 | 8/2024 | Grooms | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,345,178 | B1 | 7/2025 | Vondrell | |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2012/0119023 | A1 | 5/2012 | Moore | |
| 2018/0362170 | A1 * | 12/2018 | Stuart | B64D 27/404 |
| 2019/0185170 | A1 * | 6/2019 | Schelfaut | B64D 27/406 |
| 2020/0200125 | A1 | 6/2020 | Moore | |
| 2022/0027577 | A1 | 1/2022 | Duan | |
| 2022/0275774 | A1 | 9/2022 | Niergarth | |
| 2023/0021836 | A1 | 1/2023 | Riddle | |
| 2023/0126551 | A1 | 4/2023 | Niergarth | |
| 2024/0401546 | A1 | 12/2024 | Hunter | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |

FOREIGN PATENT DOCUMENTS

| | | | |
|---|---|---|---|
| CN | 108595755 | | 9/2018 |
| CN | 109815528 | | 5/2019 |
| EP | 3671391 | | 6/2020 |
| FR | 3127269 | A1 | 3/2023 |
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130896 | A1 | 6/2023 |
| FR | 3130897 | A1 | 6/2023 |
| FR | 3132729 | A1 | 8/2023 |
| FR | 3133367 | A1 | 9/2023 |
| FR | 3133368 | A1 | 9/2023 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

GROOMS etal., U.S. Appl. No. 18/184,785, filed Mar. 16, 2023.

Hunter, U.S. Appl. No. 18/327,629, filed Jun. 1, 2023.

Ryan et al., Variable Pitch Fan System for NASA/NAVY Research and Technology Aircraft, Apr. 1977, NASA, p. 11 (Year: 1977).

Schwartz et al., "Large-Scale Advanced Prop-Fan (LAP) Pitch Change Actuator and Control Design Report," Hamilton Standard Division United Technologies Corporation, Prepared for National Aeronautics and Space Administration NASA-Lewis Research Center, NASA CR 174788 (1986).

* cited by examiner

AIRCRAFT WITH AN UNDUCTED FAN PROPULSOR

CROSS-REFERENCE TO RELATED APPLICATIONS

This application claims priority to PCT Application No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the disclosures of which are hereby incorporated by reference in their entireties.

TECHNICAL FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like, refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
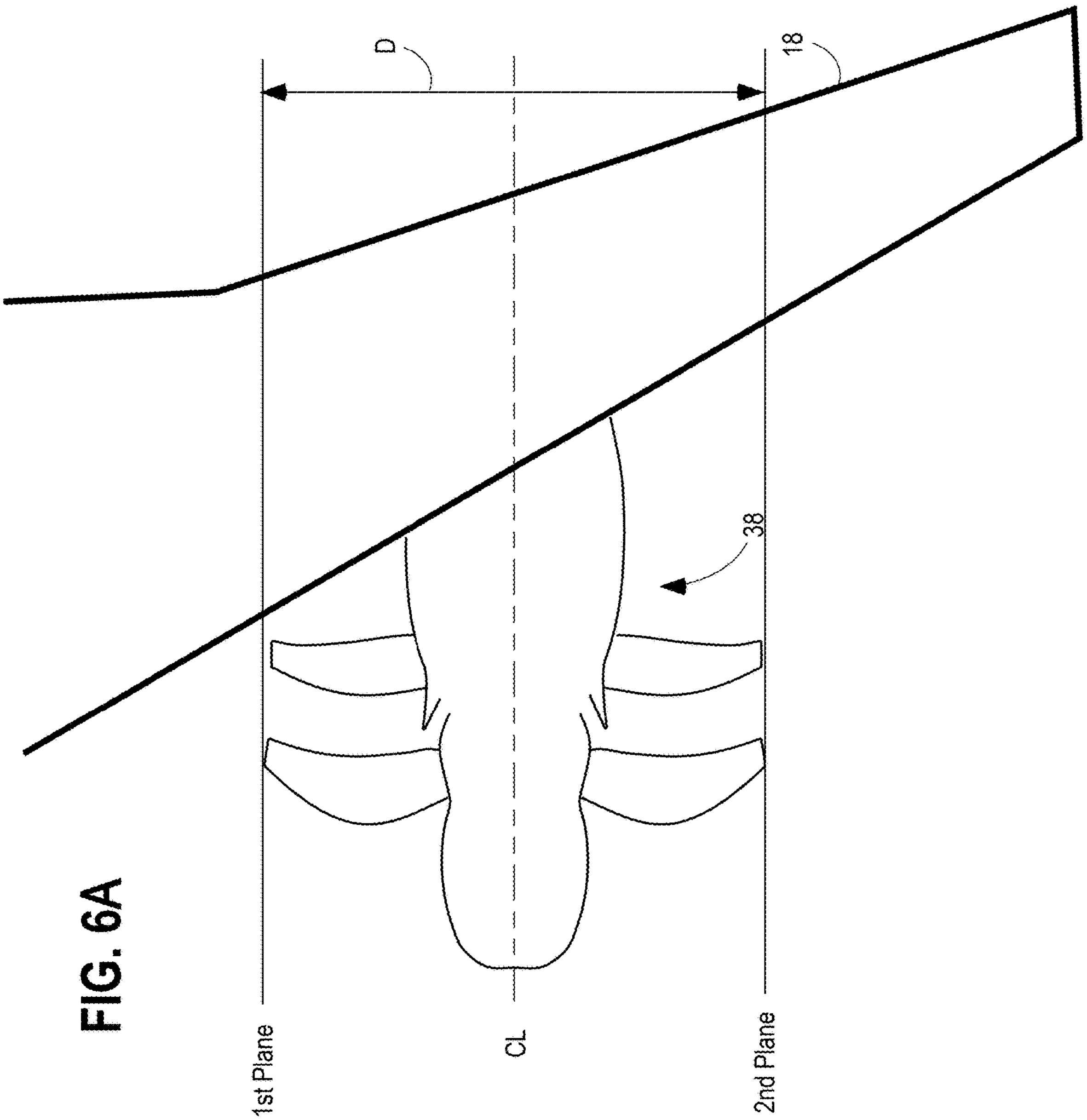
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
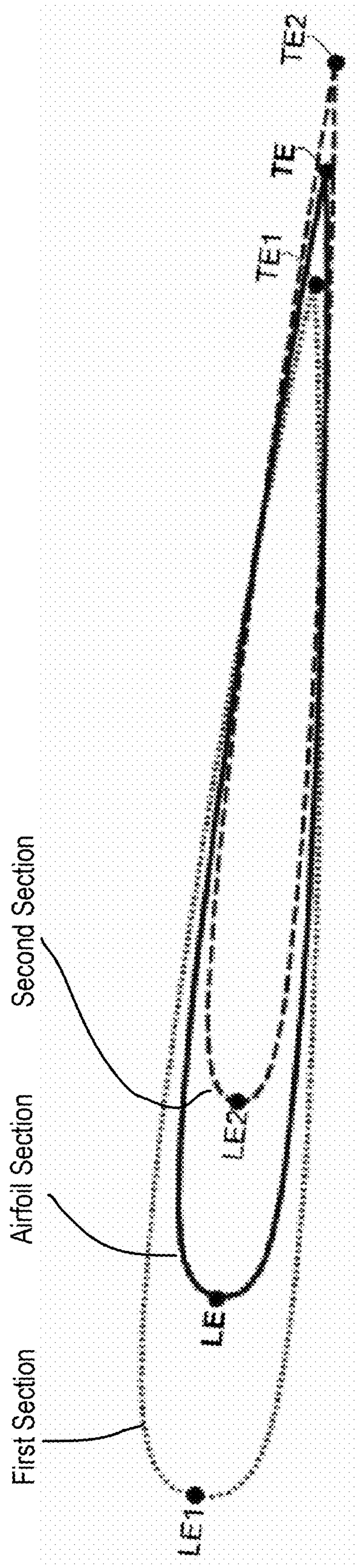
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TEL at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

The plurality of blades, whether forward or rearward, may have a variation of root forward-most points and root rearward-most points. This can be due to both installed position as well as orientation in the case of variable pitch blades. For purposes of defining the distances TRL, RTL, and VTL a rotating blade or a rotating array of blades is orientated such that the respective leading edges of the blades are in their most forward position, e.g., a feathered position. The respective trailing edge position is also obtained when the leading edge is in the most forward position. For purposes of defining the distances TRL, RTL, and VTL, the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

As used herein, a "turbofan engine" includes a core flowpath defined by a compressor section, a combustion section, and a turbine section, and a fan that directs air into the core flowpath, and rated for use in a regional aircraft, a narrow body aircraft, or a wide body aircraft. A turbofan engine rated for use on a regional aircraft will have a maximum takeoff thrust in a range of ten thousand pound-force to twenty thousand pound-force (10,000 lbf to 20,000 lbf). A turbofan engine rated for use on a narrow body aircraft will have a maximum takeoff thrust in a range of fifteen thousand pound-force to thirty thousand pound-force (15,000 lbf to 30,000 lbf). A turbofan engine rated for use on a wide body aircraft will have a maximum takeoff thrust in a range of forty thousand pound-force to one hundred ten thousand pound-force (40,000 lbf to 110,000 lbf).

As used herein, the term "cruise" or "cruising speed" refers to operation of a turbine engine utilized to power an aircraft that may operate at a cruising speed when the aircraft levels after climbing to a specified altitude. A turbine engine may operate at a cruising speed that is from 50% to 90% of a rated speed, such as from 70% to 80% of the rated speed. In some embodiments, a cruising speed may be achieved at about 80% of full throttle, such as from about 50% to about 90% of full throttle, such as from about 70% to about 80% full throttle. As used herein, the term "cruise flight" refers to a phase of flight in which an aircraft levels in altitude after a climb phase and prior to descending to an approach phase. In various examples, cruise flight may take place at a cruise altitude up to approximately 65,000 ft. In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. In certain examples, the ranges of cruise altitude defined by pressure may be adjusted based on a different reference sea-level pressure and/or sea-level temperature.

Figure 3:
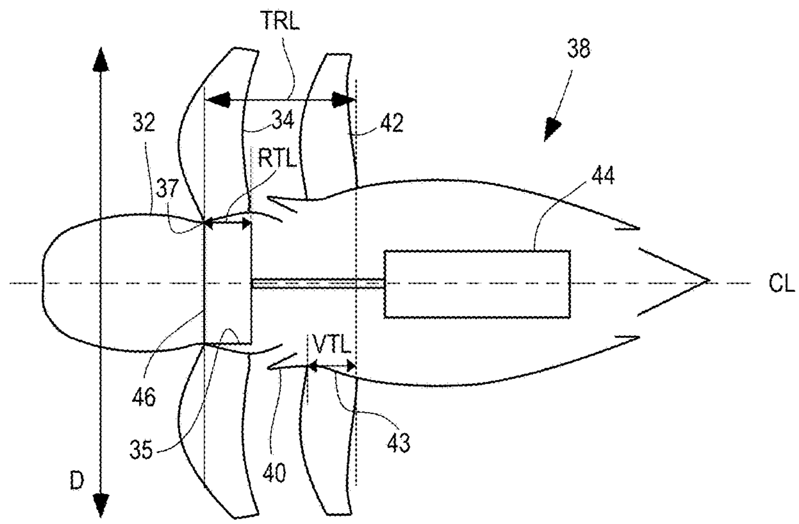
FIG. 3 comprises an elevational cross-sectional view of an exemplary unducted fan propulsor having a plurality of blades arranged in a forward array and a rearward array.
Figure 12:
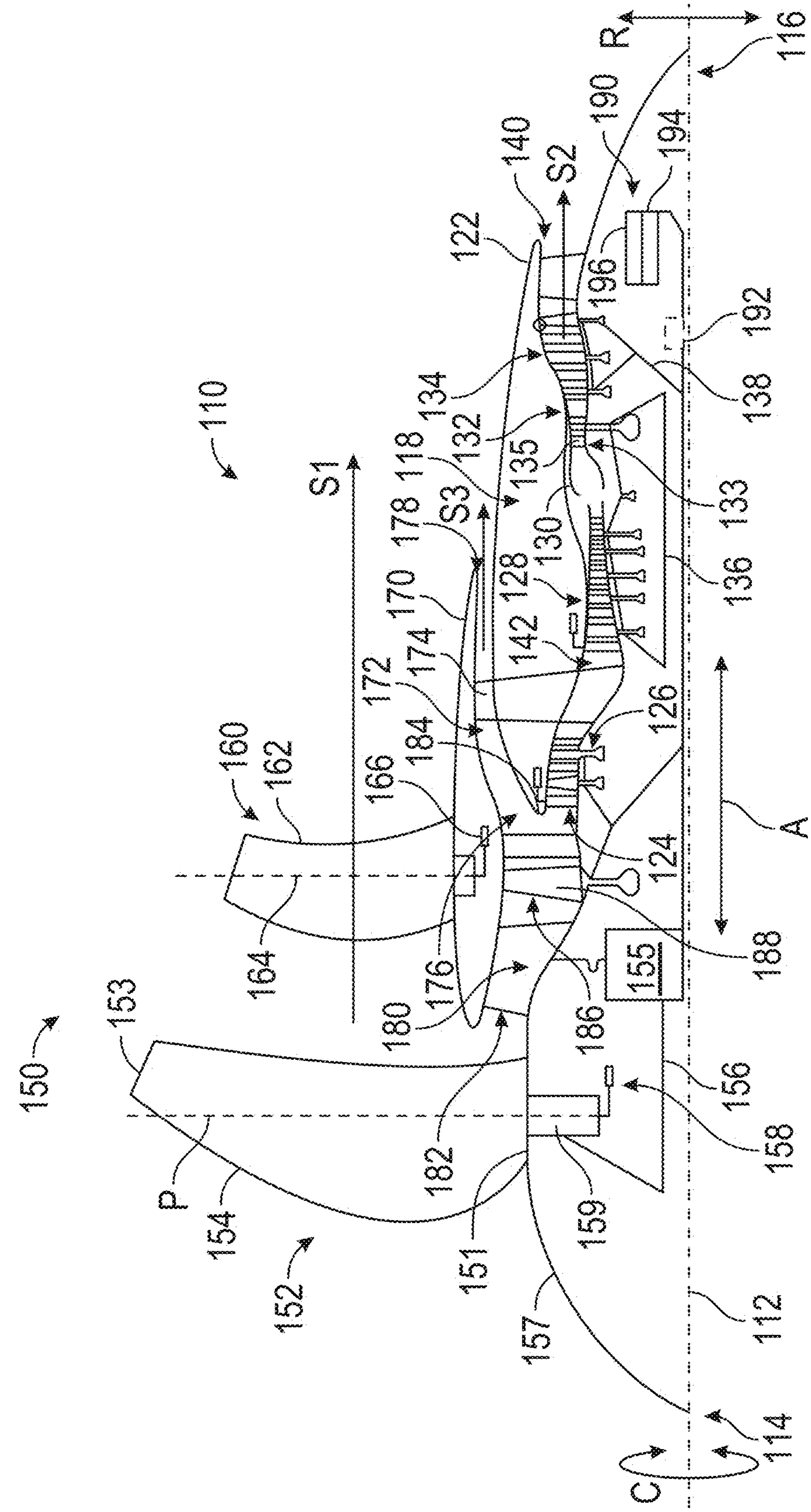
FIG. 12 shows a schematic view of an unducted fan propulsor.

As used herein, an "unducted fan propulsor," an "unducted fan engine" or an "open fan engine" means a turbofan engine without a fan casing or a nacelle surrounding the fan. An unducted fan engine can characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or a fan nacelle. FIGS. 3 and 12 depict an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

As used herein, a "fan tip diameter" is defined as a diameter of a fan blade and is measured from the longitudinal centerline axis of the unducted fan propulsor to a fan tip of the fan blade at an axial location of the blade where the diameter is a maximum.

As used herein, a Mach number is a ratio of the speed of the aircraft to the speed of sound in the surrounding airflow. The Mach number at cruise as defined herein is a maximum operating Mach number as provided by a Type Certificate Data Sheet (TCDS) for the turbine engine.

An aircraft's quoted cruise Mach number is generally known in the industry to be applied during a "standard day" temperature day. Therefore, the temperature is a fixed value based on altitude according to the established International Standard Atmosphere (ISA) tables. High speed civil gas turbine powered transport aircraft quote their speed by Mach number and have set cruising altitudes based on their size and mission profile (e.g., smaller aircraft fly at lower altitudes). Turboprops and smaller aircraft may have their cruising speed quoted in knots such as VTAS (velocity true airspeed) or KCAS (knots calibrated air speed), where ambient temperature is considered. Engine performance can be modeled for "hot days" or "cold days" where the ambient temperature is hotter or cooler than standard day by a prescribed amount, but this is part of off-design performance. Further, between 36,000 and 80,000 feet, where most commercial aircraft cruise, the ambient temperature is actually constant.

As used herein, a "thrust bearing radius" of a radial thrust bearing is defined in the radial direction from the longitudinal centerline axis to a radial center of the radial thrust bearing. Particularly, the radial center of the radial thrust bearing is a radial center of the rolling elements of the radial thrust bearing.

As used herein, a "fan hub axial length" is an axial length, in the axial direction (e.g., parallel with the longitudinal centerline axis) from a fan hub tip of the fan hub to a pitch axis P of the fan blades of the fan.

As used herein, a "fan actuation system axial length" is an axial length, in the axial direction (e.g., parallel with the longitudinal centerline axis), from an axially forward-most surface of the fan actuation system to the pitch axis P of the fan blades of the fan.

As used herein, a "fan bearing axial length" is an axial length, in the axial direction (e.g., parallel with the longitudinal centerline axis) from the pitch axis P of the fan blades of the fan to an axial center of one or more fan bearings that support rotation of the fan shaft.

Approximating language, as used herein throughout the specification and claims, is applied to modify any quantitative representation that could permissibly vary without resulting in a change in the basic function to which the approximating language is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

The inventors found, unexpectedly, that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor the inventors surprisingly found by placing the engine so that the engine can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

The inventors surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

The inventors also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
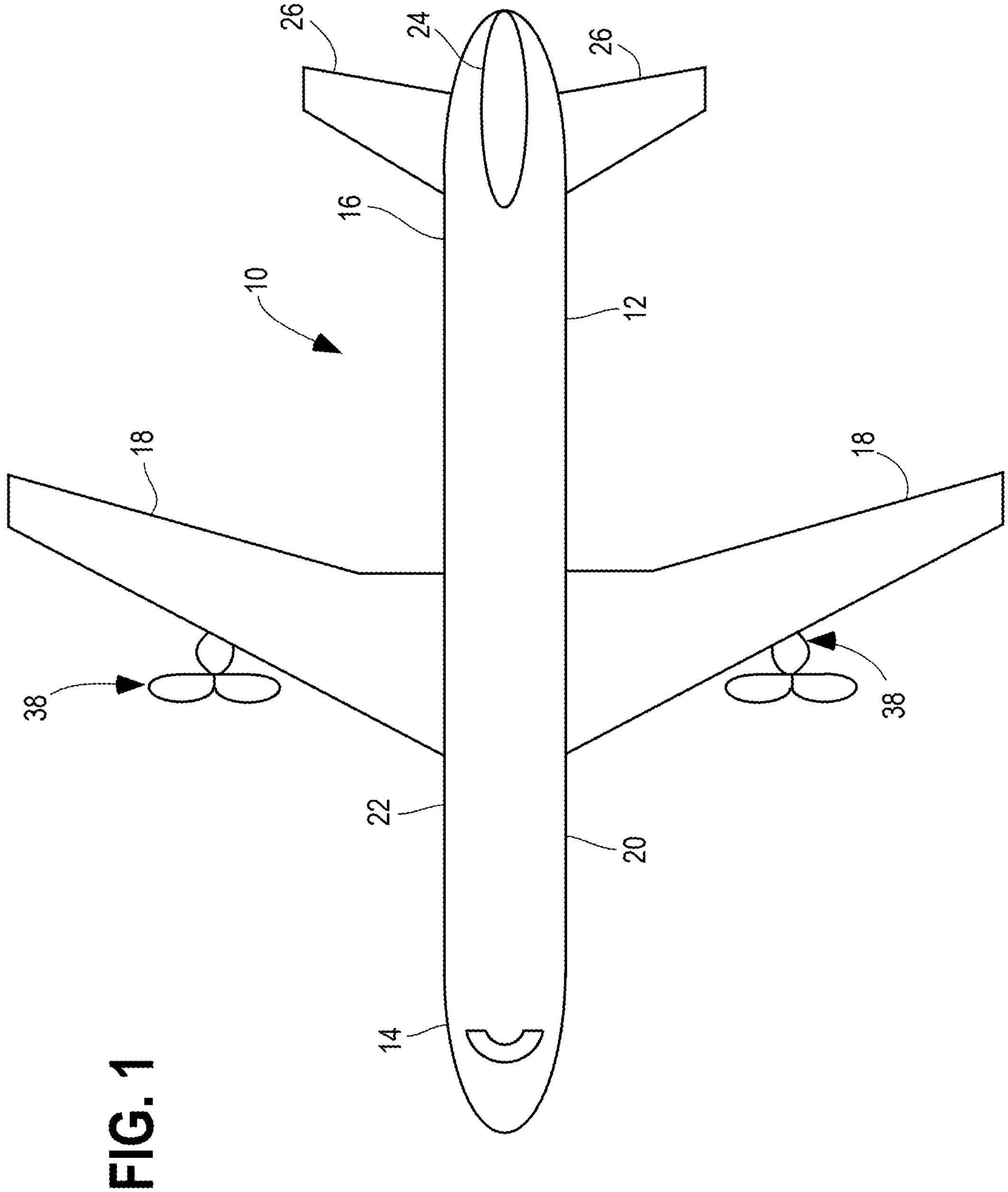
FIG. 1 comprises a top plan view of an aircraft as configured in accordance with various embodiments of these teachings, with undermounted, unducted fan propulsors mounted on forward wings of the aircraft.
Figure 2:
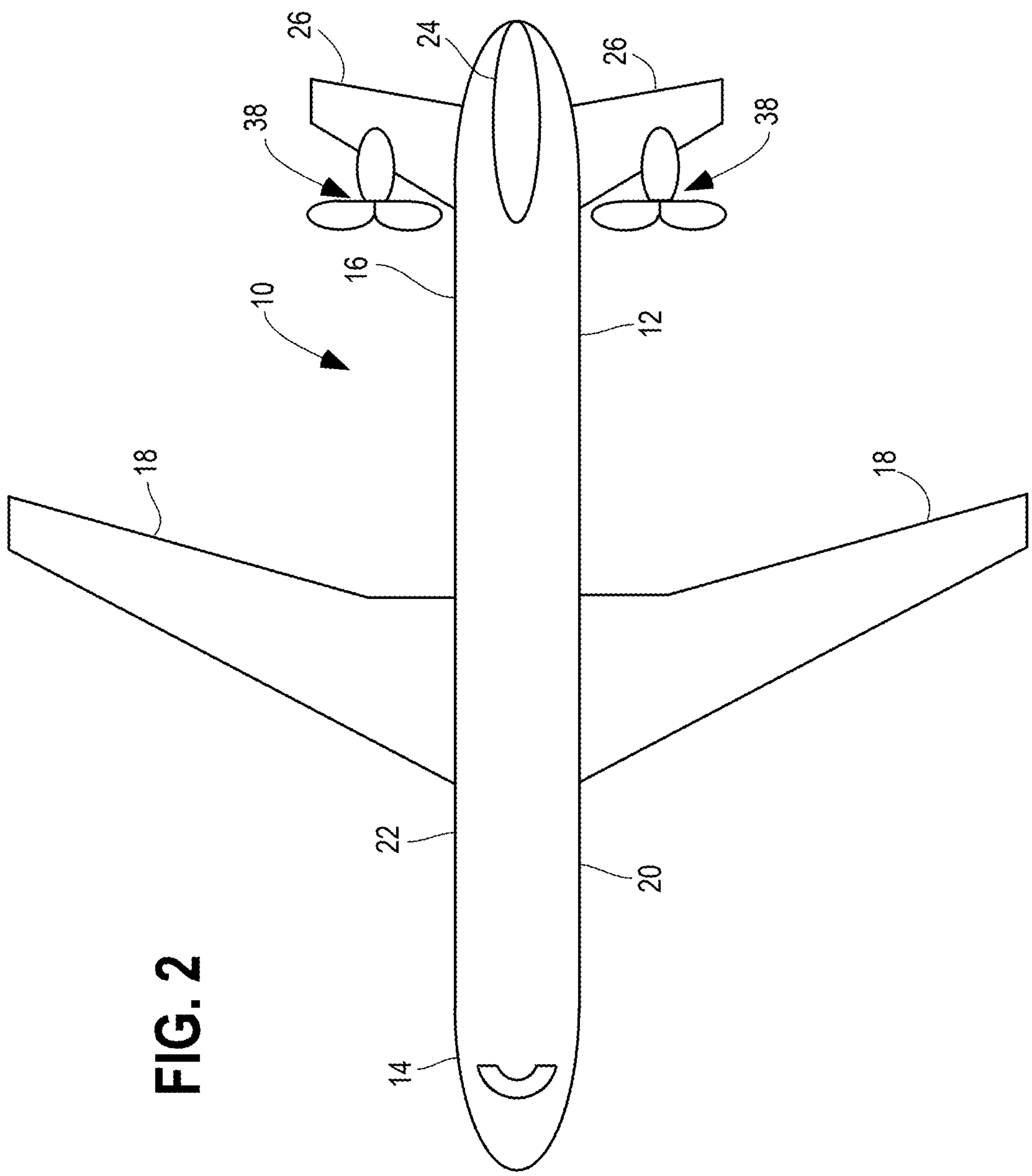
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. A turbine engine, also referred to as an unducted fan propulsor 38, is under-mounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of a propeller assembly, also referred to as a fan assembly 32, on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of the vane assembly 40 includes an array of blades 42 disposed around CL.

Each of the blades 34 has a root 35 where the blade 34 is attached to the fan assembly 32, and each blade 34 defines a root length (RTL). The root length (RTL) is defined as the axial extent (in a direction parallel to CL) from the radially innermost leading edge (LE) 37 of the blade 34 airfoil, e.g., closest to CL, to the axial location of the radially innermost trailing edge (TE) of the blade 34 airfoil.

Figure 4:
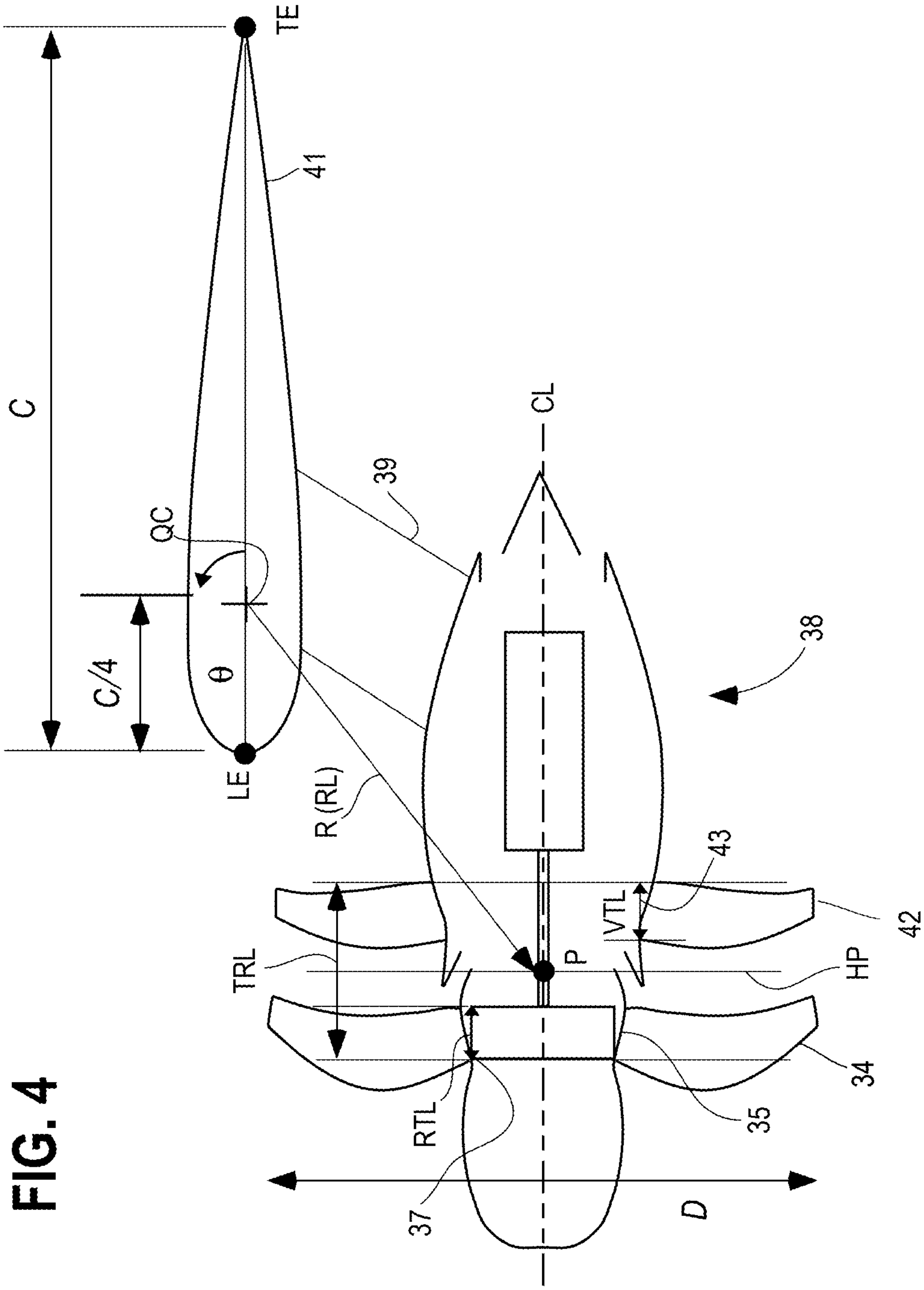
FIG. 4 comprises a schematic side elevation view showing the location of the unducted fan propulsor of FIG. 3 relative to an airfoil section.

Each of the blades 42 also has a root 43 with a vane root distance VTL where the vane 42 is attached to the vane assembly 40 (e.g., non-rotating). The total root length (TRL) is the distance between the leading edge (LE) of the blade 34 airfoil (radially nearest to CL) of the blades 34 and the trailing edge (LE) of the root 43 of the blades 42, as shown in FIGS. 3 and 4. TRL is a measured axial distance from the radial innermost LE of the foremost row of blades/vanes and the trailing edge (TE) of the blades 42. In some embodiments, the second array may instead be a second rotating elements and the TRL is the measured axial distance from the radially innermost LE of the blades 34 of the first rotating element and the TE of the root of the blades of the second rotating elements. In some embodiments, the blades 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes)

may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades 34 or vanes and a second array of blades 42 or vanes, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or blades 42. The TRL of an unducted fan propulsor is defined as the distance between the LE of the root of the forward row of blades or vanes and the rearward edge of the root of the aftmost blade or vane.

Referring again to FIG. 3, the unducted fan propulsor 38 includes a drive mechanism 44 that provides torque and power to the fan assembly 32 through a transmission 46. The drive mechanism 44 may be a turbine engine and associated transmission 46. The transmission 46 delivers torque from the drive mechanism 44 to the fan assembly 32. The transmission system can be configured as a direct drive engine, transferring power from a power turbine or low-pressure turbine (LPT) to the propeller assembly, or an indirect drive system where torque from the LPT is transferred to the fan assembly 32 through a gearbox. The gearbox reduces a rotation speed of the drive shaft to match a desired rotational speed for the fan assembly 32. The turbine engine includes in serial order a compressor, a combustor, a high-pressure turbine and the LPT. In other embodiments, the drive mechanism may generate power partially or fully by an electric motor. In the former case the drive mechanism is a hybrid electric drive mechanism including a turbine engine where a drive shaft includes an electric motor-generator for generating torque. In the latter case the drive mechanism is an electric motor.

The unducted fan propulsor 38 is attached relative to the wings 18 or the horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated therewith, where the airfoil section 41 is defined above.

As depicted in FIG. 4, a chord line C of the airfoil section, length C as shown, is a straight line extending from LE to TE of the airfoil section (the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5B:
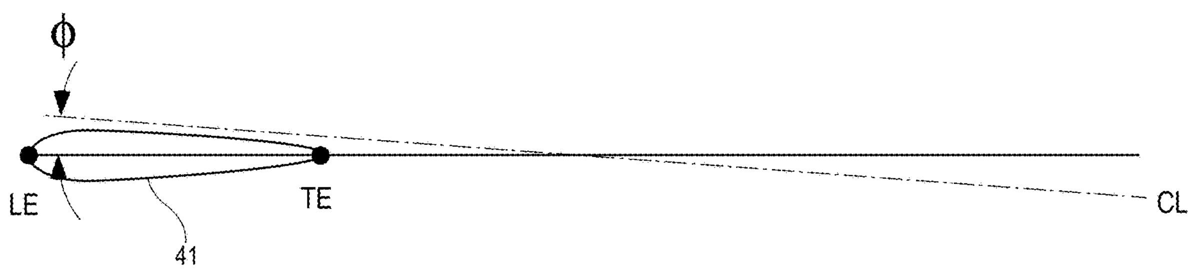
FIG. 5B defines a pitch angle $\phi$ for the unducted fan propulsor relative to a chord line of the airfoil section in FIG. 4.
Figure 5A:
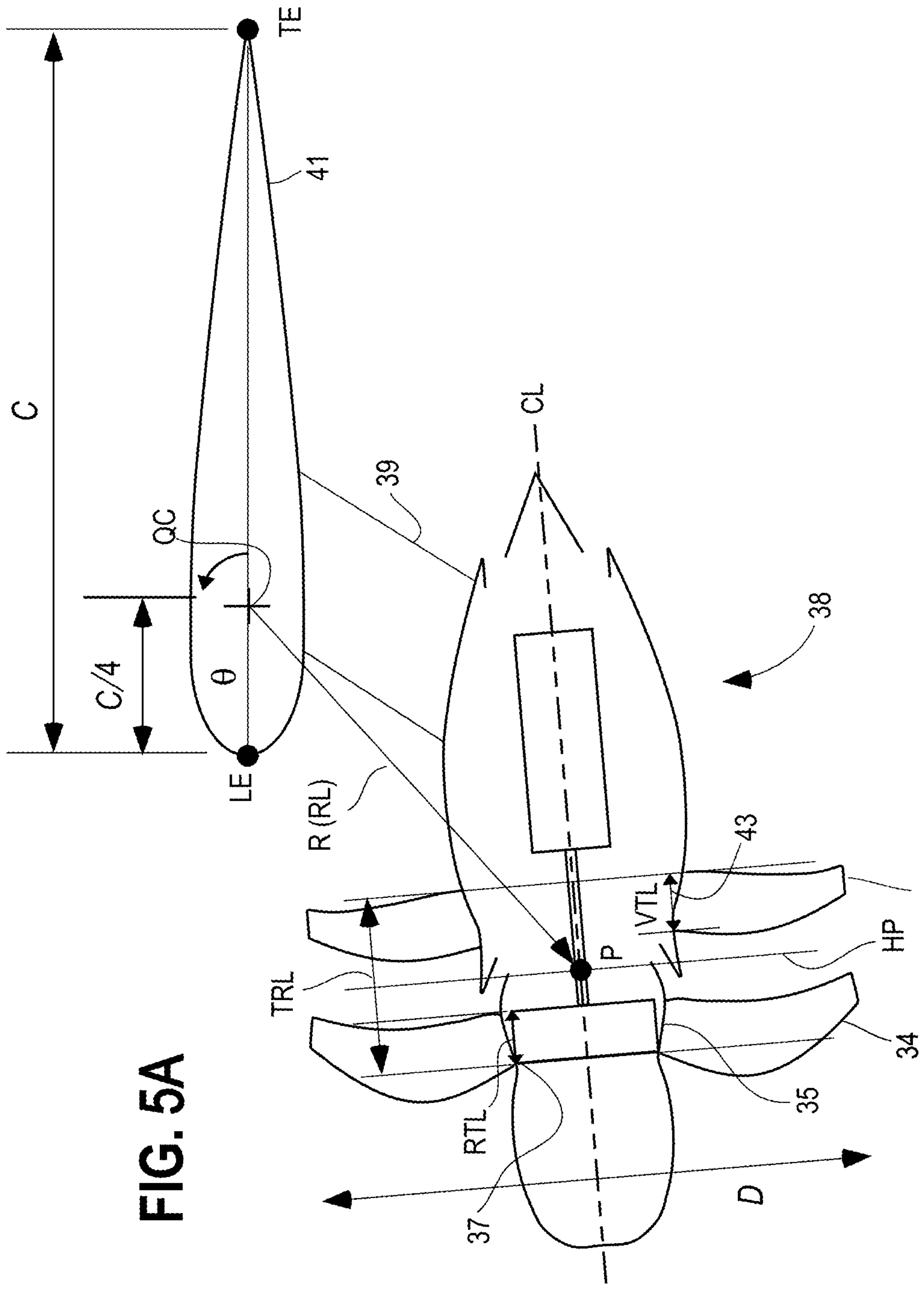
FIG. 5A is a schematic side elevation view similar to FIG. 4 and showing the unducted fan propulsor pitched downward relative to the airfoil section.

As shown in FIG. 4, the CL of the unducted fan propulsor 38 and the chord line C are parallel to each other, corresponding to a zero pitch of the propulsor relative to the chord line C. The unducted fan propulsor 38 can be pitched at different angles relative to the chord line, such as pitched downward as shown in FIG. 5A. FIG. 5B defines a pitch angle $\phi$ for the propulsor 38, which is the angle spanned between the propulsor centerline CL and chord line C. Positive pitch corresponds to a clockwise rotation of CL relative to C. The pitch angle $\phi$ can be fixed or variable during flight. For underwing installations, the pitch angle $\phi$ can vary between −5 and +2 degrees, or between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle $\phi$ can vary between −2 and +5 degrees to more align with downwash created by the wing.

The position of the unducted fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
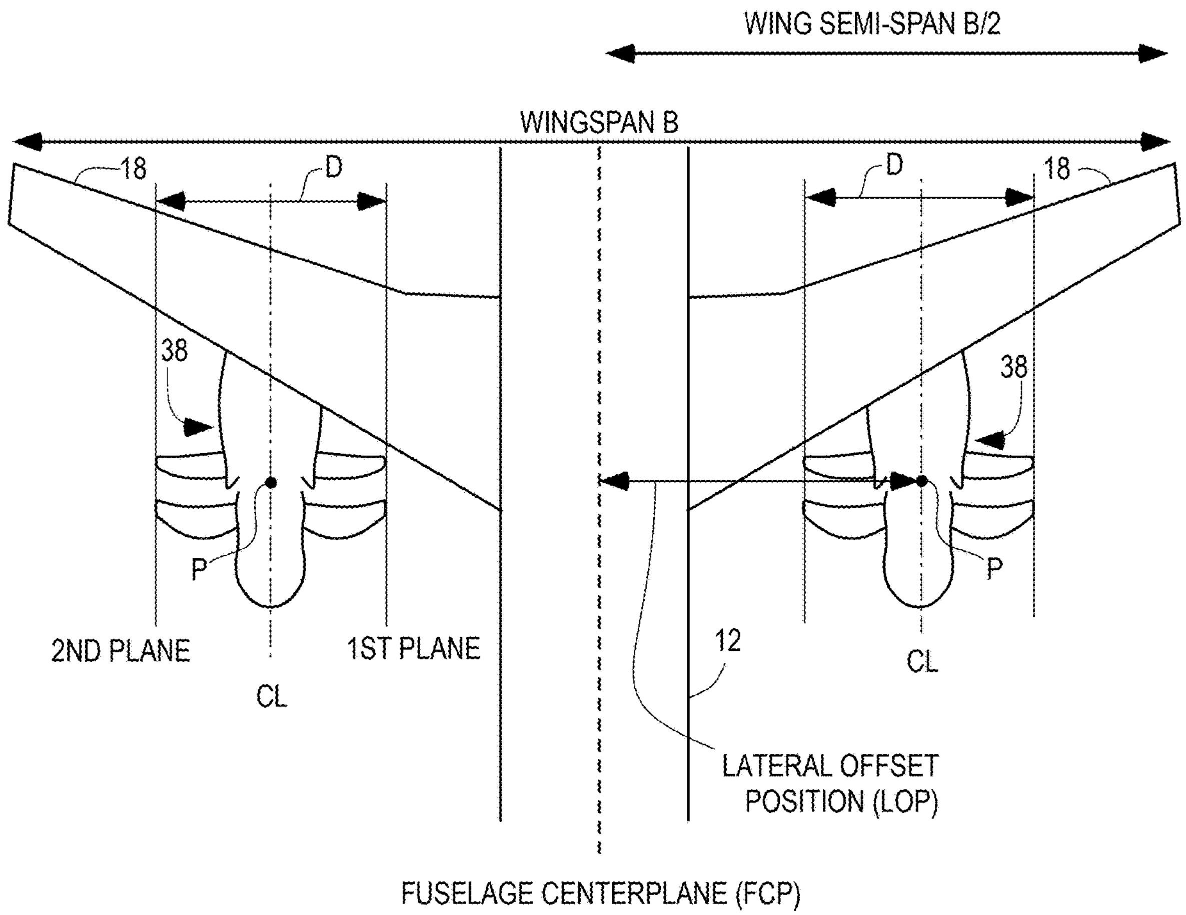
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
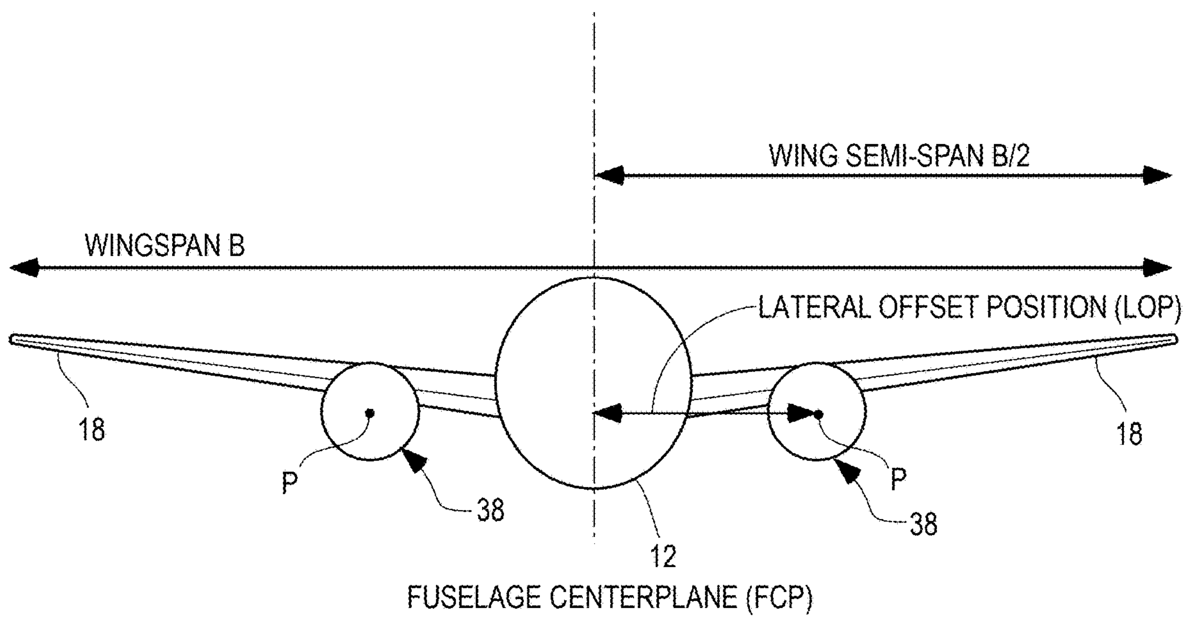
FIG. 6D comprises a schematic front elevation view of the aircraft portion of FIG. 6C.
Figure 6E:
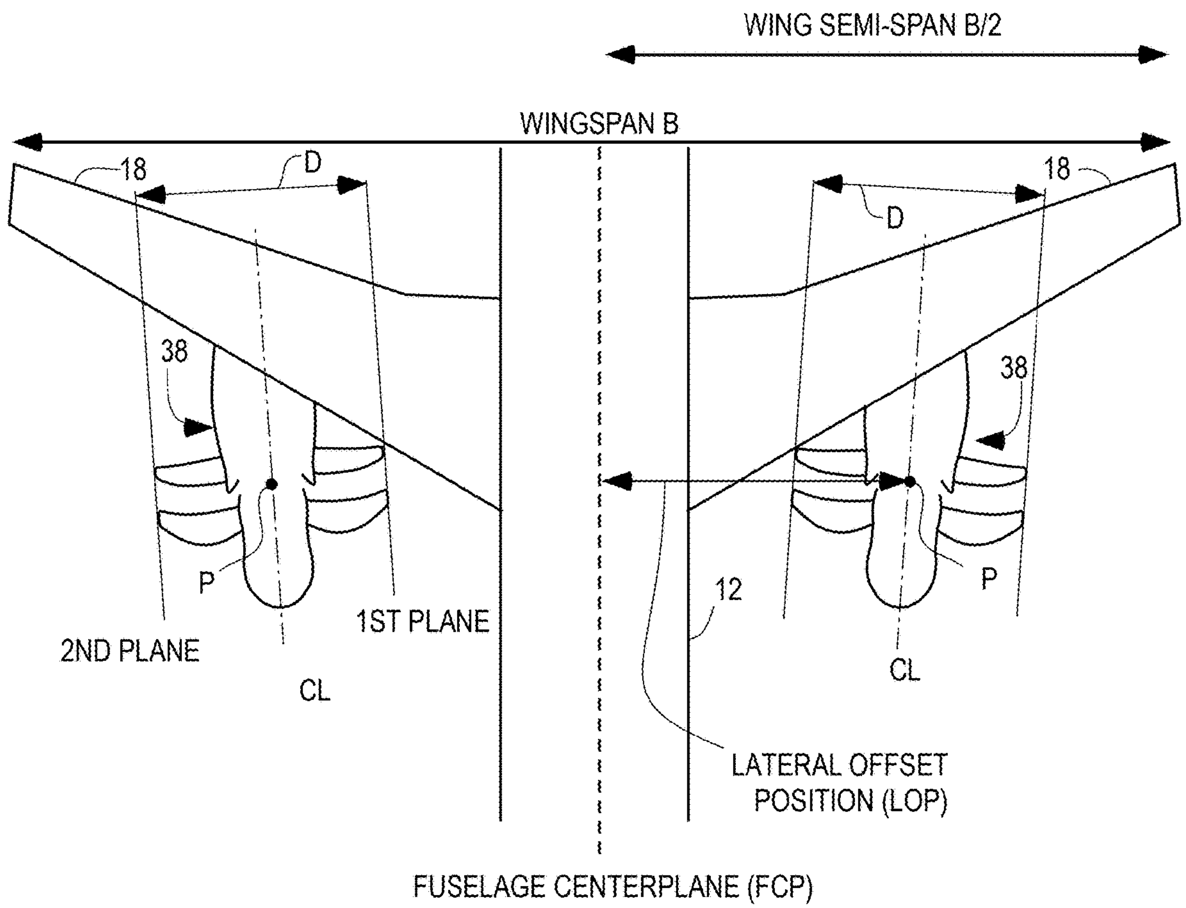
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the unducted fan propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
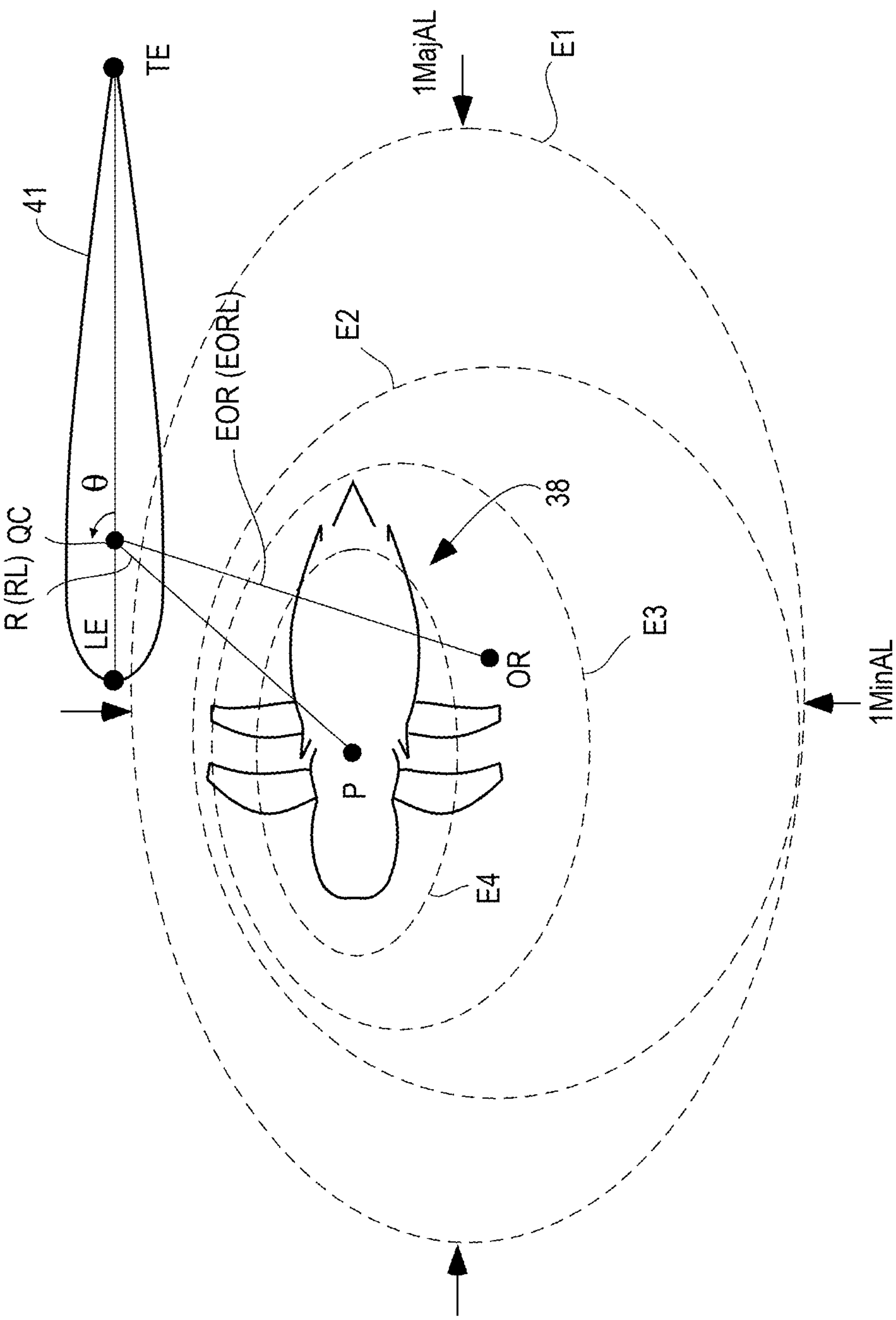
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
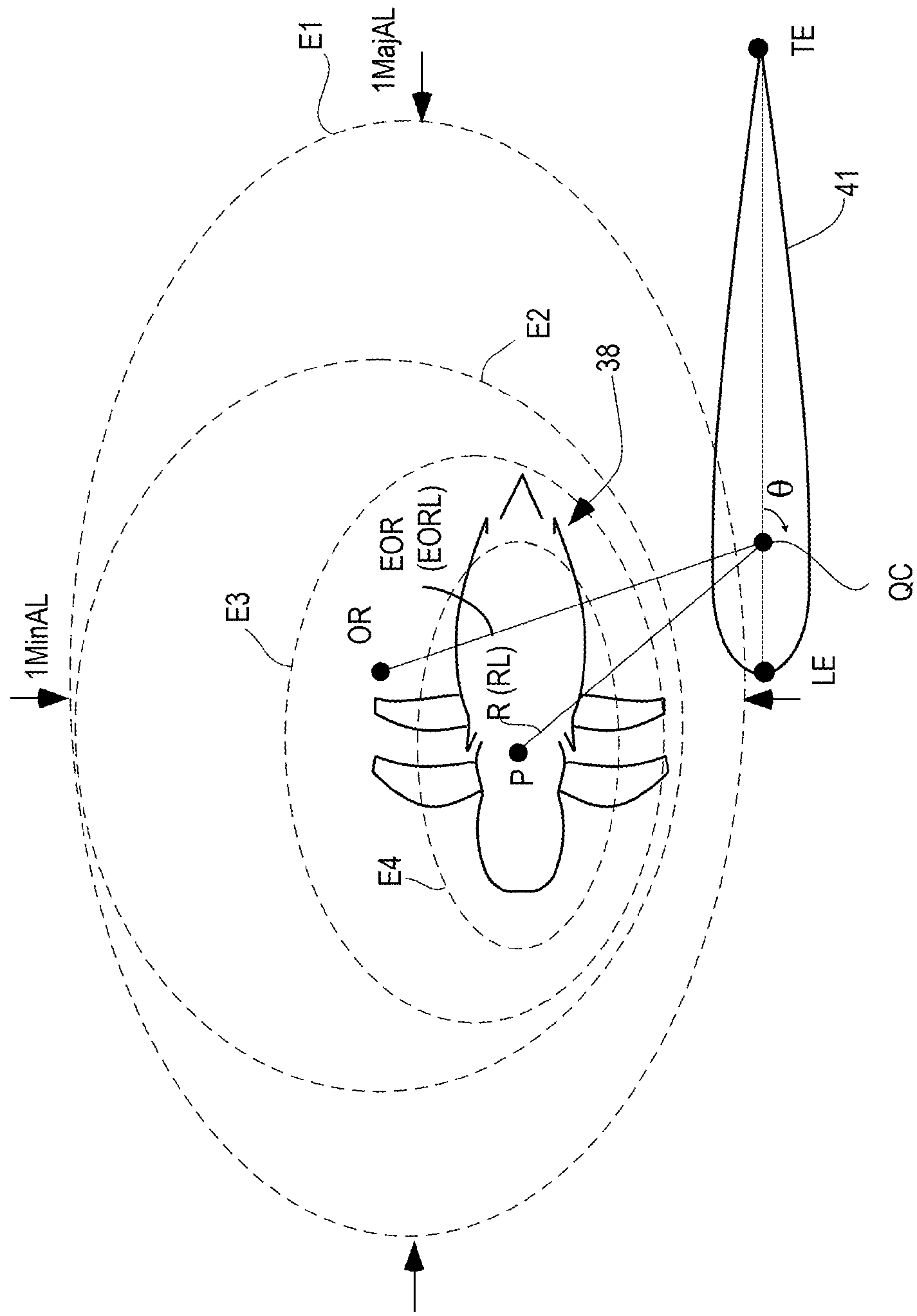
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. An unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D}+\frac{\left(\begin{array}{c}\sqrt{a*\left[b*\sin^2(\theta)-c*\cos^2(\theta)+d*\sin(\theta)*\cos(\theta)\right]}\ +\\ e*\sin(\theta)+f*\cos(\theta)\end{array}\right)}{g*\sin^2(\theta)+h*\cos^2(\theta)}>0$$

and $$\frac{RL}{D}+\frac{\left(\begin{array}{c}\left(-\sqrt{a*\left[b*\sin^2(\theta)-c*\cos^2(\theta)+d*\sin(\theta)*\cos(\theta)\right]}\ +\right.\\ \left.e*\sin(\theta)+f*\cos(\theta)\right)\end{array}\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
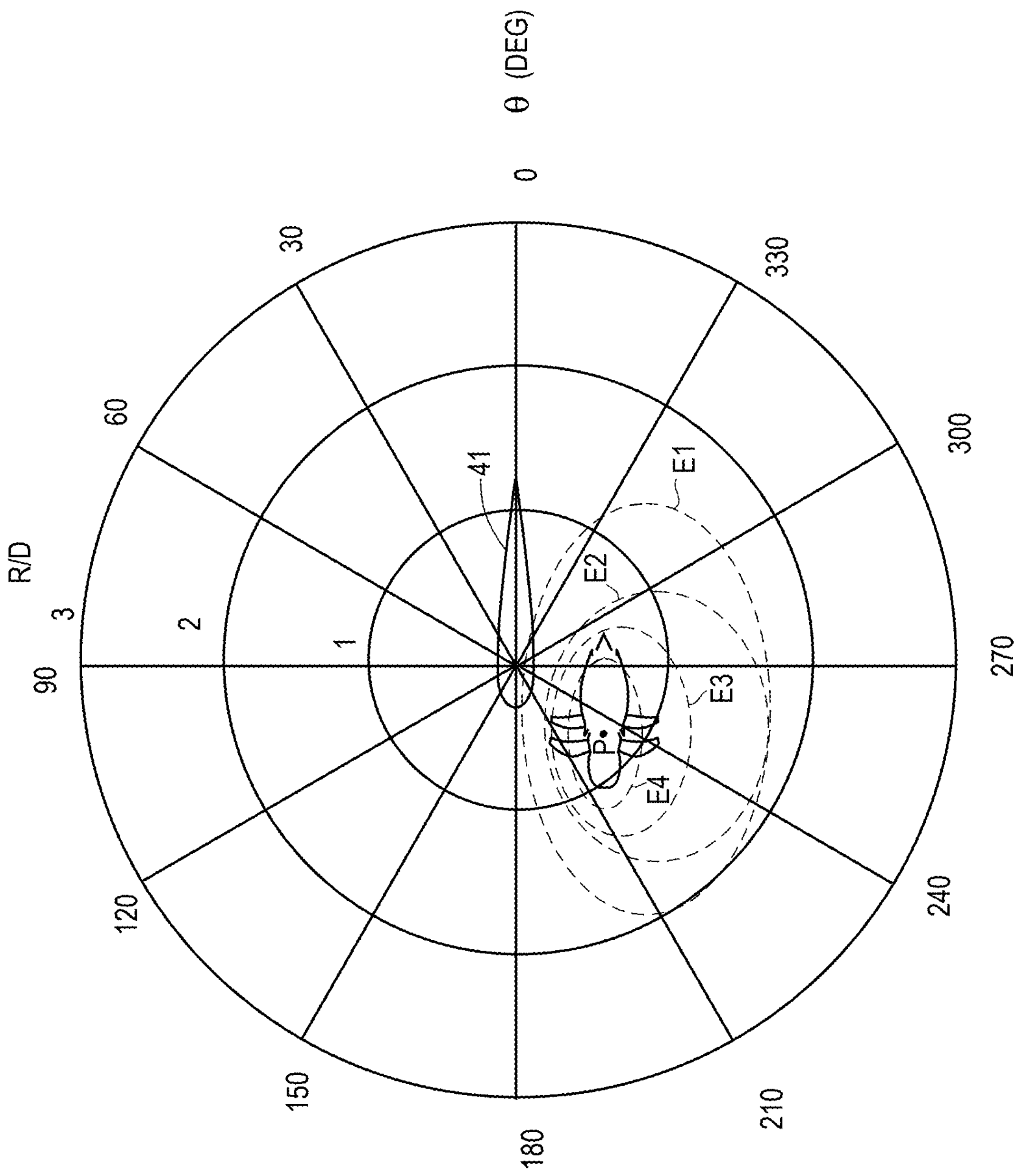
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
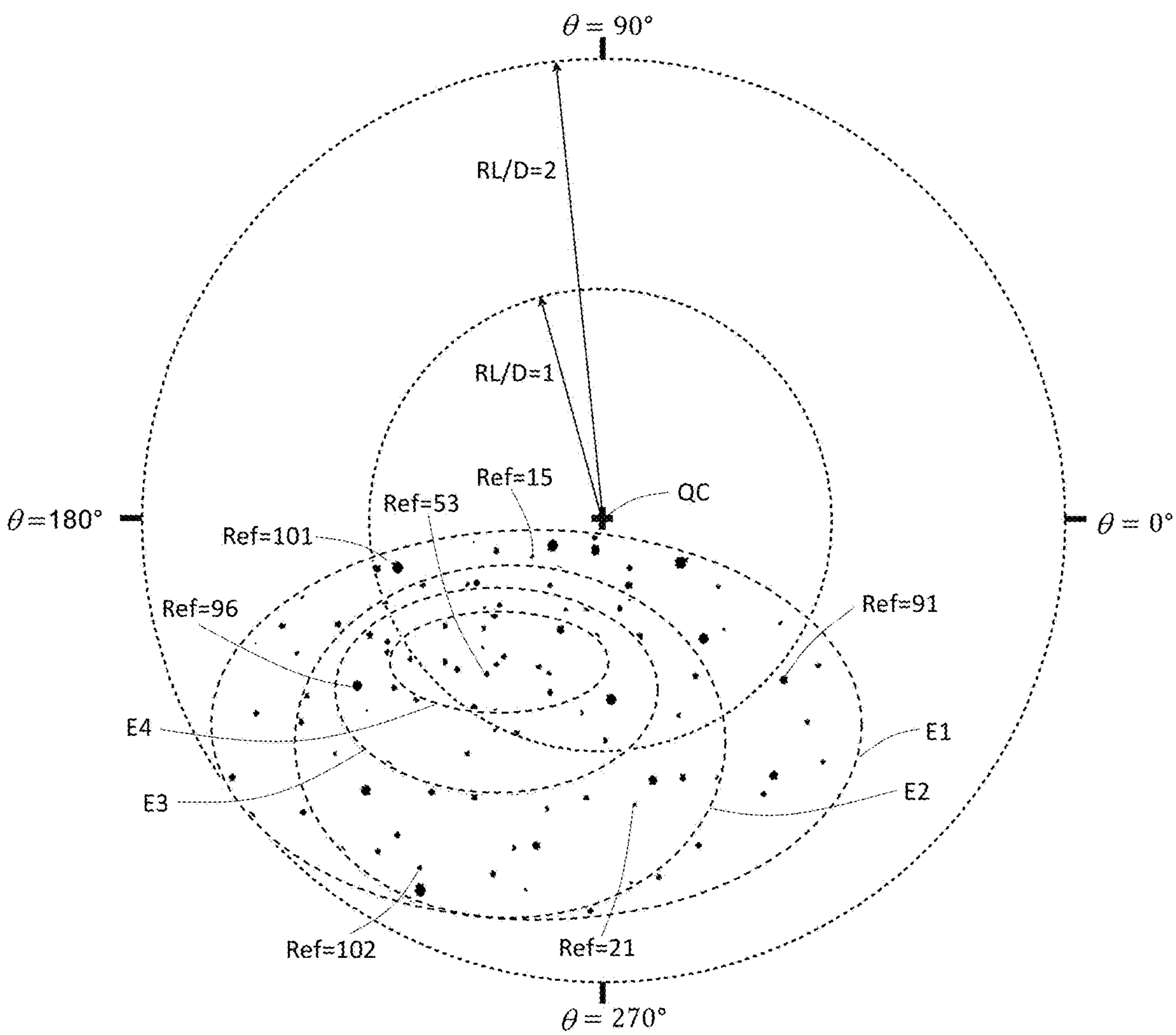
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3 to 6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2 to 50, 8 to 16, 10 to 15, 12 to 14, or 14 to 16 feet.

TABLE 1

P-location relative to airfoil section quarter chord point (QC)

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |

TABLE 1-continued

P-location relative to airfoil section quarter chord point (QC)

| Ref. | Type of aircraft | RL (ft) | D (ft) | θ (deg) | RL/D |
|---|---|---|---|---|---|
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |

TABLE 1-continued

| P-location relative to airfoil section quarter chord point (QC) | | | | | |
|---|---|---|---|---|---|
| Ref. | Type of aircraft | RL (ft) | D (ft) | θ (deg) | RL/D |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3 to 6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
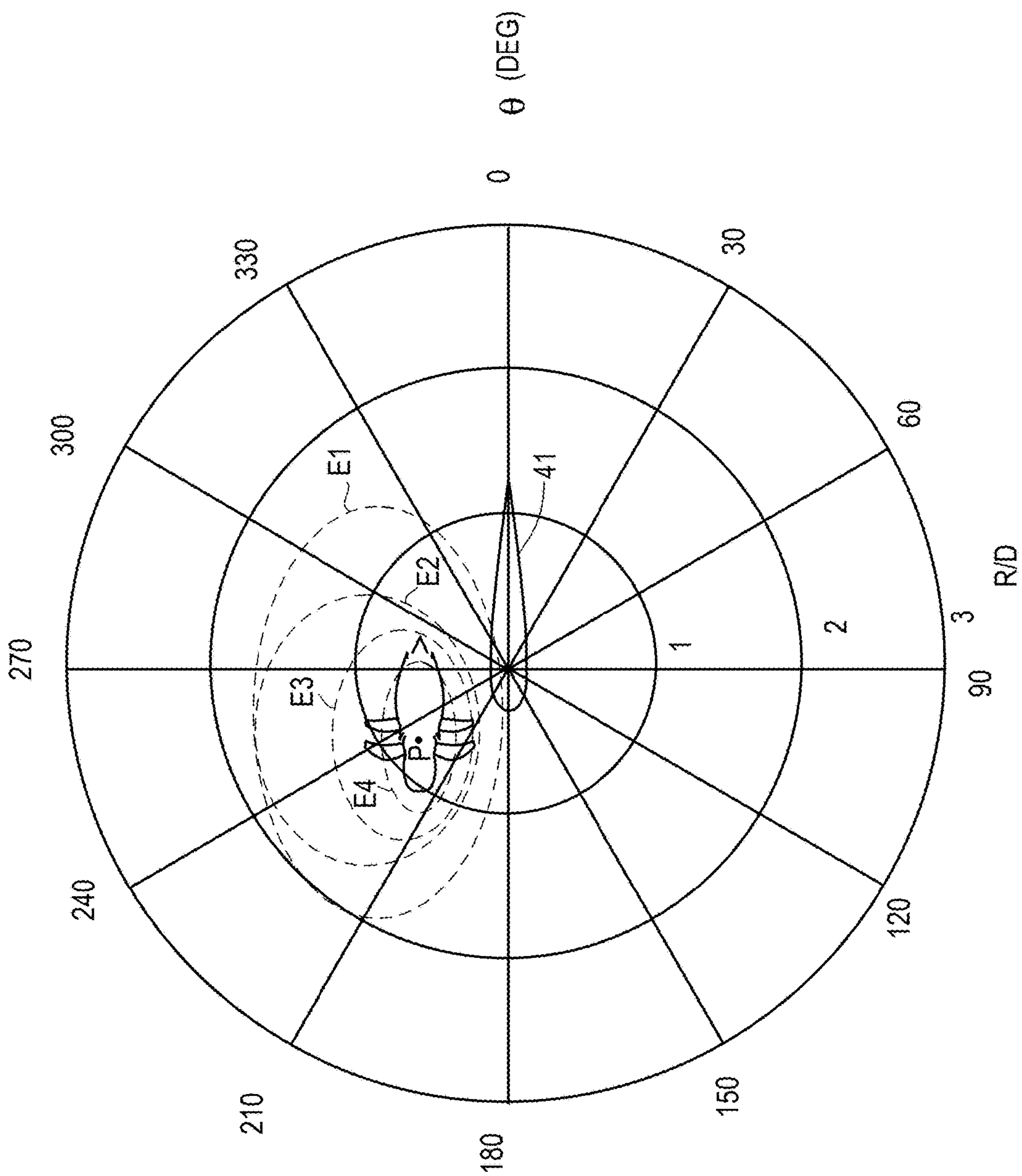
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach M0 of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and Aan is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

FIG. 12 shows a schematic view of an unducted, three-stream, turbine engine, also referred to as an unducted fan propulsor 110, for an aircraft, that may incorporate one or more embodiments of the present disclosure. The unducted fan propulsor is a "three-stream engine" in that its architecture provides three distinct streams (labeled S1, S2, and S3) of thrust-producing airflow during operation, as detailed further below. The unducted fan propulsor 110 can be incorporated as the unducted fan propulsors 38 of FIGS. 1 to 11.

As shown in FIG. 12, the unducted fan propulsor defines an axial direction A, a radial direction R, and a circumferential direction C. Moreover, the unducted fan propulsor defines a longitudinal centerline axis 112 that extends along the axial direction A. In general, the axial direction A extends parallel to the longitudinal centerline axis 112, the radial direction R extends outward from, and inward to, the longitudinal centerline axis 112 in a direction orthogonal to the axial direction A, and the circumferential direction C extends three hundred sixty degrees (360°) around the longitudinal centerline axis 112. The unducted fan propulsor extends between a forward end 114 and an aft end 116, e.g., along the axial direction A.

The unducted fan propulsor includes a fan assembly 150, a compressor section, a combustion section, and a turbine section. Particularly, as shown in FIG. 12, the unducted fan propulsor 110 includes an engine core 118 and a core cowl 122 that annularly surrounds the engine core 118. The core cowl 122 defines a core inlet 124 having an annular shape that is annular about the longitudinal centerline axis 112. The core cowl 122 further encloses and supports a low-pressure (LP) compressor 126 (also referred to as a booster) for pressurizing the air that enters the core cowl 122 through the core inlet 124. A high-pressure (HP) compressor 128 receives pressurized air from the LP compressor 126 and further increases the pressure of the air. The pressurized air flows downstream to a combustor 130 where fuel is injected into the pressurized air and ignited to raise the temperature and the energy level of the pressurized air, thereby generating combustion gases.

The combustion gases flow from the combustor 130 downstream to a high-pressure (HP) turbine 132. The HP turbine 132 drives the HP compressor 128 through a first shaft, also referred to as a high-pressure (HP) shaft 136 (also referred to as a "high-speed shaft"). In this regard, the HP turbine 132 is drivingly coupled with the HP compressor 128. Together, the HP compressor 128, the combustor 130, and the HP turbine 132 define the engine core 118. The combustion gases then flow to a power turbine or a low-pressure (LP) turbine 134. The LP turbine 134 drives the LP compressor 126 and components of the fan assembly 150 through a second shaft, also referred to as a low-pressure (LP) shaft 138 (also referred to as a "low-speed shaft"). In this regard, the LP turbine 134 is drivingly coupled with the LP compressor 126 and components of the fan assembly 150. The LP shaft 138 is coaxial with the HP shaft 136 in the embodiment of FIG. 12. After driving each of the HP turbine 132 and the LP turbine 134, the combustion gases exit the unducted fan propulsor 110 through a core exhaust nozzle 140. The unducted fan propulsor 110 defines a core flowpath, also referred to as a core duct 142, that extends between the core inlet 124 and the core exhaust nozzle 140. The core duct 142 is an annular duct positioned generally inward of the core cowl 122 along the radial direction R.

The fan assembly 150 includes propulsor or a fan 152, also referred to as a primary fan. For the embodiment of FIG. 12, the fan 152 is an open rotor fan, also referred to as an unducted fan or an unducted propulsor. However, in other embodiments, the fan 152 may be ducted, e.g., by a fan casing or a nacelle circumferentially surrounding the fan 152. The fan 152 includes a plurality of blades 154 (only one shown in FIG. 12) that extends in the radial direction R from a fan root 151 to a fan tip 153. The plurality of blades 154 is rotatable about the longitudinal centerline axis 112 via a fan shaft 156. As shown in FIG. 12, the fan shaft 156 is coupled with the LP shaft 138 via a speed reduction gearbox or a power gearbox, also referred to as a gearbox assembly 155, e.g., in an indirect-drive configuration.

The gearbox assembly 155 is shown schematically in FIG. 12. The gearbox assembly 155 includes a plurality of gears for adjusting the rotational speed of the fan shaft 156 and, thus, the fan 152 relative to the LP shaft 138 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. Preferably, the gearbox assembly has a gear ratio of 4:1 to 10:1 for an unducted fan engine (e.g., the unducted fan propulsor). The gearbox may be a single stage gearbox or a compound gearbox (e.g., having a plurality of stages). The LP shaft 138, the gearbox assembly 155, and the fan shaft 156 are disposed in an in-line configuration such that the LP shaft 138, the gearbox assembly 155, and the fan shaft 156 are coaxial and are each disposed about the longitudinal centerline axis 112.

The blades 154 can be arranged in equal spacing around the longitudinal centerline axis 112. Each blade 154 extends outwardly from a disk 159 generally along the radial direction R. The disk 159 is covered by a fan hub 157 that is rotatable and aerodynamically contoured to promote an airflow through the plurality of blades 154. Each blade 154 has a root and a tip, and a span defined therebetween. Each of the plurality of blades 154 defines a pitch axis P. For the embodiment of FIG. 12, each of the plurality of blades 154 of the fan 152 is rotatable about their respective pitch axis P, e.g., in unison with one another. A fan actuation system 158 controls one or more actuators to pitch the blades 154 about their respective pitch axis P. The fan actuation system 158 is disposed within the fan hub 157.

The fan assembly 150 further includes a fan guide vane array 160 that includes a plurality of fan guide vanes 162 (only one shown in FIG. 12) disposed around the longitudinal centerline axis 112. For the embodiment of FIG. 12, the plurality of fan guide vanes 162 is not rotatable about the longitudinal centerline axis 112. Each of the plurality of fan guide vanes 162 has a root and a tip, and a span defined therebetween. The plurality of fan guide vanes 162 can be unshrouded as shown in FIG. 12 or can be shrouded, e.g., by an annular shroud spaced outward from the tips of the fan guide vanes 162 along the radial direction R. Each of the plurality of fan guide vanes 162 defines a vane pitch axis 164. For the embodiment of FIG. 12, each of the plurality of fan guide vanes 162 of the fan guide vane array 160 is rotatable about their respective vane pitch axis 164, e.g., in unison with one another. One or more actuators 166 are controlled to pitch the plurality of fan guide vanes 162 about their respective vane pitch axis 164. In other embodiments, each of the plurality of fan guide vanes 162 is fixed or is unable to be pitched about the vane pitch axis 164. The plurality of fan guide vanes 162 is mounted to a fan cowl 170.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath, also referred to as a fan duct 172. Incoming air enters through the fan duct 172 through a fan duct inlet 176 and exits through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of struts 174 (only one shown in FIG. 12) that extends substantially radially and are circumferentially spaced about the longitudinal centerline axis 112. The plurality of struts 174 is each aerodynamically contoured to direct air flowing thereby. Other struts, in addition to the plurality of struts 174, can be used to connect and to support the fan cowl 170 and the core cowl 122.

The unducted fan propulsor also defines or includes an inlet duct 180. The inlet duct 180 extends between an engine inlet 182 and the core inlet 124 and the fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter 184 of the core cowl 122. The inlet duct 180 is wider than the core duct 142 along the radial direction R. The inlet duct 180 is also wider than the fan duct 172 along the radial direction R.

The fan assembly 150 also includes a mid-fan 186. The mid-fan 186 includes a plurality of mid-fan blades 188 (only one shown in FIG. 2). The plurality of mid-fan blades 188 is rotatable, e.g., about the longitudinal centerline axis 112. The mid-fan 186 is drivingly coupled with the LP turbine 134 via the LP shaft 138. The plurality of mid-fan blades 188 can be arranged in equal circumferential spacing about the longitudinal centerline axis 112. The plurality of mid-fan blades 188 is annularly surrounded (e.g., ducted) by the fan cowl 170. In this regard, the mid-fan 186 is positioned inward of the fan cowl 170 along the radial direction R. The mid-fan 186 is positioned within the inlet duct 180 upstream of both the core duct 142 and the fan duct 172. A ratio of a span of a blade 154 to that of a mid-fan blade 188 (a span is measured from a root to tip of the respective blade) is greater than 2 and less than 10, to achieve the desired benefits of the third stream (S3), particularly, the additional thrust the third stream S3 offers to the engine, which can enable a smaller diameter blade 154 (benefits engine installation).

Accordingly, air flowing through the inlet duct 180 flows across the plurality of mid-fan blades 188 and is accelerated downstream thereof. At least a portion of the air accelerated by the mid-fan blades 188 flows into the fan duct 172 and is ultimately exhausted through the fan exhaust nozzle 178 to produce propulsive thrust. Also, at least a portion of the air accelerated by the plurality of mid-fan blades 188 flows into the core duct 142 and is ultimately exhausted through the core exhaust nozzle 140 to produce propulsive thrust. Generally, the mid-fan 186 is a compression device positioned downstream of the engine inlet 182. The mid-fan 186 is operable to accelerate air into the fan duct 172, also referred to as a secondary bypass passage.

During operation of the unducted fan propulsor, an initial airflow or an incoming airflow passes through the blades 154 of the fan 152 and splits into a first airflow and a second airflow. The first airflow bypasses the engine inlet 182 and flows generally along the axial direction A outward of the fan cowl 170 along the radial direction R. The first airflow accelerated by the blades 154 passes through the fan guide vanes 162 and continues downstream thereafter to produce a primary propulsion stream or a first thrust stream S1. A majority of the net thrust produced by the unducted fan propulsor is produced by the first thrust stream S1. The second airflow enters the inlet duct 180 through the engine inlet 182.

The second airflow flowing downstream through the inlet duct 180 flows through the plurality of mid-fan blades 188 of the mid-fan 186 and is consequently compressed. The second airflow flowing downstream of the mid-fan blades 188 is split by the splitter 184 located at the forward end of the core cowl 122. Particularly, a portion of the second airflow flowing downstream of the mid-fan 186 flows into the core duct 142 through the core inlet 124. The portion of the second airflow that flows into the core duct 142 is progressively compressed by the LP compressor 126 and the HP compressor 128 and is ultimately discharged into the combustion section. The discharged pressurized air stream flows downstream to the combustor 130 where fuel is introduced to generate combustion gases or products.

The combustor 130 defines an annular combustion chamber that is generally coaxial with the longitudinal centerline axis 112. The combustor 130 receives pressurized air from the HP compressor 128 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 133 of the HP turbine 132. The first stage turbine nozzle 133 is defined by an annular flow channel that includes a plurality of radially extending, circumferentially spaced nozzle vanes 135 that turn the combustion gases so that the combustion gases flow angularly and impinge upon first stage turbine blades of the HP turbine 132. The combustion gases exit the HP turbine 132 and flow through the LP turbine 134 and exit the core duct

142 through the core exhaust nozzle 140 to produce a core air stream, also referred to as a second thrust stream S2. As noted above, the HP turbine 132 drives the HP compressor 128 via the HP shaft 136, and the LP turbine 134 drives the LP compressor 126, the fan 152, and the mid-fan 186 via the LP shaft 138.

The other portion of the second airflow flowing downstream of the mid-fan 186 is split by the splitter 184 into the fan duct 172. The air enters the fan duct 172 through the fan duct inlet 176. The air flows generally along the axial direction A through the fan duct 172 and is ultimately exhausted from the fan duct 172 through the fan exhaust nozzle 178 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The unducted fan propulsor depicted in FIG. 12 is by way of example only. In other embodiments, the unducted fan propulsor may have other suitable configurations. For example, the fan 152 can be ducted by a fan casing or a nacelle such that a bypass passage is defined between the fan casing and the fan cowl 170. Moreover, in other embodiments, any other suitable number or configuration of compressors, turbines, shafts, or a combination thereof may be provided. In still other embodiments, aspects of the present disclosure may be incorporated into any other suitable turbofan engine, such as, for example, turbofan engines defining two streams (e.g., a bypass stream and a core air stream).

Further, for the depicted embodiment of FIG. 12, the unducted fan propulsor includes an electric machine 190 (e.g., a motor-generator) operably coupled with a rotating component thereof. In this regard, the unducted fan propulsor is a hybrid-electric propulsion machine. Particularly, as shown in FIG. 12, the electric machine 190 is operatively coupled with the LP shaft 138. The electric machine 190 can be mechanically connected to the LP shaft 138, either directly, or indirectly, e.g., by way of a gearbox assembly 192 (shown schematically in FIG. 12). Further, although, in this embodiment the electric machine 190 is operatively coupled with the LP shaft 138 at an aft end of the LP shaft 138, the electric machine 190 can be coupled with the LP shaft 138 at any suitable location or can be coupled to other rotating components of the unducted fan propulsor, such as the HP shaft 136 or the LP shaft 138. For instance, in some embodiments, the electric machine 190 can be coupled with the LP shaft 138 and positioned forward of the mid-fan 186 along the axial direction A.

In some embodiments, the electric machine 190 can be an electric motor operable to drive or to motor the LP shaft 138. In other embodiments, the electric machine 190 can be an electric generator operable to convert mechanical energy into electrical energy. In this way, electrical power generated by the electric machine 190 can be directed to various engine systems or aircraft systems. In some embodiments, the electric machine 190 can be a motor/generator with dual functionality. The electric machine 190 includes a rotor 194 and a stator 196. The rotor 194 is coupled to the LP shaft 138 and rotates with rotation of the LP shaft 138. In this way, the rotor 194 rotates with respect to the stator 196, thereby generating electrical power. Although the electric machine 190 has been described and illustrated in FIG. 12 as having a particular configuration, the present disclosure may apply to electric machines having alternative configurations. For instance, the rotor 194 or the stator 196 may have different configurations or may be arranged in a different manner than illustrated in FIG. 12.

Figure 13:
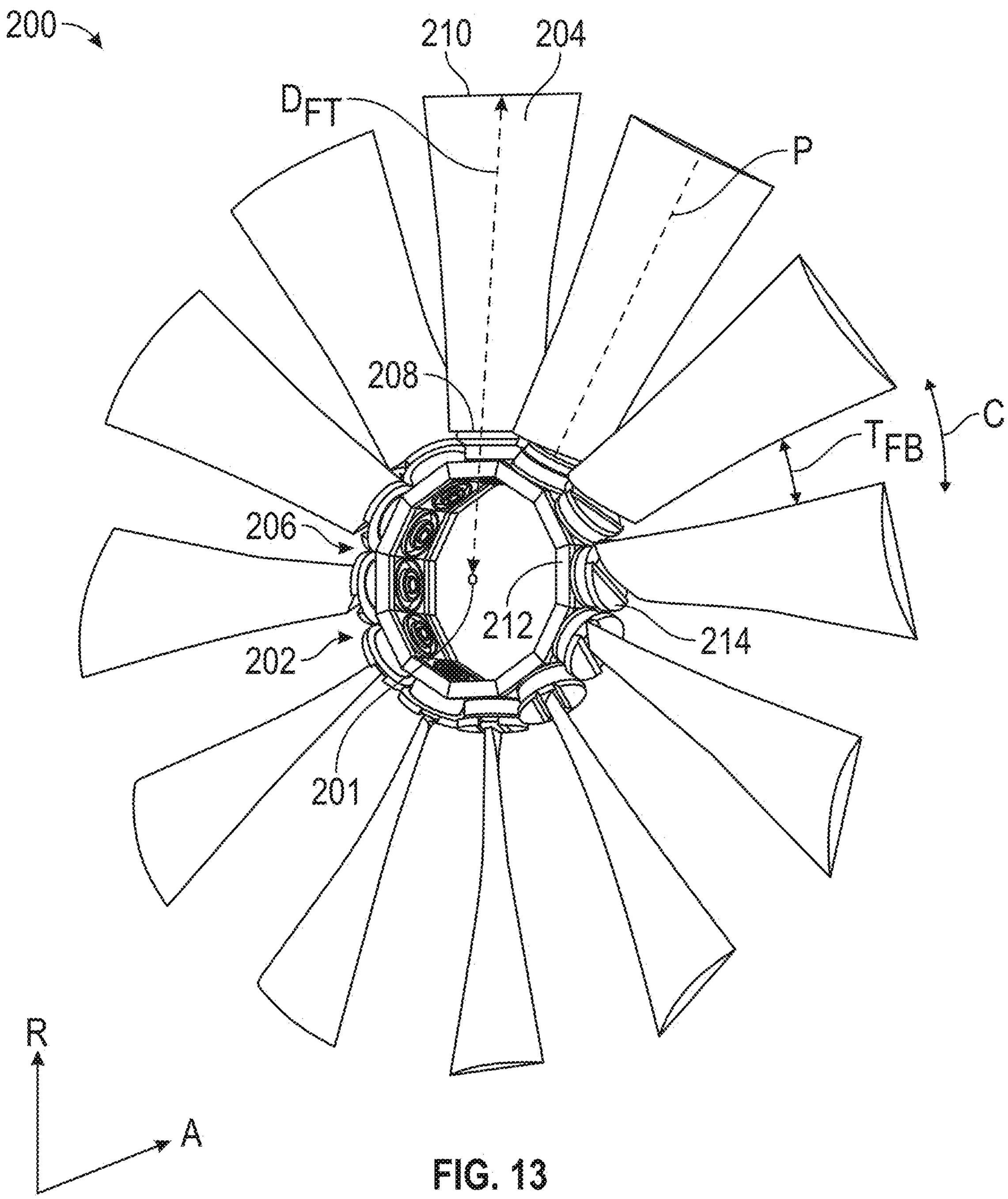
FIG. 13 shows a fan having a fan actuation system, according to the present disclosure.

FIG. 13 shows a fan 200 having a fan actuation system 202, according to the present disclosure. The fan 200 can be utilized as the fan 152 of FIG. 12. The fan 200 includes a plurality of blades 204 that is coupled to a disk 206 and is spaced circumferentially about a longitudinal centerline axis 201 of the fan 200. The fan 200 includes a number of fan blades, and, in particular, includes ten to eighteen blades 204. In the embodiment of FIG. 13, the fan 200 includes twelve blades 204. Each blade 204 extends in the radial direction R along a span of the blade 204 and from a fan root 208 to a fan tip 210. Each blade 204 has a fan tip diameter $D_{FT}$ that extends from the longitudinal centerline axis 201 to the fan tip 210 of each blade 204. While the fan tip diameter $D_{FT}$ is detailed with respect to the plurality of blades 204, the fan tip diameter $D_{FT}$ is a measurement of any of the fan blades detailed herein. The fan tip diameter $D_{FT}$ is in a range of seven feet to fourteen feet (7 ft. to 16 ft.), as detailed further below. A tangential fan blade distance $T_{FB}$ is defined in the circumferential direction C as a circumferential distance or a tangential distance between adjacent blades 204. As used herein, adjacent means two fan blades with no intervening fan blade therebetween.

The disk 206 includes a plurality of disk segments 212 that is rigidly coupled together or integrally molded together in a generally annular shape. One blade 204 is coupled to each disk segment 212 at a trunnion mechanism 214 of the fan actuation system 202. The trunnion mechanism 214 facilitates retaining the respective blade 204 on the disk 206 during rotation of the disk 206, while still rendering the respective blade 204 rotatable relative to the disk 206 about a pitch axis P of the blade 204. For example, the trunnion mechanism 214 provides a load path to the disk 206 for the centrifugal load generated by the blade 204 during rotation of the blade 204 about the longitudinal centerline axis 201. The trunnion mechanism 214 includes a plurality of bearings disposed within the disk segment 212 that allows the blade 204 to rotate about the pitch axis P.

Figure 14:
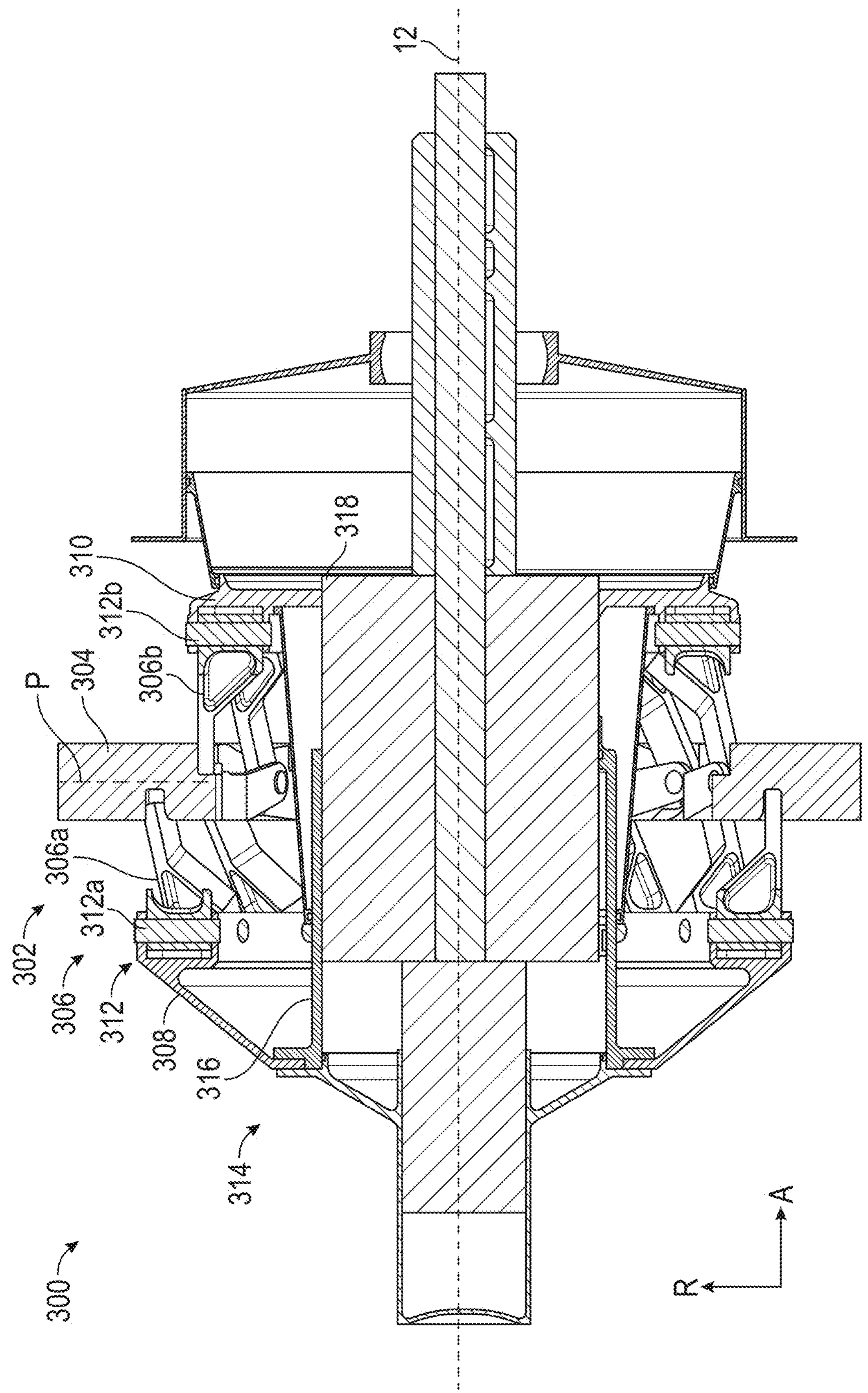
FIG. 14 is a schematic cross-sectional diagram of a fan actuation system for an unducted fan propulsor, taken along a longitudinal centerline axis of the unducted fan propulsor, according to the present disclosure.

FIG. 14 is a schematic cross-sectional diagram of a fan actuation system 300 for an unducted fan propulsor, taken along a longitudinal centerline axis 112 of the unducted fan propulsor, according to the present disclosure. The fan actuation system 300 can be utilized for any of the fans detailed herein. The fan actuation system 300 includes a trunnion mechanism 302 and one or more actuators 314. The trunnion mechanism 302 includes a plurality of trunnions 304. Each fan blade of the fan is coupled to a respective trunnion 304. Each of the plurality of trunnions 304 is rotatable about a pitch axis P to pitch the fan blades of the fan. The trunnion mechanism 302 includes a plurality of trunnion links 306 that is coupled to the plurality of trunnions 304. For example, a respective trunnion link 306 is coupled to a respective trunnion 304. The plurality of trunnion links 306 includes a plurality of forward trunnion links 306*a* and a plurality of aft trunnion links 306*b* that are coupled to the plurality of trunnions 304. The plurality of forward trunnion links 306*a* is pivotably coupled to the plurality of trunnions 304.

The trunnion mechanism 302 includes a plurality of unison rings 308, 310 including a forward unison ring 308 positioned forward of the plurality of trunnions 304 and an aft unison ring 310 positioned aft of the plurality of trunnions 304. The forward unison ring 308 and the aft unison ring 310 couple the plurality of trunnions 304 together. The plurality of trunnion links 306 is coupled to the forward unison ring 308 or the aft unison ring 310 via a plurality of pins 312. The plurality of forward trunnion links 306*a* is pivotably coupled to the forward unison ring 308 by a plurality of forward pins 312*a* such that the plurality of trunnions 304 is coupled to the forward unison ring 308. For example, each forward trunnion link 306*a* extends forward from a respective trunnion 304 to the forward unison ring 308 and a respective forward pin 312*a* is disposed through the forward trunnion link 306*a* at the forward unison ring 308 to pivotably couple the forward trunnion link 306*a* to the forward unison ring 308. Each aft trunnion link 306*b* extends aftward from the respective trunnion 304 to the aft unison ring 310 and a respective aft pin 312*b* is disposed through the aft trunnion link 306*b* at the aft unison ring 310 to pivotably couple the aft trunnion link 306*b* to the aft unison ring 310. In this way, each of the plurality of trunnions 304 is pivotably coupled to the forward unison ring 308 and to the aft unison ring 310 such that the plurality of trunnions 304 can pivot about the pitch axis P in unison.

The one or more actuators 314 include a hydraulic cylinder 316 and a piston 318 disposed within the hydraulic cylinder 316. The hydraulic cylinder 316 and the piston 318 are movable along the axial direction A. In this way, the one or more actuators 314 are hydraulic linear actuators such that the hydraulic cylinder 316 and the piston 318 move linearly along the axial direction A (e.g., in opposite directions along the longitudinal centerline axis 112). The forward unison ring 308 is coupled to the hydraulic cylinder 316 such that the forward unison ring 308 moves when the hydraulic cylinder 316 moves. The aft unison ring 310 is coupled to the piston 318 such that aft unison ring 310 moves when the piston 318 moves.

In operation, the fan actuation system 300 moves the plurality of blades 154 (FIG. 12) between a first end position and a second end position. The first end position, referred to herein as a feather position, corresponds to a position in which the plurality of blades 154 produces the least (e.g., minimal) amount of resistance or drag. In some examples, this position corresponds to a position in which the plurality of blades 154 is aligned or substantially aligned (e.g., ±5°) with the flow of the volume of air through the fan 152. The second end position is a reverse position in which the plurality of blades 154 exceeds, for example, a plane that is transverse to the longitudinal centerline axis 112 (the direction of forward movement of the aircraft) by a certain degree (e.g., 30°) so as to assist with the braking of the aircraft. Therefore, in some examples, the angular stroke of the plurality of blades 154 between the feather position and the reverse position is, for example, approximately 120°. The plurality of blades 154 can be moved to any position or any angle between the feather position and the reverse position depending on the phase of flight to improve (e.g., optimize) efficiency of the unducted fan propulsor 110 (FIG. 12). In some examples, one or more stops or limits are provided to prevent the plurality of blades 154 from being rotated beyond the two end positions. In other examples, the fan actuation system 300 can be configured to provide a greater stroke or a lesser stroke and/or the end positions may be different.

A hydraulic system supplies a hydraulic fluid (e.g., oil) to one or more hydraulic chambers of the one or more actuators 314 to move the hydraulic cylinder 316 and the piston 318 to pitch the plurality of blades 154. An exemplary hydraulic system and hydraulic chambers are detailed below with respect to FIG. 15. The plurality of trunnions 304 is disposed in FIG. 14 such that the plurality of blades 154 is in the first end position (e.g., the feather position). The pressure of the hydraulic fluid in the one or more hydraulic chambers can be increased to move the hydraulic cylinder 316 in a first direction and to move the piston 318 in a second direction such that the plurality of trunnions 304 move the plurality of blades 154 from the feather position towards the reverse position (e.g., the second end position). For example, the hydraulic cylinder 316 can move axially aftward (e.g., to the right in FIG. 14) and the piston 318 can move axially forward (e.g., to the left in FIG. 14) when the pressure of the hydraulic fluid is increased. To move the plurality of blades 154 from the reverse position to the feather position, the pressure of the hydraulic fluid in the one or more hydraulic chambers can be decreased to move the hydraulic cylinder 316 in the second direction (e.g., axially forward) and to move the piston 318 in the first direction (e.g., axially aftward).

As the hydraulic cylinder 316 moves axially along the axial direction A, the hydraulic cylinder 316 causes the forward unison ring 308 to move, thereby causing the plurality of forward trunnion links 306*a* to pivot and to pitch the plurality of trunnions 304, and, therefore, pitching the plurality of blades 154 about the pitch axis P. At the same time, movement of the piston 318 along the axial direction A causes the aft unison ring 310 to move, thereby, causing the plurality of aft trunnion links 306*b* to pivot in an opposite direction as the forward trunnion links 306*a*, and, therefore, pitching the plurality of blades 154 about the pitch axis P. In this way, the fan actuation system 300 translates linear motion of the one or more actuators 314 (e.g., along the axial direction A) into rotational motion of the plurality of blades 154. Such a configuration enables a compact and lightweight design of the fan actuation system 300. Further, each of the hydraulic cylinder 316 and the piston 318 provides only half of the force needed to actuate the plurality of trunnions 304 and provides a redundant path in the event that one of the hydraulic cylinder 316 or the piston 318 fails.

Figure 15:
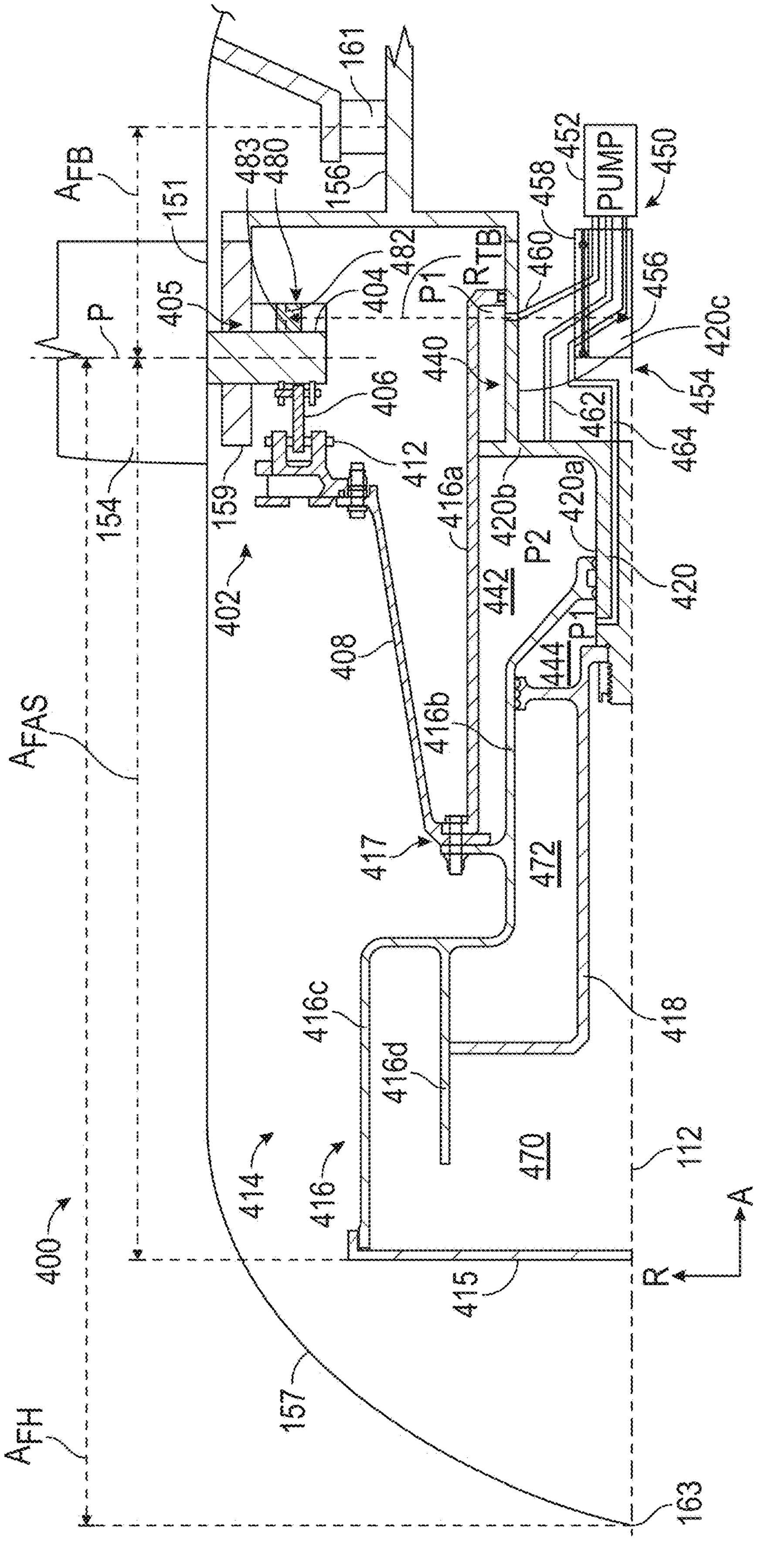
FIG. 15 is a schematic cross-sectional view of a fan actuation system for an unducted fan propulsor, according to another embodiment.

FIG. 15 is a schematic cross-sectional view of a fan actuation system 400 for an unducted fan propulsor, according to another embodiment. The fan actuation system 400 is shown as being utilized in the unducted fan propulsor 110 of FIG. 12 but can be utilized in the unducted fan propulsor 38 of FIGS. 1 to 11. Only the top half of the fan actuation system 400 is shown in FIG. 15. However, the fan actuation system 400 is symmetrical about the longitudinal centerline axis 112. The fan actuation system 400 may also be referred to as a fan pitch actuation system (FPAS). The fan actuation system 400 controls the pitch (e.g., angle, orientation) of the plurality of blades 154 about the pitch axis P. In some examples, the fan actuation system 400 can move the blades 154 between a first end position and a second end position.

FIG. 15 shows the fan shaft 156 of the unducted fan propulsor 110 (FIG. 12). The fan shaft 156 is coupled to, and driven by, the LP shaft 138 (FIG. 12). One or more fan bearings 161 support rotation of the fan shaft 156. The one or more fan bearings 161 can include roller bearings, tapered roller bearings, ball bearings, or the like. The one or more fan bearings 161 are disposed aft of the disk 159. As shown in FIG. 5, the disk 159 is coupled to (e.g., directly or indirectly), and driven by, the fan shaft 156. Each of the plurality of blades 154 is coupled to, and extends radially outward from, the disk 159. Therefore, as the fan shaft 156 is rotated (via the LP shaft 138), the fan shaft 156 rotates the disk 159, which rotates the plurality of blades 154 to generate thrust. The fan hub 157 (shown schematically in FIG. 15) includes a fan hub tip 163 that defines an axially forward-most point of the fan hub 157.

The fan actuation system 400 includes a trunnion mechanism 402 including a plurality of trunnions 404. Each blade 154 is coupled to a respective one of the plurality of trunnions 404. The plurality of trunnions 404 extends through an opening 405 in the disk 159. The plurality of trunnions 404 is rotatable in the opening 405. This enables the plurality of blades 154 to rotate about the pitch axis P. As such, the pitch of the plurality of blades 154 can be changed relative to the flow of the volume of air through the fan 152. In particular, the plurality of blades 154 can be rotated (e.g., pitched) to any position between the first end position (e.g., the feather position) and the second end position (e.g., the reverse position). In FIG. 15, the plurality of blades 154 is shown in the feather position. In the feather position, the plurality of blades 154 is substantially aligned with the flow of the volume of air through the fan 152, which reduces resistance or drag. The plurality of blades 154 is typically held in the feather position when the unducted fan propulsor 110 is not operating.

The fan actuation system 400 includes a plurality of trunnion links 406 and a unison ring 408. The plurality of trunnion links 406 is pivotably coupled to the plurality of trunnions 404. For example, each trunnion link 406 is coupled to a respective trunnion 404 and to the unison ring 408. In this way, the unison ring 408 couples the plurality of trunnions 404 together. The plurality of trunnion links 406 is coupled to the unison ring 408 via a plurality of pins 412. In this way, the plurality of trunnions 404 is pivotably coupled to the unison ring 408 such that the plurality of trunnions 404, and, thus, the plurality of blades 154, can pivot about the pitch axis P in unison, as detailed further below.

The fan actuation system 400 includes one or more actuators 414 that include a hydraulic cylinder 416, a piston 418, and a piston retainer 420. The piston retainer 420 is coupled (e.g., bolted) to the fan shaft 156 such that the piston retainer 420 rotates with the fan shaft 156. Therefore, the piston retainer 420 is coupled (e.g., indirectly) to, and rotated by, the LP shaft 138 (FIG. 12). Also, the piston 418 is coupled to, and extends in a forward direction, from the piston retainer 420. Therefore, the piston 418 also rotates with the piston retainer 420 and the fan shaft 156. The hydraulic cylinder 416 also rotate with the piston retainer 420 and the piston 418 but is axially slidable relative to the piston retainer 420 and the piston 418, as disclosed in further detail herein. In some examples, the hydraulic cylinder 416 is disposed within the fan hub 157 of the unducted fan propulsor 110.

In the illustrated example of FIG. 15, the piston retainer 420 has a first portion 420*a* (e.g., a post), a second portion 420*b* (e.g., a flange) that extends radially outward from the first portion 420*a*, and a third portion 420*c* (e.g., a shaft) that extends axially from the second portion 420*b*. The third portion 420*c* is coupled (e.g., bolted) to the fan shaft 156. The piston retainer 420 can be constructed as multiple parts coupled (e.g., welded) together or as a single unitary part or component (e.g., a monolithic structure). The piston 418 is coupled to, and extends forward from, the first portion 420*a* of the piston retainer 420.

The hydraulic cylinder 416 is disposed radially outward of (e.g., around, surrounding) the piston retainer 420 and the piston 418. The hydraulic cylinder 416 is keyed to the piston retainer 420. As such, the piston retainer 420 rotates the hydraulic cylinder 416. However, the hydraulic cylinder 416 is slidable along the piston retainer 420 in the axial direction A (left and right in FIG. 15). This movement is used to change the pitch of the plurality of blades 154. The hydraulic cylinder 416 is coupled to the unison ring 408 at a joint 417 such that the hydraulic cylinder 416 is coupled to the plurality of blades 154 via the trunnion mechanism 402. The fan actuation system 400 can be activated to move the hydraulic cylinder 416 axially (left or right in FIG. 15), which causes the plurality of trunnion links 406 to rotate the plurality of trunnions 404, which rotates the plurality of blades 154 about the pitch axis P. As such, movement of the hydraulic cylinder 416 causes all of the blades 154 to rotate (e.g., pitch) simultaneously. When the hydraulic cylinder 416 is moved in a first axial direction (the forward direction, or to the left in FIG. 15), the plurality of blades 154 is rotated to the feather position, and when the hydraulic cylinder 416 is moved in a second axial direction (the rearward direction, or to the right in FIG. 15), the plurality of blades 154 is rotated away from the feather position and toward the reverse position. However, in other examples, the fan actuation system 400 can be configured so that the movement of the hydraulic cylinder 416 is reversed.

The hydraulic cylinder 416 has a first portion 416*a*, a second portion 416*b*, a third portion 416*c*, and a fourth portion 416*d*. The first portion 416*a* extends generally in the axial direction A and is coupled to the unison ring 408 at the joint 417 (e.g., a bolted joint). The second portion 416*b* is disposed radially inward of the first portion 416*a* and is coupled to the first portion 416*a* and to the unison ring 408 at the joint 417. The third portion 416*c* extends forward from the joint 417 (e.g., from the first portion 416*a*, the second portion 416*b*, and the unison ring 408) and forms a pressurized pneumatic chamber 470, disclosed in further detail herein. The fourth portion 416*d* is coupled to, and extends axially within, the third portion 416*c*. The first portion 416*a*, the second portion 416*b*, the third portion 416*c*, and the fourth portion 416*d* form the hydraulic cylinder 416. In some examples, the first portion 416*a*, the second portion 416*b*, the third portion 416*c*, and the fourth portion 416*d* are separate parts or components that are coupled (e.g., welded, bolted) together. In other examples, one or more of the first portion 416*a*, the second portion 416*b*, the third portion 416*c*, and the fourth portion 416*d* can be constructed as a single unitary part or component (e.g., a monolithic structure). In some embodiments, the hydraulic cylinder 416 and the unison ring 408 form a single unitary part or component.

The first portion 416*a* of the hydraulic cylinder 416 is sealingly engaged with (e.g., engaged with a seal to prevent fluid leakage) the third portion 420*c* of the piston retainer 420. The second portion 420*b* of the piston retainer 420 is sealingly engaged with the first portion 416*a* of the hydraulic cylinder 416. The second portion 416*b* of the hydraulic cylinder 416 is sealingly engaged with the first portion 420*a* of the piston retainer 420. The piston 418 is sealingly engaged with the second portion 416*b* and with the fourth portion 416*d* of the hydraulic cylinder 416.

The fan actuation system 400 includes one or more hydraulic chambers defined between the hydraulic cylinder 416, the piston 418, and the piston retainer 420. These hydraulic chamber(s) are used to control the position of the hydraulic cylinder 416, and, thus, to control the pitch of the plurality of blades 154. As shown in FIG. 15, the fan actuation system 400 includes a first hydraulic chamber 440, a second hydraulic chamber 442, and a third hydraulic chamber 444. The first hydraulic chamber 440 is formed or is defined between the first portion 416*a* of the hydraulic cylinder 416, the second portion 420*b* of the piston retainer 420, and the third portion 420*c* of the piston retainer 420. The second hydraulic chamber 442 is formed or is defined between the first portion 416*a* of the hydraulic cylinder 416, the second portion 416*b* of the hydraulic cylinder 416, the first portion 420*a* of the piston retainer 420, and the second portion 420*b* of the piston retainer 420. The third hydraulic chamber 444 is formed or is defined between second portion 416*b* of the hydraulic cylinder 416, an aft end of the piston 418, and the first portion 420*a* of the piston retainer 420. In this example, the first hydraulic chamber 440 and third hydraulic chamber 444 are provided with hydraulic fluid at a first pressure, referred to herein as P1, and the second hydraulic chamber 442 is provided with hydraulic fluid at a second pressure, referred to herein as P2. The first pressure P1 and the second pressure P2 can be any amount depending on the specific design. In some examples, the first pressure P1 and the second pressure P2 can be as high as one thousand pounds per square inch (1000 psi) or even higher. The first pressure P1 and the second pressure P2 can be increased or can be decreased to cause the hydraulic cylinder 416 to move axially forward or axially rearward, thus changing the pitch of the plurality of blades 154. For example, if the force acting on the hydraulic cylinder 416 from the first pressure P1 in the first hydraulic chamber 440 and the third hydraulic chamber 444 is greater than the force acting on the hydraulic cylinder 416 from the second pressure P2 in the second hydraulic chamber 442, the hydraulic cylinder 416 moves (e.g., slides) rearward (axially aftward, or to the right in FIG. 15) along the piston 418 and the piston retainer 420. Conversely, if the force acting on the hydraulic cylinder 416 from the first pressure P1 in the first hydraulic chamber 440 and the third hydraulic chamber 444 is less than the force acting on the hydraulic cylinder 416 from the second pressure P2 in the second hydraulic chamber 442, the hydraulic cylinder 416 moves (e.g., slides) axially forward (to the left in FIG. 15) along the piston 418 and the piston retainer 420. Therefore, the first hydraulic chamber 440 and the third hydraulic chamber 444 receive hydraulic fluid to move the hydraulic cylinder 416 in the rearward direction (e.g., aftward direction) while the second hydraulic chamber 442 receives hydraulic fluid to move the hydraulic cylinder 416 in the forward direction.

The fan actuation system 400 includes a hydraulic system 450 to provide hydraulic fluid, such as oil, to one or more of the hydraulic chambers 440, 442, 444 to control the movement of the hydraulic cylinder 416. The hydraulic system 450 includes a pump 452 to control the first pressure P1 and the second pressure P2. The pump 452 is activated to move the hydraulic fluid into, or out of, the hydraulic chambers 440, 442, 444 to increase or to decrease the first pressure P1 and the second pressure P2, and, therefore, to cause the hydraulic cylinder 416 to move forward or to move rearward. In the illustrated example, the hydraulic system 450 includes an oil transfer bearing 454. The oil transfer bearing 454 includes a fixed portion 456 (e.g., a shaft) with fluid passageways fluidly coupled to the pump 452. The fixed portion 456 is a static component and does not rotate or move axially. The oil transfer bearing 454 includes a sleeve 458 that is rotatable about the fixed portion 456. The hydraulic system 450 includes a first fluid line 460, a second fluid line 462, and a third fluid line 464 fluidly coupled between the oil transfer bearing 454 and the respective hydraulic chambers 440, 442, and 444. The first fluid line 460 is in fluid communication with the first hydraulic chamber 440, the second fluid line 462 is in fluid communication with the second hydraulic chamber 442, and the third fluid line 464 is in fluid communication with the third hydraulic chamber 444. The first fluid line 460, the second fluid line 462, and the third fluid line 464 are coupled to the sleeve 458. The sleeve 458 enables fluid communication among the first fluid line 460, the second fluid line 462, and the third fluid line 464, which are rotating with the fan actuation system 400, and the fixed portion 456 of the oil transfer bearing 454. Thus, the oil transfer bearing 454 enables the hydraulic fluid to be transferred between a stationary component and a rotating component. As disclosed above, the first hydraulic chamber 440 and the third hydraulic chamber 444 are provided with the hydraulic fluid at the same first pressure P1. The oil transfer bearing 454 fluidly couples the hydraulic fluid in the first fluid line 460 and the third fluid lines 464 such that the first hydraulic chamber 440 and the third hydraulic chamber 444 remain at the same first pressure P1.

To move the plurality of blades 154 away from the feather position and toward the reverse position, the pump 452 is activated to increase the first pressure P1 in the first hydraulic chamber 440 and the third hydraulic chamber 444 and to reduce the second pressure P2 in the second hydraulic chamber 442. As a result, the hydraulic cylinder 416 moves in the rearward direction (to the right in FIG. 15). The hydraulic cylinder 416 pushes the plurality of trunnion links 406 rearward (to the right in FIG. 15), which causes the plurality of blades 154 to rotate away from the feather position and toward the reverse position. In this way, the plurality of blades 154 can be moved between the feather position and the reverse position. When the desired position is reached, the pump 452 is deactivated or can otherwise balance the loads on the hydraulic cylinder 416 to maintain the current position. The pump 452 can further increase the first pressure P1 or decrease the second pressure P2 to further move the plurality of blades 154 toward the reverse position. Otherwise, to move the plurality of blades 154 back to the feather position, the pump 452 is activated to reduce the first pressure P1 in the first hydraulic chamber 440 and the third hydraulic chamber 444 or to increase the second pressure P2 in the second hydraulic chamber 442. Thus, the hydraulic system 450 is used to control the position of the hydraulic cylinder 416 for controlling the pitch of the plurality of blades 154 along the pitch axis P. The first pressure P1 being the same in the first hydraulic chamber 440 and the third hydraulic chambers 444 reduces the overall first pressure P1 required to control the hydraulic cylinder 416. In other examples, however, the first hydraulic chamber 440 and the third hydraulic chamber 444 can be pressurized at different pressures.

The pressurized pneumatic chamber 470 is formed or is defined by the third portion 416*c* of the hydraulic cylinder 416 and the piston 418. The pressurized pneumatic chamber 470 is filled with a pressurized gas. In some examples, the pressurized pneumatic chamber 470 contains pressurized nitrogen. In other examples, the pressurized pneumatic chamber 470 can be filled with another pressurized gas (e.g., air). The pressurized pneumatic chamber 470 is sealed. A such, the volume of the pressurized gas (e.g., nitrogen) in the pressurized pneumatic chamber 470 does not change. During manufacture or assembly of the fan actuation system 400, the pressurized pneumatic chamber 470 can be charged with gas (e.g., nitrogen) and then sealed. The pressurized pneumatic chamber 470 can be pressurized to any amount depending on the size of the pressurized pneumatic chamber 470 and on the size of the hydraulic chambers 440, 442, 444 and the desired biasing force. In some examples, the pressure in the pressurized pneumatic chamber 470 is in a range of seven hundred twenty pounds per square inch to nine hundred twenty pounds per square inch (720 psi to 920 psi). In other examples, however, the pressure may be less than, or greater than, these exemplary values.

The pressurized gas in the pressurized pneumatic chamber 470 generates a constant force or a constant load that biases the hydraulic cylinder 416 in the forward direction (to the left in FIG. 15), which corresponds to the feather position of the plurality of blades 154. This provides a failsafe to move the plurality of blades 154 to the feather position in an event of failure of the hydraulic system 450 or a shutdown of the unducted fan propulsor 110. For example, if the hydraulic system 450 or the unducted fan propulsor 110 fails or is shut down, the hydraulic system 450 is not able to provide pressurized hydraulic fluid to the hydraulic chambers 440, 442, and 444 to control or to maintain the position of the hydraulic cylinder 416. In such an instance, the force on the hydraulic cylinder 416 from the pressurized gas in the pressurized pneumatic chamber 470 overcomes the force on the hydraulic cylinder 416 from the first hydraulic chamber 440 and the third hydraulic chamber 444. As such, the hydraulic cylinder 416 moves in the forward direction (to the left in FIG. 15), which moves the plurality of blades 154 to the feather position shown in FIG. 15. As such, the pressurized pneumatic chamber 470 provides a passive system that moves the plurality of blades 154 to the feather position in the event of a failure or a deactivation of the hydraulic system 450, which may occur if the unducted fan propulsor 110 fails or is shut down. Therefore, if one of the unducted fan propulsors of the aircraft fails or is deactivated during flight, the fan actuation system 400 automatically moves the plurality of blades 154 to the feather position (FIG. 15). This is advantageous because, in the feather position, the plurality of blades 154 produces less resistance, which reduces drag on the unducted fan propulsor 110 and on the aircraft. This also reduces or prevents the plurality of blades 154 from spinning (due to incoming airflow) the internal turbo-machinery parts of the unducted fan propulsor 110.

The example pressurized pneumatic chamber 470 is advantageous because the pressurized pneumatic chamber 470 has a high load capability due to the compressibility of the pneumatic gas (e.g., nitrogen). Further, the pressurized pneumatic chamber 470 enables a longer travel of the hydraulic cylinder 416 with relatively little change in load. Therefore, the pressurized pneumatic chamber 470 provides a relatively constant load throughout the stroke. Also, the volume and areas of the pressurized pneumatic chamber 470 and the piston 418 can be varied to optimize the load versus travel of the hydraulic cylinder 416.

Therefore, during normal operation of the fan actuation system 400, the first hydraulic chamber 440 and the third hydraulic chamber 444 act to bias the hydraulic cylinder 416 in the rearward direction, while the second hydraulic chamber 442 and the pressurized pneumatic chamber 470 act to bias the hydraulic cylinder 416 in the forward direction. The pressures in the hydraulic chambers 440, 442, and 444 and in the pressurized pneumatic chamber 470 can be controlled to substantially balance the forces and to maintain the hydraulic cylinder 416 in a desired position. In the illustrated example of FIG. 15, a chamber 472 is formed or is defined between the hydraulic cylinder 416 and the piston 418. The chamber 472 is vented to the atmosphere. As such, the chamber 472 does not provide a force in either direction. In this example, the pressurized pneumatic chamber 470 is forward of the piston retainer 420 and the piston 418. In some examples, this is beneficial because there is additional space forward of these components. In other examples, however, the pressurized pneumatic chamber 470 can be disposed rearward of the piston 418 and the piston retainer 420.

In the example of FIG. 15, the fan actuation system 400 is devoid of a pitch lock device and counterweights for reducing inertial loading associated with rotation of fan blades. In particular, in known fan actuation systems, a separate pitch lock device is required to hold the plurality of blades 154 once the plurality of blades 154 is in the feather position. Further, in known fan actuation systems, a counterweight is used to provide additional force to help pitch the fan blades. However, with the fan actuation system 400, the pressurized pneumatic chamber 470 provides a constant biasing force to hold the plurality of blades 154 in the feather position, which eliminates the need for a separate pitch lock device. Further, the hydraulic system 450 provides the first pressure P1 in both the first hydraulic chamber 440 and the third hydraulic chamber 444 to provide a higher pressure to pitch the blades 154, which eliminates the need for a counterweight. This reduces parts, complexity, weight, and costs of the fan actuation system 400.

Examples have been disclosed herein that improve the ability for the fan actuation system 400 to move the blades 154 to the feather position in the event of failure of the fan actuation system 400 or a shutdown of the unducted fan propulsor 110. The example systems disclosed herein are passive and, thus, do not require complicated activation components or control systems. The example pressurized pneumatic chamber 470 is capable of handling high rotational speeds and a large variation in operating temperatures, such as encountered during use on aircraft. The examples disclosed herein also eliminate the need for a pitch lock device. As such, the example systems can result in fewer parts, less complexity, reduced weight, and lower costs compared to known systems. The fan actuation system 400 is particularly useful in turbofan engines (e.g., the unducted fan propulsor 110 of FIG. 12) in which the space for the fan actuation system 400 is smaller as compared to turboprop engines. Components of the fan actuation system 400 can be used in combination with any of the fan actuation systems disclosed herein.

The unducted fan propulsor 110 also includes one or more thrust bearings, also referred to as one or more radial thrust (radial blade load) bearings 480, disposed between the trunnion 404 and the disk 159 such that the trunnion 404 rotates about the pitch axis P with respect to the disk 159. The one or more radial thrust bearings 480 transmit the load (the radial blade load) from the respective blade 154 to a static structure of the unducted fan propulsor 110. In particular, the radial thrust bearings 480 include a plurality of rolling elements 482. The rolling elements 482 can include, for example, ball bearings, tapered roller bearings, or the like, for transmitting the radial blade load from the blade 154 to the static structure.

The one or more radial thrust bearings 480 are disposed radially at a thrust bearing radius $R_{TB}$. The thrust bearing radius $R_{TB}$ is defined in the radial direction R from the longitudinal centerline axis 112 to a radial center 483 of the one or more radial thrust bearings 480. The radial center 483 is a center of the radial thrust bearings 480 in the radial direction R. Particularly, the radial center 483 is defined as a radial center of the rolling elements 482. The amount of space, or the volume, beneath the fan 152 that is available for the fan actuation system 400 is defined by the thrust bearing radius $R_{TB}$. The fan actuation system 400 needs to be accommodated radially below the one or more radial thrust bearings 480 and within the thrust bearing radius $R_{TB}$.

The unducted fan propulsor 110 includes a fan hub axial length $A_{FH}$, a fan actuation system axial length $A_{FAS}$, and a fan bearing axial length $A_{FB}$. The fan hub axial length $A_{FH}$ is an axial length, in the axial direction (e.g., parallel with the longitudinal centerline axis 112) from the fan hub tip 163 to the pitch axis P of the blades 154. The fan actuation system axial length $A_{FAS}$ is an axial length, in the axial direction (e.g., parallel with the longitudinal centerline axis 112), from an axially forward-most surface 415 of the fan actuation system 400 to the pitch axis P of the blades 154. In FIG. 15, the axially forward-most surface 415 is defined by an axially forward-most surface of the actuators 414 (e.g., of the hydraulic cylinder 416). The fan actuation system axial length $A_{FAS}$ is a maximum of 80% of the fan hub axial length $A_{FH}$. In this way, the fan actuation system 400 fits within the fan hub 157 such that the actuators 414 can move axially without contacting the fan hub 157. The fan bearing axial length $A_{FB}$ is an axial length, in the axial direction (e.g., parallel with the longitudinal centerline axis 112) from the pitch axis P of the blades 154 to an axial center of the fan bearings 161.

Figure 16:
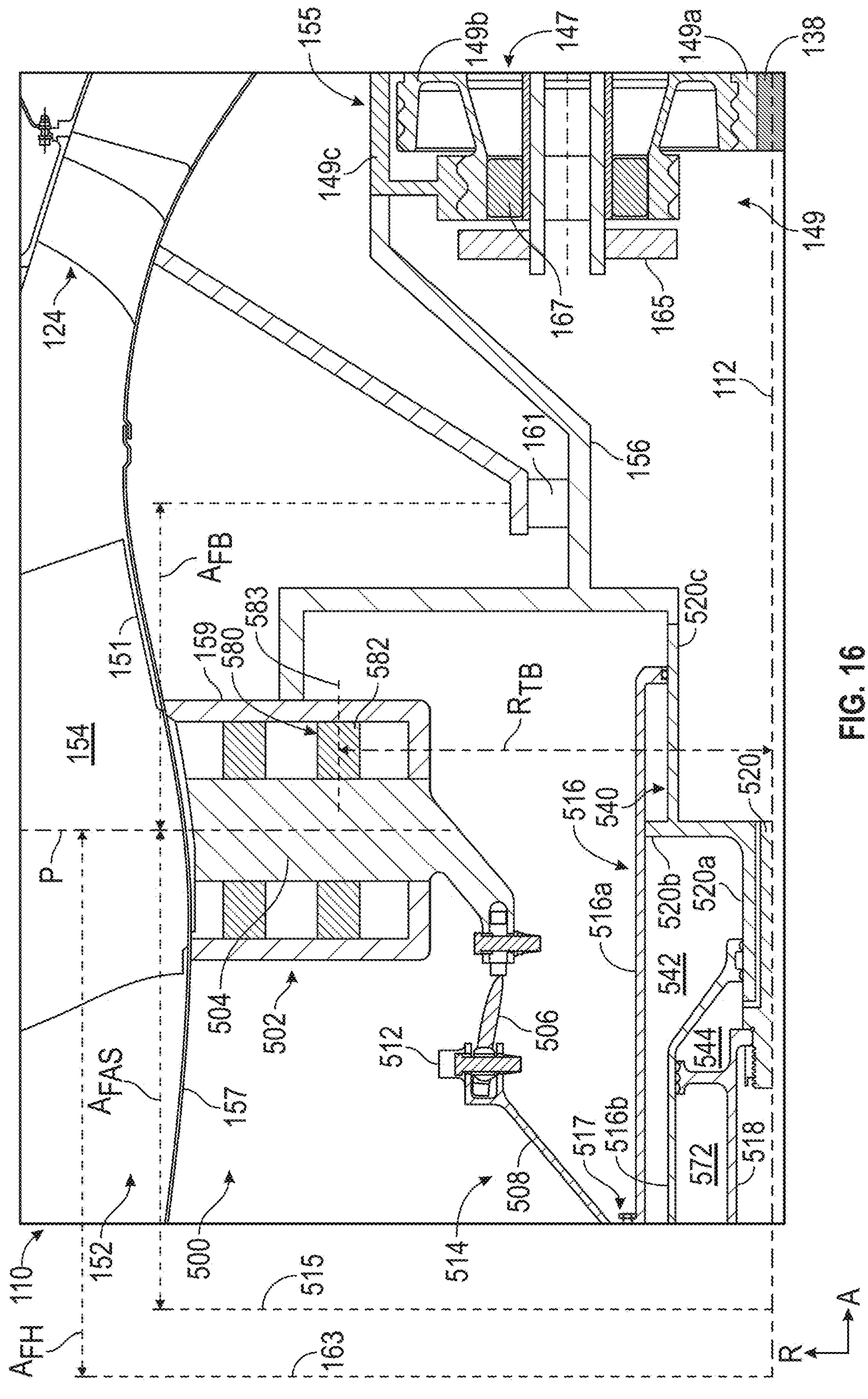
FIG. 16 is a schematic cross-sectional view of a fan actuation system for the unducted fan propulsor, taken along the longitudinal centerline axis of the unducted fan propulsor, according to the present disclosure.

FIG. 16 is a schematic cross-sectional view of a fan actuation system 500 for the unducted fan propulsor 110, taken along the longitudinal centerline axis 112 of the unducted fan propulsor 110, according to the present disclosure. The fan actuation system 500 is substantially similar to the fan actuation system 400 of FIG. 15. The same reference numerals will be used for components of the fan actuation system 500 that are the same as or similar to the components of the fan actuation system 400 discussed above. The description of these components above also applies to this embodiment, and a detailed description of these components is omitted here.

The fan actuation system 500 includes a trunnion mechanism 502, a plurality of trunnions 504, a plurality of trunnion links 506, a unison ring 508, a plurality of pins 512, one or more actuators 514, a hydraulic cylinder 516, a joint 517, a piston 518, and a piston retainer 520. The hydraulic cylinder 516 has a first portion 516*a* and a second portion 516*b*. Although not shown in the view of FIG. 16, the hydraulic cylinder 516 also includes a third portion and a fourth portion similar to the third portion 416*c* and the fourth portion 416*d* of the hydraulic cylinder 416 of FIG. 15. The piston retainer 520 has a first portion 520*a*, a second portion 520*b*, and a third portion 520*c*. The fan actuation system 500 also includes a first hydraulic chamber 540, a second hydraulic chamber 542, a third hydraulic chamber 544, and a pressurized pneumatic chamber (not shown in the view of FIG. 16), and a chamber 572. The first hydraulic chamber 540 and the third hydraulic chamber 544 receive the hydraulic fluid at a first pressure P1, and the second hydraulic chamber 542 receives the hydraulic fluid at a second pressure P2, as detailed above with respect to FIG. 15. The fan actuation system 500 operates substantially similar as to the fan actuation system 400 of FIG. 15.

FIG. 16 shows one blade 154 of the fan 152, the core inlet 124, and the gearbox assembly 155. The gearbox assembly 155 includes a gear assembly 147 having a plurality of gears 149 including a first gear 149*a*, one or more second gears 149*b* secured by a planet carrier 165, and a third gear 149*c*. In FIG. 16, the first gear 149*a* is a sun gear, the one or more second gears 149*b* are planet gears, and the third gear 149*c* is a ring gear. The gear assembly 147 is an epicyclic gear assembly. When the gear assembly 147 is an epicyclic gear assembly, the one or more second gears 149*b* include a plurality of second gears 149*b* (e.g., two or more second gears 149*b*).

In the epicyclic gear assembly, the gear assembly 147 can be in a star arrangement or a rotating ring gear type gear assembly (e.g., the third gear 149*c* is rotating and the planet carrier 165 is fixed and stationary). In such an arrangement, the fan 152 is driven by the third gear 149*c*. For example, the third gear 149*c* is coupled to the fan shaft 156 such that rotation of the third gear 149*c* causes the fan shaft 156, and, thus, the fan 152, to rotate. In this way, the third gear 149*c* is an output of the gear assembly 147. However, other suitable types of gear assemblies may be employed. In one non-limiting embodiment, the gear assembly 147 is a planetary arrangement, in which the third gear 149*c* is held fixed, with the planet carrier 165 allowed to rotate. In such an arrangement, the fan 152 is driven by the planet carrier 165. For example, the planet carrier 165 is coupled to the fan shaft 156 such that rotation of the planet carrier 165 causes the fan shaft 156, and, thus, the fan 152, to rotate. In this way, the one or more second gears 149*b* (e.g., via the planet carrier 165) are the output of the gear assembly 147. In another non-limiting embodiment, the gear assembly 147 may be a differential gear assembly in which the third gear 149*c* and the planet carrier 165 are both allowed to rotate. While an epicyclic gear assembly is detailed herein, the gear assembly can include any type of gear assembly including, for example, a single stage gear assembly or a compound gear assembly (e.g., a gear assembly having a plurality of stages).

The plurality of gears 149 includes one or more gear bearings 167 disposed therein. For example, the one or more second gears 149*b* each includes one or more gear bearings 167 disposed therein. The one or more gear bearings 167 enable the plurality of gears 149 to rotate about the one or more gear bearings 167 such that the plurality of gears 149 rotates. The one or more gear bearings 167 can include any type of bearing for a gear, such as, for example, journal bearings, roller bearings, or the like. The gearbox assembly 155 can include a plurality of gear bearings that includes a forward gear bearing and an aft gear bearing. The one or more gear bearings 167 shown in the view of FIG. 16 are the forward gear bearing.

The first gear 149*a* is coupled to an input shaft of the unducted fan propulsor 110. For example, the first gear 149*a* is coupled to the LP shaft 138 such that rotation of the LP shaft 138 causes the first gear 149*a* to rotate. Radially outward of the first gear 149*a*, and intermeshing therewith, is the one or more second gears 149*b* that are coupled together and supported by the planet carrier 165. The planet carrier 165 supports and constrains the one or more second gears 149*b* such that the each of the one or more second gears 149*b* is enabled to rotate about a corresponding axis of each second gear 149*b* without rotating about the periphery of the first gear 149*a*. Radially outwardly of the one or more second gears 149*b*, and intermeshing therewith, is the third gear 149*c*, which is an annular ring gear. The third gear 149*c* is coupled via an output shaft to the fan 152 and rotates to drive rotation of the fan 152 about the longitudinal centerline axis 112. For example, the fan shaft 156 is coupled to the third gear 149*c*.

The fan shaft 156 is coupled to the disk 159 such that rotation of the fan shaft 156 causes the plurality of blades 154 to rotate about the longitudinal centerline axis 112. The unducted fan propulsor 110 also includes one or more radial thrust bearings 580, disposed between the trunnion 504 and the disk 159 such that the trunnion 504 rotates about the pitch axis P with respect to the disk 159. In particular, the radial thrust bearings 580 include a plurality of rolling elements 582.

The one or more radial thrust bearings 580 are disposed radially at the thrust bearing radius $R_{TB}$ defined in the radial direction R from the longitudinal centerline axis 112 to a radial center 583 of the one or more radial thrust bearings 580, as discussed above. The fan actuation system axial length $A_{FAS}$ is an axial length, in the axial direction (e.g., parallel with the longitudinal centerline axis 112), from an axially forward-most surface 515 (shown schematically in FIG. 16) of the fan actuation system 500 to the pitch axis P of the blades 154.

Figure 17:
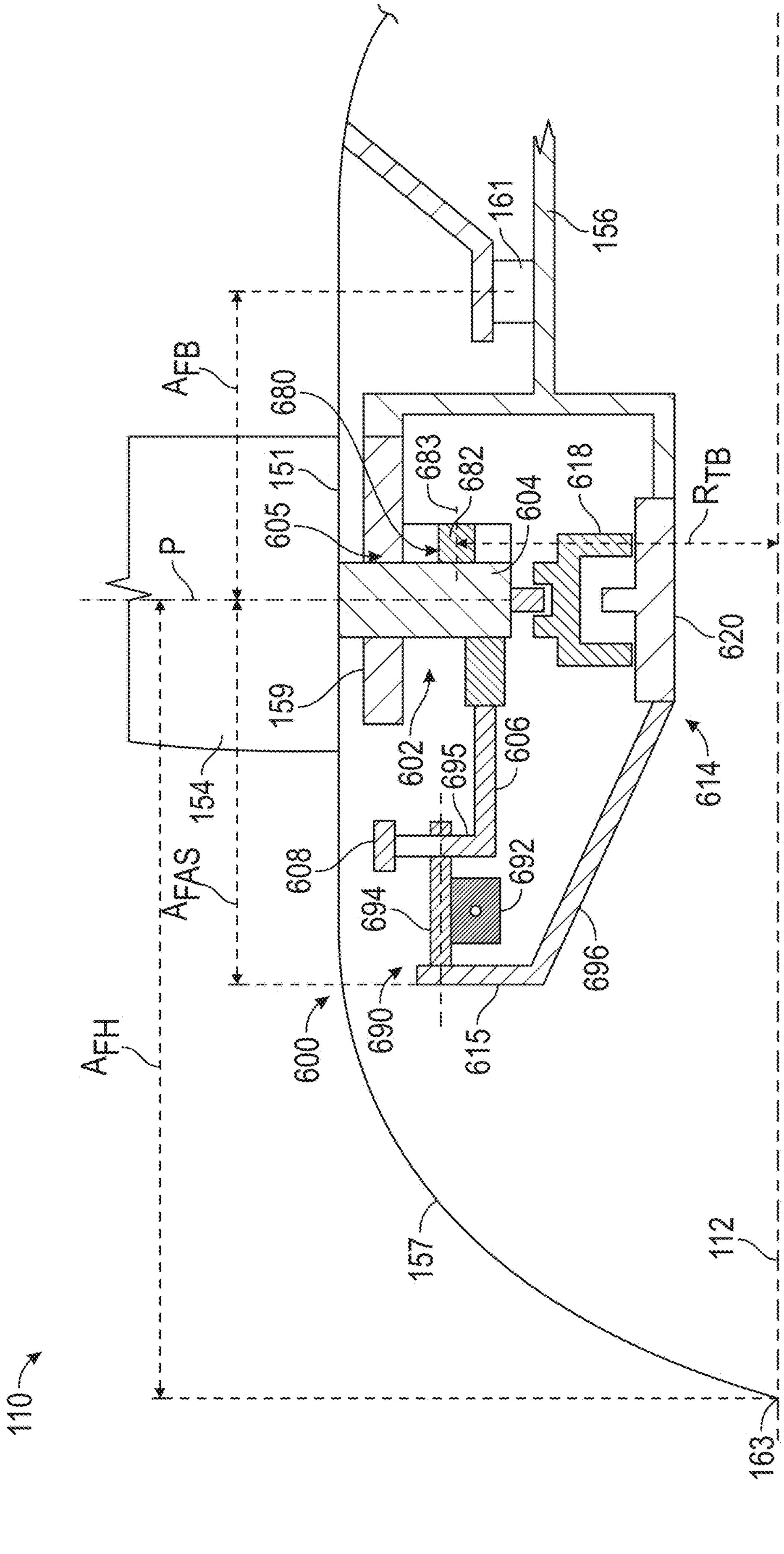
FIG. 17 is a schematic cross-sectional view of a fan actuation system for the unducted fan propulsor, taken along the longitudinal centerline axis of the unducted fan propulsor, according to another embodiment.

FIG. 17 is a schematic cross-sectional view of a fan actuation system 600 for the unducted fan propulsor 110, taken along the longitudinal centerline axis 112 of the unducted fan propulsor 110, according to the present disclosure. The fan actuation system 600 is substantially similar to the fan actuation system 400 of FIG. 15. The same or similar reference numerals will be used for components of the fan actuation system 600 that are the same as or similar to the components of the fan actuation system 400 discussed above. The description of these components above also applies to this embodiment, and a detailed description of these components is omitted here.

The fan actuation system 600 includes a trunnion mechanism 602, a plurality of trunnions 604, an opening 605, one or more trunnion links 606, a unison ring 608, one or more actuators 614, an axially forward-most surface 615, a piston 618, a piston retainer 620, and one or more radial thrust bearings 680. The piston retainer 620 is stationary (e.g., coupled to a static structure of the unducted fan propulsor 110) and the piston 618 moves with respect to the piston retainer 620 to change a pitch of the blades 154. For example, the piston 618 can be coupled to a hydraulic cylinder that receives hydraulic fluid for moving the piston 618, as detailed above. The one or more trunnion links 606 include one or more ring gears that mesh with a corresponding gear of the trunnions 604.

The fan actuation system 600 also includes a counterweight assembly 690 including one or more counterweights 692. The counterweights 692 are axially spaced from the trunnions 604 to counter a centrifugal twisting moment of the blades 154. The counterweights 692 can be any high-density mass that can rotate about a counterweight centerline. The counterweights 692 can have offset masses that are movable relative to the counterweight centerline. In particular, the counterweights 692 are coupled to one or more counterweight shafts 694 that are drivingly coupled to the trunnion links 606 via one or more counterweight gears 695. The counterweight shafts 694 are supported by one or more counterweight support members 696 that are coupled to the piston retainer 620. In FIG. 17, the axially forward-most surface 615 is defined by an axially forward-most surface of the counterweight support member 696. In this way, the axially forward-most surface 615 is defined by the counterweight assembly 690.

As the trunnions 604 rotate, the trunnions 604 cause the trunnion links 606 to rotate with respect to the unison ring 608, and in turn, the trunnion links 606 cause the counterweight shafts 694 to rotate. As the trunnion links 606 and the counterweight shafts 694 rotate, the counterweights 692 rotate via the counterweight shafts 694. In this way, the counterweights 692 change position relative to the counterweight centerline. Thus, the counterweight assembly 690 counters a centrifugal twisting moment of the blades 154 to help rotate the blades 154 when the pitch of the blades 154 changes.

A mass of the counterweights 692 can be changed based on a length of the counterweight shafts 694. In particular, the counterweights 692 can have less mass with longer counterweight shafts 694 and can have more mass with shorter counterweight shafts 694. In this way, the axially further the counterweights 692 are disposed from the pitch axis P of the blades 154, the lesser mass the counterweights 692 can have, while still countering the centrifugal twisting moment of the blades 154 and helping to rotate the blades 154 when the pitch of the blades 154 changes. Accordingly, the mass of the counterweights 692 needed to pitch the blades 154 and counter the twisting moment is a function of the axial position of the counterweights 692 with respect to the pitch axis P.

The one or more radial thrust bearings 680 are disposed radially at the thrust bearing radius $R_{TB}$ defined in the radial direction R from the longitudinal centerline axis 112 to a radial center 683 of a plurality of rolling elements 682 of the radial thrust bearings 680, as discussed above. The fan actuation system axial length $A_{FAS}$ is an axial length, in the axial direction (e.g., parallel with the longitudinal centerline axis 112), from an axially forward-most surface 615 of the fan actuation system 600 to the pitch axis P of the blades 154.

Figure 18:
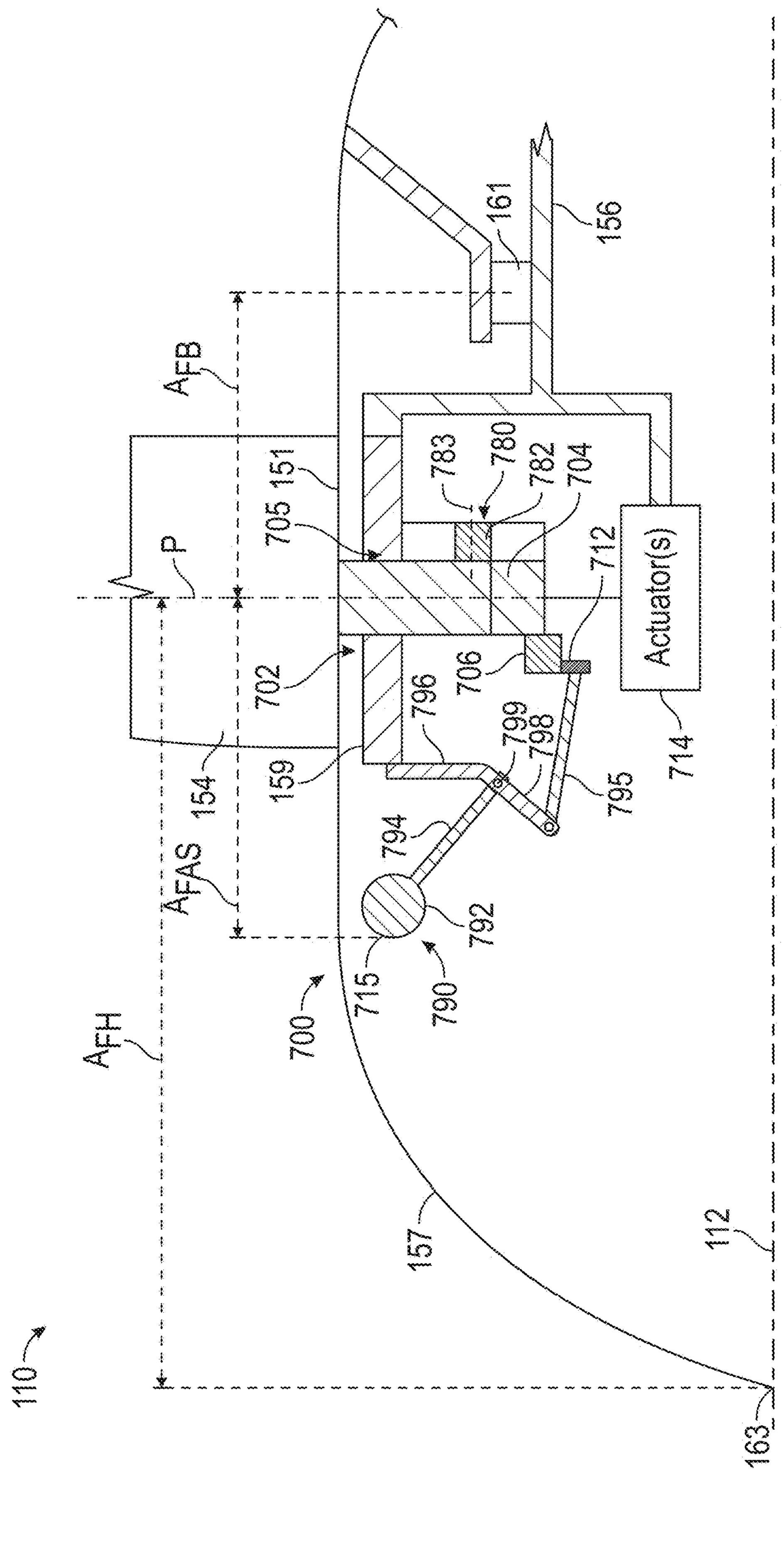
FIG. 18 is a schematic cross-sectional view of a fan actuation system for the unducted fan propulsor, taken along the longitudinal centerline axis of the unducted fan propulsor, according to another embodiment.

FIG. 18 is a schematic cross-sectional view of a fan actuation system 700 for the unducted fan propulsor 110, taken along the longitudinal centerline axis 112 of the unducted fan propulsor 110, according to the present disclosure. The fan actuation system 700 is substantially similar to the fan actuation system 600 of FIG. 17. The same or similar reference numerals will be used for components of the fan actuation system 700 that are the same as or similar to the components of the fan actuation system 600 discussed above. The description of these components above also applies to this embodiment, and a detailed description of these components is omitted here.

The fan actuation system 700 includes a trunnion mechanism 702, a plurality of trunnions 704, an opening 705, one or more trunnion links 706, a plurality of pins 712, one or more actuators 714 (shown schematically in FIG. 18), an axially forward-most surface 715, and one or more radial thrust bearings 780. The actuators 714 can include any of the actuators disclosed herein for changing a pitch of the blades 154. The one or more trunnion links 706 include arms that extend from the trunnions 704. The pins 712 extend through the arms and are coupled to a counterweight assembly 790.

The counterweight assembly 790 includes one or more counterweights 792, one or more counterweight shafts 794, and one or more counterweight support members 796. The one or more counterweight support members 796 are coupled to the disk 159 such that the counterweight assembly 790 rotates about the longitudinal centerline axis 112 with rotation of the fan 152. The counterweight assembly 790 also includes one or more link arms 795 and one or more lever arms 798. The one or more lever arms 798 are pivotably coupled to the counterweight support members 796 via a pivot 799. The link arms 795 are coupled to the trunnion links 706 via the pins 712 and are pivotably coupled to the lever arms 798. The counterweight shafts 794 are pivotably coupled to the lever arms 798 at the pivot 799.

In FIG. 18, the axially forward-most surface 715 is defined by an axially forward-most surface of the counterweights 792 at a maximum axial extent of the counterweights 792, as detailed further below. In this way, the axially forward-most surface 715 is defined by the counterweight assembly 790.

As the trunnions 704 rotate, the trunnions 704 cause the trunnion links 706 to rotate, and in turn, the trunnion links 706 cause the pins 712 to rotate, and, thus, cause the link arms 795 to pivot. As the link arms 795 pivot, the link arms 795 cause the lever arms 798 to pivot, and, thus, cause the counterweight shafts 794 to pivot about the pivot 799. In this way, the counterweight shafts 794 cause the counterweights 792 to travel along a partially circular arc radially outward away from the longitudinal centerline axis 112 or radially inward towards the longitudinal centerline axis 112. Thus, the counterweight assembly 790 counters a centrifugal twisting moment of the blades 154 to help rotate the blades 154 when the pitch of the blades 154 changes.

The one or more radial thrust bearings 780 are disposed radially at the thrust bearing radius $R_{TB}$ defined in the radial direction R from the longitudinal centerline axis 112 to a radial center 783 of a plurality of rolling elements 782 of the radial thrust bearings 780, as discussed above. The fan actuation system axial length $A_{FAS}$ is an axial length, in the axial direction (e.g., parallel with the longitudinal centerline axis 112), from an axially forward-most surface 715 of the fan actuation system 700 to the pitch axis P of the blades 154.

Figure 19:
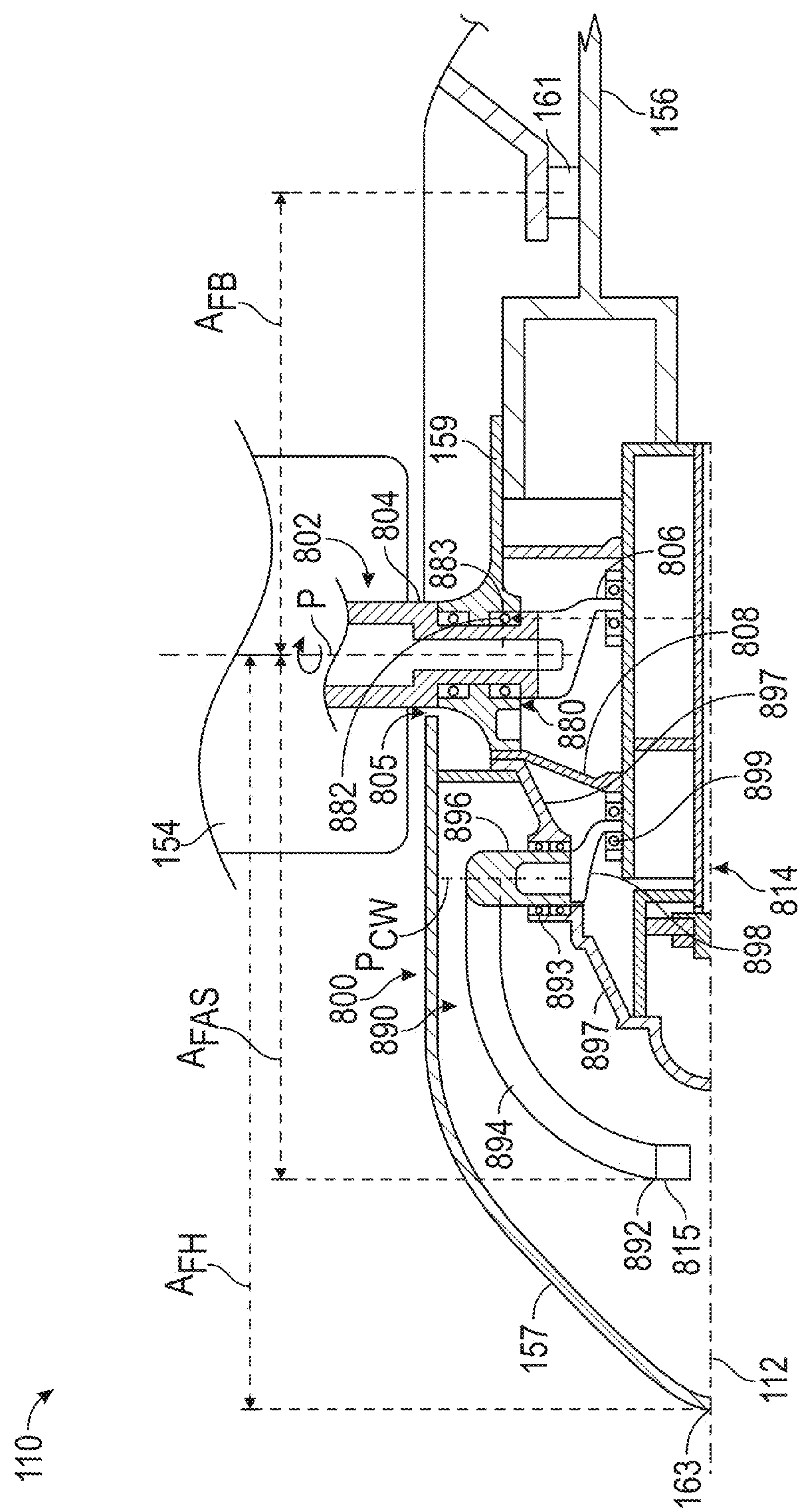
FIG. 19 is a schematic cross-sectional view of a fan actuation system for the unducted fan propulsor, taken along the longitudinal centerline axis of the unducted fan propulsor, according to another embodiment.

FIG. 19 is a schematic cross-sectional view of a fan actuation system 800 for the unducted fan propulsor 110, taken along the longitudinal centerline axis 112 of the unducted fan propulsor 110, according to the present disclosure. The fan actuation system 800 is substantially similar to the fan actuation system 600 of FIG. 17. The same or similar reference numerals will be used for components of the fan actuation system 800 that are the same as or similar to the components of the fan actuation system 600 discussed above. The description of these components above also applies to this embodiment, and a detailed description of these components is omitted here.

The fan actuation system 800 includes a trunnion mechanism 802, a plurality of trunnions 804, an opening 805, one or more trunnion links 806, a unison ring 808, one or more actuators 814, an axially forward-most surface 815, and one or more radial thrust bearings 880. The actuators 814 can include any of the actuators disclosed herein for changing a pitch of the blades 154. The one or more trunnion links 806 and the unison ring 808 couple the trunnions 804 to the actuators 814 such that movement of the actuators 814 causes the trunnions 804 to rotate, thus, causing the blades 154 to rotate about the pitch axis P.

The counterweight assembly 890 includes one or more counterweights 892, one or more counterweight shafts 894, one or more counterweight support members 896, and one or more lever arms 898. In FIG. 19, the counterweight shafts 894 are counterweight levers and the counterweight support members 896 are counterweight trunnions.

The counterweight assembly 890 includes a counterweight hub 897 that may be connected to the disk 159, such that rotation of the disk 159 about the longitudinal centerline axis 112 drives rotation of the counterweight hub 897 about the longitudinal centerline axis 112. The counterweight shafts 894 are rotationally connected to the counterweight hub 897. For example, each of the counterweight shafts 894 may be mounted to the counterweight hub 897 via one or more counterweight bearings 893 that provide the ability for the counterweight shafts 894 to rotate about a counterweight lever rotational axis $P_{CW}$. The counterweight bearings 893 may be any type of bearing (e.g., tapered roller bearings, spherical roller bearings, cylindrical roller bearings, needle roller bearings, thrust ball bearings, angular contact roller bearings, deep groove ball bearings, etc.), and are not limited to any particular type of bearing. Each of the counterweight support members 896 are rotational about a counterweight lever rotational axis $P_{CW}$ that extends through a respective counterweight support member 896 and extends radially (i.e., in the radial direction R) from the longitudinal centerline axis 112.

Each counterweight shaft 894 is a cantilever arm having a first end connected to a respective counterweight support member 896 and a second end offset from the respective counterweight lever rotational axis $P_{CW}$. A respective counterweight 892 is connected to the second end of the counterweight shaft 894. Each counterweight 892 has a counterweight center-of-gravity that is utilized in locating the counterweight 892 within the counterweight assembly 890.

The one or more counterweight support members 896 are coupled to the disk 159 such that the counterweight assembly 890 rotates about the longitudinal centerline axis 112 with rotation of the fan 152. The counterweight assembly 890 also includes one or more lever arms 898 that are rotationally connected to the actuators 814 via one or more lever bearings 899. The lever arms 898 are connected to the counterweight support members 896 such that axial translation of the actuators 814 along the longitudinal centerline axis 112 drives the lever arms 898 and the counterweight support members 896 about the respective counterweight lever rotational axis $P_{CW}$ so as to rotate the counterweight shafts 894. In FIG. 19, the counterweight shafts 894 are at a ninety-degree rotated position.

In FIG. 19, the axially forward-most surface 815 is defined by an axially forward-most surface of the counterweights 892 at a maximum axial extent of the counterweights 892 (e.g., at the ninety-degree rotated position). In this way, the axially forward-most surface 815 is defined by the counterweight assembly 890.

As the actuators 814 move axially, the actuators 814 cause the trunnions 804 and the counterweight support members 896 to rotate. In turn, the counterweight support members 896 cause the counterweight shafts 894 to rotate about the counterweight lever rotational axis $P_{CW}$, and, thus, cause the counterweights 892 to rotate. In particular, the counterweight shafts 894, and the counterweights 892, rotate in to or out of the page between the ninety-degree rotated position that defines a maximum axial extent of the counterweights 892 and a zero-degree rotated position that defines a minimum axial extend of the counterweights 892. Thus, the counterweight assembly 890 counters a centrifugal twisting moment of the blades 154 to help rotate the blades 154 when the pitch of the blades 154 changes.

The one or more radial thrust bearings 880 are disposed radially at the thrust bearing radius $R_{TB}$ defined in the radial direction R from the longitudinal centerline axis 112 to a radial center 883 of a plurality of rolling elements 882 of the radial thrust bearings 880, as discussed above. The fan actuation system axial length $A_{FAS}$ is an axial length, in the axial direction (e.g., parallel with the longitudinal centerline axis 112), from an axially forward-most surface 815 of the fan actuation system 800 to the pitch axis P of the blades 154.

Figure 20:
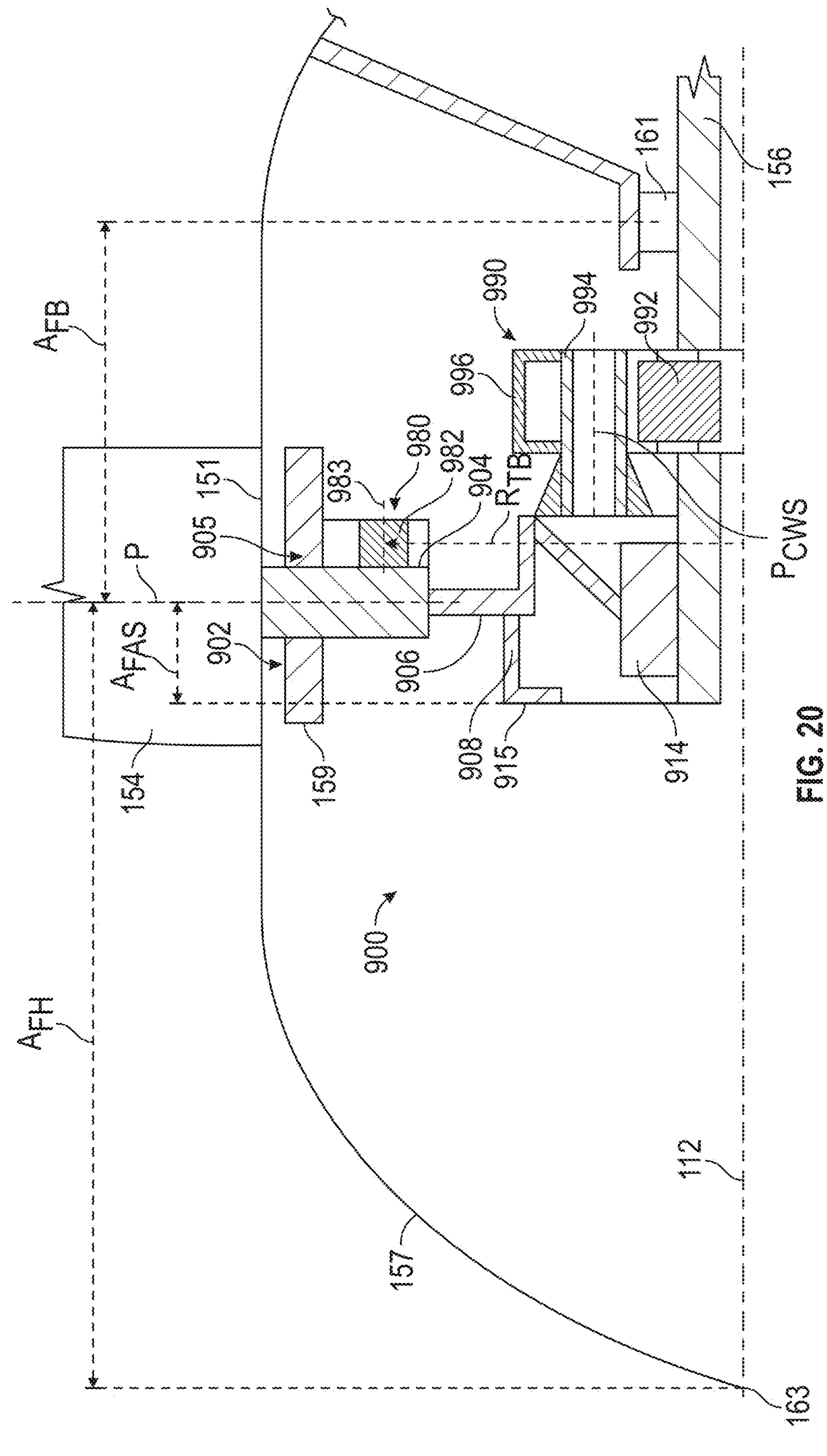
FIG. 20 is a schematic cross-sectional view of a fan actuation system for the unducted fan propulsor, taken along the longitudinal centerline axis of the unducted fan propulsor, according to another embodiment.

FIG. 20 is a schematic cross-sectional view of a fan actuation system 900 for the unducted fan propulsor 110, taken along the longitudinal centerline axis 112 of the unducted fan propulsor 110, according to the present disclosure. The fan actuation system 900 is substantially similar to the fan actuation system 400 of FIG. 15. The same or similar reference numerals will be used for components of the fan actuation system 900 that are the same as or similar to the components of the fan actuation system 400 discussed above. The description of these components above also applies to this embodiment, and a detailed description of these components is omitted here.

The fan actuation system 900 includes a trunnion mechanism 902, a plurality of trunnions 904, an opening 905, one or more trunnion links 906, a unison ring 908, one or more actuators 914, an axially forward-most surface 915, one or more radial thrust bearings 980, and a counterweight assembly 990. The actuators 914 can include any of the actuators disclosed herein for changing a pitch of the blades 154. The one or more trunnion links 906 and the unison ring 908 couple the trunnions 904 to the actuators 914 such that movement of the actuators 914 causes the trunnions 904 to rotate, thus, causing the blades 154 to rotate about the pitch axis P. In FIG. 20, the axially forward-most surface 915 is defined by an axially forward-most surface of the unison ring 908.

The counterweight assembly 990 includes one or more counterweights 992, one or more counterweight shafts 994, and one or more counterweight support members 996. The one or more counterweight support members 996 are coupled to the disk 159 via the unison ring 908 such that the counterweight assembly 990 rotates about the longitudinal centerline axis 112 with rotation of the fan 152. The counterweights 992 are positioned axially aft of the blades 154, particularly, axially aft of the pitch axis P. For example, the counterweights 992 are positioned axially between the pitch axis P and the fan bearings 161.

The counterweight support members 996 act as a carrier for the counterweight shafts 994. The counterweight shafts 994 are aligned generally parallel to the longitudinal centerline axis 112 and pass through the counterweight support members 996. The counterweight shafts 994 are rotatably connected (e.g., via one or more gears) at a first end to the unison ring 908. The counterweights 992 are connected to a second end of the counterweight shafts 994. The counterweight shafts 994, and the counterweights 992, are rotatable relative to the counterweight support members 996, about a respective counterweight shaft axis $P_{CWS}$.

All of the counterweight shafts 994 are meshed via one or more gears with the unison ring 908. Thus connected, the movement of the blades 154, unison ring 908, and the counterweights 992 are linked together such that rotary motion of the unison ring 908, for example, caused by the actuators 914, will cause a simultaneous change in the pitch angle of all of the blades 154, and of the angular orientation of the counterweights 992. The unison ring 908 transmits forces between the blades 154 and the counterweights 992. In this way, the counterweight shafts 994 cause the counterweights 992 to travel along a partially circular arc radially outward away from the longitudinal centerline axis 112 or radially inward towards the longitudinal centerline axis 112, and axially closer to, or axially further from, the pitch axis P. Thus, the counterweight assembly 990 counters a centrifugal twisting moment of the blades 154 to help rotate the blades 154 when the pitch of the blades 154 changes.

The one or more radial thrust bearings 980 are disposed radially at the thrust bearing radius $R_{TB}$ defined in the radial direction R from the longitudinal centerline axis 112 to a radial center 983 of a plurality of rolling elements 982 of the radial thrust bearings 980, as discussed above. The fan actuation system axial length $A_{FAS}$ is an axial length, in the axial direction (e.g., parallel with the longitudinal centerline axis 112), from an axially forward-most surface 915 of the fan actuation system 900 to the pitch axis P of the blades 154.

Further to the problem of mounting an unducted fan propulsor to the aircraft, there is a problem of implementing a variable pitch actuation system within the more limited packaging space available in a turbofan engine while accounting for the significantly higher loading environment and more numerous blades relative to a turboprop engine. The embodiments herein provide for different configurations of the pitch actuation system, fine and coarse pitch actuators, hydraulic actuators, and bearing placement that could sustain the higher loading associated with more numerous blades, higher disk loading, and Mach speed sufficient to satisfy operational and safety requirements in the event of, e.g., loss of hydraulic pressure. Additionally, while it was possible to arrive at such a system after experiments and testing, there was a challenge to determine how to fit the system within a comparatively more limited space of a turbofan engine.

During the course of evaluating the different embodiments as set forth herein, with the goal of providing the necessary force to pitch the fan blades, taking due account for the number of blades, accounting for loss in fluid pressure or generally lost power conditions, aerodynamic performance, cooling, aeromechanics, and disc loading/fan blade loading, etc., the inventors had discovered there was indeed much less space available for this system to operate as required for the engine's pitch actuation system. After evaluating several different architectures of pitch change mechanisms (with and without counterweight, oil transfer devices, fine and coarse pitch system, torque transfer load path for pitching blades and delivery of shaft power from gearbox, etc.—both for a ducted engine and an open fan engine—the inventors discovered, unexpectedly, that there is relationships among the number of fan blades, the fan tip diameter $D_{FT}$, the cruise Mach number, and the thrust bearing radius $R_{TB}$, and an axial length $L_{AXIAL}$ capable of differentiating an architecture that satisfies operational and packaging requirements from an architecture that does not satisfy these requirements. These relationships moreover are capable of uniquely identifying a finite and readily ascertainable number of embodiments suitable for a particular architecture that accounts for the size and the loading requirements needed to pitch the fan blades without overly sacrificing the aerodynamic performance, cooling aeromechanics, and load margins on the fan blades. For example, the cruise Mach number was not expected to be a significant factor, but as discussed further below, the cruise Mach number was found to be a factor and particularly in conjunction with fan diameter at higher Mach numbers. The inventors submit that the relationships enable one to select a size for the fan pitch actuation system that can reduce the size and the weight of the fan pitch actuation system, while accounting for the factors discussed above. The inventors further submit that the relationships can help identify an improved fan efficiency, or penalties to efficiency by choosing one fan pitch actuation system architecture over another. A relationship is referred to as a fan actuation system (FAS) envelope:

$$FAS\text{ envelope} = \frac{N_{FB} \times D_{FT} \times M_{cruise}}{\left(\frac{R_{TB}}{N_{FB}}\right)}$$

$N_{FB}$ is the number of fan blades of the fan, $D_{FT}$ is the fan tip diameter, $M_{cruise}$ is the Mach number at cruise (mid-level power operation), and $R_{TB}$ is the thrust bearing radius of the radial thrust bearings (any of the radial thrust bearings detailed herein). $N_{FB} \times D_{FT} \times M_{cruise}$ is referred to as a loading envelope, and $R_{TB}/N_{FB}$ is referred to as a spacing envelope. Accordingly, the FAS envelope is given by the loading envelope divided by the spacing envelope.

A second relationship is referred to as a fan actuation system length (FASL) envelope:

$$FASL\text{ envelope} = \frac{N_{FB} \times D_{FT}}{L_{AXIAL}\left(\frac{R_{TB}}{N_{FB}}\right)}$$

$N_{FB}$ is the number of fan blades of the fan, $D_{FT}$ is the fan tip diameter, $R_{TB}$ is the thrust bearing radius of the radial thrust bearings, and $L_{AXIAL}$ is an axial length, along the longitudinal centerline axis 112 from the fan hub tip 163 to the fan bearings 161. In particular, $L_{AXIAL}$ is a summation of the fan hub axial length $A_{FH}$ and the fan bearing axial length $A_{FB}$. $N_{FB} \times D_{FT}$ is referred to as a loading envelope, and $L_{AXIAL} \times (R_{TB}/N_{FB})$ is referred to as a spacing envelope. Accordingly, the FASL envelope is given by the loading envelope divided by the spacing envelope.

As discussed further below, the inventors identified a range for the FAS envelope and the FASL envelope that enables a fan actuation system design for different turbofan engine architectures that accounts for the integrity/reliability of load paths needed to pitch the fan blades within the space constraints imposed by a turbofan engine (vs. a turboprop's space constraints). Fan pitch actuation system architectures that fall within this range are believed to satisfy packaging requirements for a turbofan engine, while those architectures that do not fall within the FAS envelope range or the FASL envelope range are believed to not satisfy the packaging requirements, which indicate that the system would be unacceptably large and not result in an aircraft engine that met aero efficiency and weight requirements (i.e., an undesirable engine architecture). Using these unique relationships, the size of the fan actuation system can be selected to achieve a more compact fan pitch actuation system for a turbofan engine. Using the FAS envelope or the FASL envelope as a guide, a fan pitch actuation system can be developed that takes into account the loading associated with pitching of the fan blades based on the size of the fan blades, the number of fan blades, the size of thrust bearing, the cruise Mach number, or the axial length, which factors were found—as a result of the extensive number of architectures considered for different thrust class engines, some successful and some not successful—to largely define the packaging size needed to accommodate a pitch actuation system capable of handling the fan loading environment.

The FAS envelope and the FASL envelope herein provide a fan actuation system having a low fan radius ratio (a ratio of the hub radius of the blades to the tip radius of the blades of the fan) and a high fan blade count. In one example, a low fan radius ratio is in a range from 0.22 to 0.30. This allows the fan diameter to be minimized to meet competing efficiency and installation requirements. Keeping the fan diameter small also allows the unducted fan propulsors to be installed on the wings of the aircraft in the particular locations as detailed above with respect to FIGS. 1 to 11.

TABLE 7 represents exemplary embodiments 103 to 117 and their corresponding FAS envelope and FASL envelope values for various turbofan engines at various cruise Mach numbers. Embodiments 103 to 108, 110, 112 to 114, and 116 to 117 are unducted fan propulsors (e.g., such as the unducted fan propulsor 110 of FIG. 12). Embodiments 109, 111, and 115 are ducted fan propulsors (e.g., ducted engines). In TABLE 7, the FAS envelope values were determined based on the relationship described above, the FASL envelope values were determined based on the relationship described above, and using fan tip diameters $D_{FT}$, thrust bearing radiuses $R_{TB}$, and axial lengths $L_{AXIAL}$ in inches.

TABLE 7

FAS Envelope and FASL Envelope

| Emb. | $N_{FB}$ | $D_{FT}$ (in.) | $R_{TB}$ (in.) | $A_{FH}$ (in.) | $A_{FB}$ (in.) | $M_{cruise}$ | FAS Envelope | FASL Envelope |
|---|---|---|---|---|---|---|---|---|
| 103 | 12 | 156.0 | 26.9 | 60.60 | 21.60 | 0.8 | 668 | 10.2 |
| 104 | 14 | 156.0 | 24.9 | 60.60 | 20.98 | 0.8 | 982 | 15.1 |
| 105 | 14 | 154.0 | 24.7 | 59.82 | 20.92 | 0.8 | 978 | 15.1 |
| 106 | 14 | 153.8 | 24.3 | 59.75 | 20.79 | 0.8 | 992 | 15.4 |
| 107 | 14 | 164.3 | 24.6 | 63.82 | 20.89 | 0.8 | 1047 | 15.5 |
| 108 | 14 | 110.4 | 19.5 | 42.89 | 19.31 | 0.8 | 888 | 17.8 |
| 109 | 12 | 88.7 | 19.0 | 34.46 | 19.15 | 0.9 | 605 | 12.5 |
| 110 | 10 | 120.0 | 14.8 | 46.62 | 17.85 | 0.9 | 730 | 12.6 |
| 111 | 10 | 84.0 | 14.0 | 32.63 | 17.61 | 0.75 | 450 | 11.9 |
| 112 | 18 | 168.0 | 27.0 | 65.26 | 21.63 | 0.9 | 1814 | 23.2 |
| 113 | 10 | 120 | 14.0 | 46.62 | 17.61 | 0.8 | 686 | 13.3 |
| 114 | 14 | 168.0 | 19.0 | 65.26 | 19.15 | 0.88 | 1525 | 20.5 |
| 115 | 10 | 84.0 | 19.0 | 32.63 | 19.15 | 0.8 | 354 | 8.5 |
| 116 | 14 | 120.0 | 27.0 | 46.62 | 21.63 | 0.88 | 767 | 12.8 |
| 117 | 14 | 180.0 | 19.0 | 69.92 | 19.15 | 0.92 | 1708 | 20.8 |

The FAS envelope and the FASL envelope are only valid for an engine with fan blades $N_{FB}$ in a range of from ten to eighteen. In some aspects, the number of fan blades $N_{FB}$ is in a range from ten to sixteen for an open fan engine. In some aspects, the number of fan blades $N_{FB}$ is in ten to fourteen. The number of fan blades $N_{FB}$ affects the volume (e.g., amount of space) circumscribed by the fan blades. Increasing the number of fan blades $N_{FB}$ increases the amount of airflow that the fan can produce for a particular fan tip diameter and fan rotation speed, but a higher $N_{FB}$ also reduces the tangential distance $T_{FB}$ between fan blades at the fan hub, which impacts the available space for pitch actuation of each individual blade, referring to the space needed per blade for pitch levers, gearing, oil transfer devices, related mechanisms for pitching fan blades and size of load bearing parts of the trunnion and related supporting structure capable of carrying the fan blade loads. This space is at a premium because with an increased number of fan blades the loading capability per blade needs to be satisfied within a smaller space compared to an engine with fewer blades (e.g., such as a turboprop engine). The FAS envelope values and the FASL envelope values account for the number of fan blades $N_{FB}$ selected to increase the amount of airflow but without imposing an unrealistically narrow tangential fan blade distance $T_{FB}$ between adjacent fan blades in order to fit within the desired packaging envelope.

The FAS envelope and the FASL envelope are only valid for a fan tip diameter $D_{FT}$ in a range of eighty-four inches to one hundred ninety-two inches (84.0 in. to 192.0 in.). In some aspects, the FAS envelope and the FASL envelope are valid for a fan tip diameter $D_{FT}$ in a range of eighty-four inches to one hundred eighty inches (84.0 in. to 180.0 in.). In some aspects, the FAS envelope and the FASL envelope are valid for a fan tip diameter $D_{FT}$ in a range of eighty-four inches to one hundred sixty-eight inches (84.0 in. to 168.0 in.). The fan tip diameter $D_{FT}$ also affects the volume needed for supporting the fan blades during operation. Increasing the fan tip diameter $D_{FT}$ increases the fan tip speed for a given rotational speed and therefore the load that needs to get reacted at the trunnion, and torque needed in the pitching mechanism for pitching the blade. The radial spacing between blades and within the volume circumscribed by the fan blades (e.g., within the space circumscribed by the radial thrust bearings) decreases, thereby decreasing the volume beneath the fan and providing less space for the load bearing structure that can react the blade loads. Furthermore, as the bearing radius $R_{TB}$ is extended out, the structure supporting the blade at its root needs to be capable of sustaining higher loads because the blade is disposed further from the fan rotation axis. The more robust root results in a larger fan disk, further providing less space underneath the fan for the fan actuation system. In view of these weight and size considerations, as well as the ability to install such fan blades and fans without resulting in unacceptable aero efficiency penalties, the inventors determined that a fan tip diameter $D_{FT}$ should be less than one hundred ninety-two inches (192.0 in.). In some embodiments, the fan tip diameter $D_{FT}$ should be less than one hundred eighty inches (180.0 in.). In some embodiments, the fan tip diameter $D_{FT}$ should be less than one hundred sixty-eight inches (168.0 in.). The fan tip diameter $D_{FT}$ may therefore be limited as the fan tip diameter $D_{FT}$ impacts the space available for a pitch actuation system suitable for carrying fan blade loads. In some aspects, the fan tip diameter $D_{FT}$ is in a range of eighty-four inches to one hundred twenty inches (84.0 in. to 120.0 in.). In some aspects, the fan tip diameter $D_{FT}$ is in a range of one hundred twenty inches to one hundred ninety-two inches (120.0 in. to 192.0 in.). In some aspects, the fan tip diameter $D_{FT}$ is in a range of one hundred twenty inches to one hundred eighty inches (120.0 in. to 180.0 in.). In some aspects, the fan tip diameter $D_{FT}$ is in a range of one hundred twenty inches to one hundred sixty-eight inches (120.0 in. to 168.0 in.).

The FAS envelope and the FASL envelope are only valid for a thrust bearing radius $R_{TB}$ in a range of ten inches to twenty-seven inches (10 in. to 27 in.). In some aspects, the thrust bearing radius $R_{TB}$ is in a range of twelve inches to twenty-seven inches (12 in. to 27 in.). In some aspects, the thrust bearing radius $R_{TB}$ is in a range of fourteen inches to twenty-seven inches (14 in. to 27 in.). The thrust bearing radius $R_{TB}$ defines the amount of space, or the volume available for the fan actuation system. Increasing the thrust bearing radius $R_{TB}$ provides more space for the fan actuation system but sacrifices aerodynamic performance by making the fan radius ratio (i.e., the ratio of the fan hub radius to the fan blade radius) larger. Decreasing the thrust bearing radius $R_{TB}$ reduces the fan radius ratio and reduces the size of the turbofan engine but provides less space to carry the loads from the fan blades. The thrust bearing radius $R_{TB}$ reflects the need for adequately accommodating the diameter needed for packaging the fan actuation system but without overly sacrificing aerodynamic performance of the turbofan engine. In embodiments for a ducted engine, the thrust bearing radius $R_{TB}$ is in a range of twelve inches to nineteen inches (12 in. to 19 in.). In some embodiments for a ducted engine, the thrust bearing radius $R_{TB}$ is in a range of fourteen inches to nineteen inches (14 in. to 19 in.). In embodiments for an open fan engine (e.g., the unducted fan propulsor 110 of FIG. 12), the thrust bearing radius $R_{TB}$ is in a range of ten inches to twenty-seven inches (10 in. to 27 in.). In some embodiments for an open fan engine (e.g., the unducted fan propulsor of FIG. 2), the thrust bearing radius $R_{TB}$ is in a range of twelve inches to twenty-seven inches (12 in. to 27 in.). In some embodiments for an open fan engine, the thrust bearing radius $R_{TB}$ is in a range of nineteen inches to twenty-seven inches (19 in. to 27 in).

The FAS envelope and the FASL envelope are valid for a cruise Mach number $M_{cruise}$ in a range of 0.7 to 0.92. In some embodiments, the FAS envelope and the FASL envelope are valid for a cruise Mach number $M_{cruise}$ in a range of 0.7 to 0.9. As mentioned above, turbofan engines operate at higher cruise speeds than turboprop engines. At higher cruise speeds, the aerodynamic loads on fan blades increase, thereby requiring more torque for actuating blades in pitch. This means a larger actuation system is needed to handle the higher reaction loads resulting when a torque is applied in flight to change the blade pitch, to move the blade to a feathered position, or coarse/fine pitch changes. The cruise Mach number $M_{cruise}$ reflects this higher loading environment when pitching fan blades. In some embodiments, the cruise Mach number $M_{cruise}$ in a range of 0.75 to 0.9. In some embodiments, the cruise Mach number $M_{cruise}$ is in a range of 0.8 to 0.88.

The FAS envelope and the FASL envelope are only valid for a fan hub axial length $A_{FH}$ of twenty-five inches to eighty-five inches (25 in. to 85 in.). In some embodiments, the FAS envelope and the FASL envelope are only valid for a fan hub axial length $A_{FH}$ of twenty-five inches to seventy-five inches (25 in. to 75 in.). In some embodiments, the FAS envelope and the FASL envelope are only valid for a fan hub axial length $A_{FH}$ of forty inches to eighty-five inches (40 in. to 85 in.). The fan hub axial length $A_{FH}$ defines the amount of axial space, or the volume available for the fan actuation system, forward of the pitch axis P of the blades 154. Increasing the fan hub axial length $A_{FH}$ provides more space for the fan actuation system but increases the overall weight of the turbine engine. Decreasing the fan hub axial length $A_{FH}$ reduces the fan performance and the pressure distribution to the fan due to a smaller axial length for the aerodynamic flow lines into the fan hub but provides less axial space to fit the fan actuation system within the fan hub 157. The fan hub axial length $A_{FH}$ reflects the need for aerodynamic performance for the fan and adequately accommodating the axial length needed for packaging the fan actuation system but without overly sacrificing aerodynamic performance of the turbofan engine and allowing for a more efficient fan actuation system. In embodiments for a ducted engine, the fan hub axial length $A_{FH}$ is in a range of twenty-five inches to forty inches (25 in. to 40 in.). In some embodiments for an open fan engine (e.g., the unducted fan propulsor 110 of FIG. 12), the fan hub axial length $A_{FH}$ is in a range of twenty-five inches to seventy-five inches (25 in. to 75 in). In some embodiments for an open fan engine (e.g., the unducted fan propulsor 110 of FIG. 12), the fan hub axial length $A_{FH}$ is in a range of forty inches to eighty-five inches (40 in. to 85 in). In this way, the fan hub axial length $A_{FH}$ is greater for open fan engines as compared to ducted fan engines as more space is needed due to the longer fan blades of the open fan engines as compared to the ducted engines.

The FAS envelope and the FASL envelope are only valid for a fan bearing axial length $A_{FB}$ of ten inches to twenty-three inches (10 in. to 23 in.). In some embodiments, the FAS envelope and the FASL envelope are only valid for a fan bearing axial length $A_{FB}$ of sixteen inches to twenty-three inches (16 in. to 23 in.). The fan bearing axial length $A_{FB}$ defines the amount of axial space, or the volume available for the fan actuation system, aft of the pitch axis P of the blades 154. Increasing the fan bearing axial length $A_{FB}$ provides more space for the fan actuation system but increases the overall weight of the engine and increases loads on the bearings. Decreasing the fan bearing axial length $A_{FB}$ decreases overall engine weight and reduces loads on the bearings but provides less axial space to fit the fan actuation system within the fan hub 157. The fan bearing axial length $A_{FB}$ reflects the need for adequately accommodating the axial length needed for packaging the fan actuation system while minimizing the fan bearing axial length $A_{FB}$ to reduce loads on the bearings and reduce overall weight of the engine. In some aspects, the fan hub axial length $A_{FH}$ is in a range of seventeen inches to twenty inches (17 in. to 20 in.). In some aspects, the fan hub axial length $A_{FH}$ is in a range of ten inches to twenty-three inches (10 in. to 23 in). In some aspects, the fan hub axial length $A_{FH}$ is in a range of sixteen inches to twenty-three inches (16 in. to 23 in).

Figure 21:
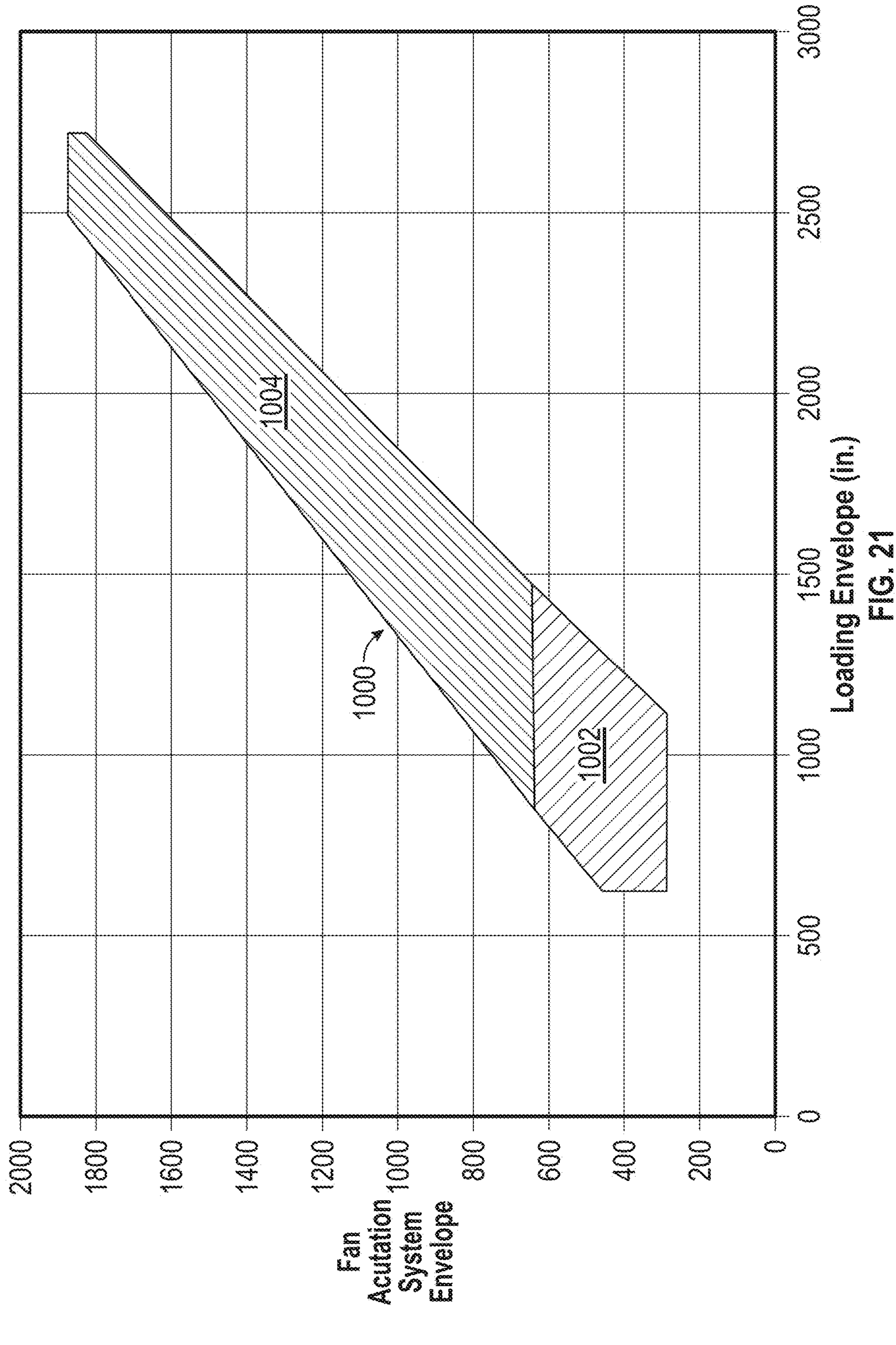
FIG. 21 represents, in graph form, a fan actuation system envelope as a function of a loading envelope, according to the present disclosure.

FIG. 21 represents, in graph form, the FAS envelope as a function of the loading envelope ($N_{FB}$×$D_{FT}$×$M_{cruise}$). An area 1000 represents the boundaries of the FAS envelope. The FAS envelope is in a range of three hundred to one thousand eight hundred sixty (300 to 1860) for a loading envelope in a range of five hundred eighty-eight inches to two thousand seven hundred twenty-two inches (588 in. to 2722 in.). TABLE 7 and FIG. 21 show that the FAS envelope increases as the loading envelope increases. In this way, the FAS envelope increases as the number of fan blades $N_{FB}$, the fan tip diameter $D_{FT}$, or the cruise Mach number $M_{cruise}$ increase. The range of the FAS envelope identifies the specific architectures that can accommodate the fan pitch actuation system, accounting for both the mechanisms and structural load paths needed to pitch the fan blades under an aerodynamic loading, but without exceeding the volume available for packaging the pitch actuation system within the limited space of a turbofan engine.

A first area 1002 represents the boundaries of the FAS envelope for a first range. A second area 1004 represents the boundaries of the FAS envelope for a second range. The FAS envelope, represented by the first area 1002, is in a range of three hundred to six hundred sixty (300 to 660) for the first range. The FAS envelope, represented by the second area 1004, is in a range of six hundred sixty to one thousand eight hundred sixty (660 to 1860) and, preferably, in a range of six hundred sixty to one thousand twenty (660 to 1020) for the second range.

Figure 22:
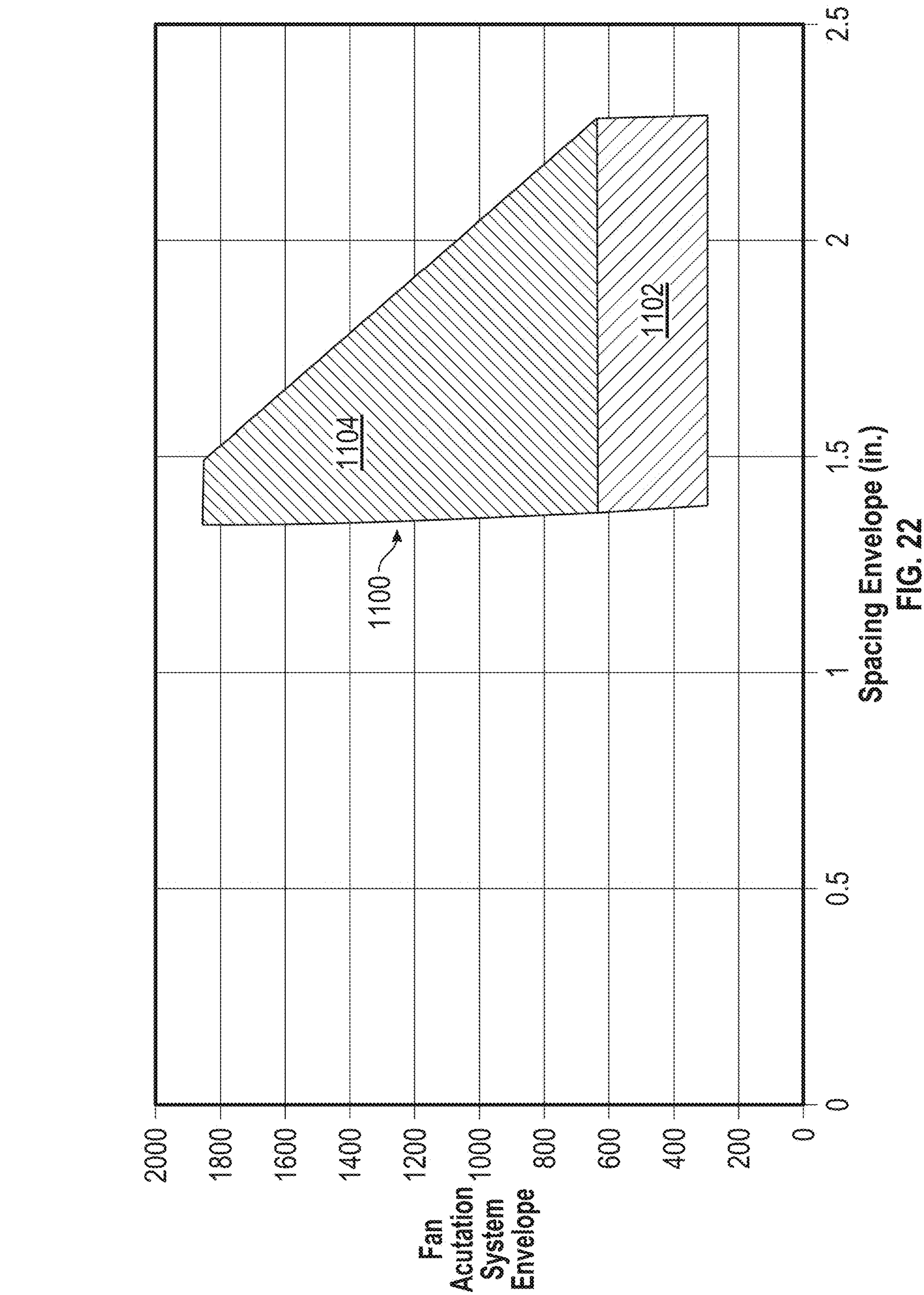
FIG. 22 represents, in graph form, the fan actuation system envelope as a function of a spacing envelope, according to the present disclosure.

FIG. 22 represents, in graph form, the FAS envelope as a function of the spacing envelope ($R_{TB}$/$N_{FB}$). An area 1100 represents the boundaries of the FAS envelope. The FAS envelope is in a range of three hundred to one thousand eight hundred sixty (300 to 1860) for a spacing envelope in a range of one point three five inches to two point two five inches (1.35 in. to 2.25 in.). TABLE 7 and FIG. 22 show that the FAS envelope decreases as the spacing envelope increases. In this way, the FAS envelope decreases as the thrust bearing radius $R_{TB}$ increases or the number of fan blades $N_{FB}$ decreases. A first area 1102 represents the boundaries of the FAS envelope for a first range and is in a range of three hundred to six hundred sixty (300 to 660) for the first range, as detailed above. A second area 1104 represents the boundaries of the FAS envelope for a second range and is in a range of six hundred sixty to one thousand eight hundred sixty (660 to 1860) and, preferably, in a range of six hundred sixty to one thousand twenty (660 to 1020), as detailed above.

Figure 23:
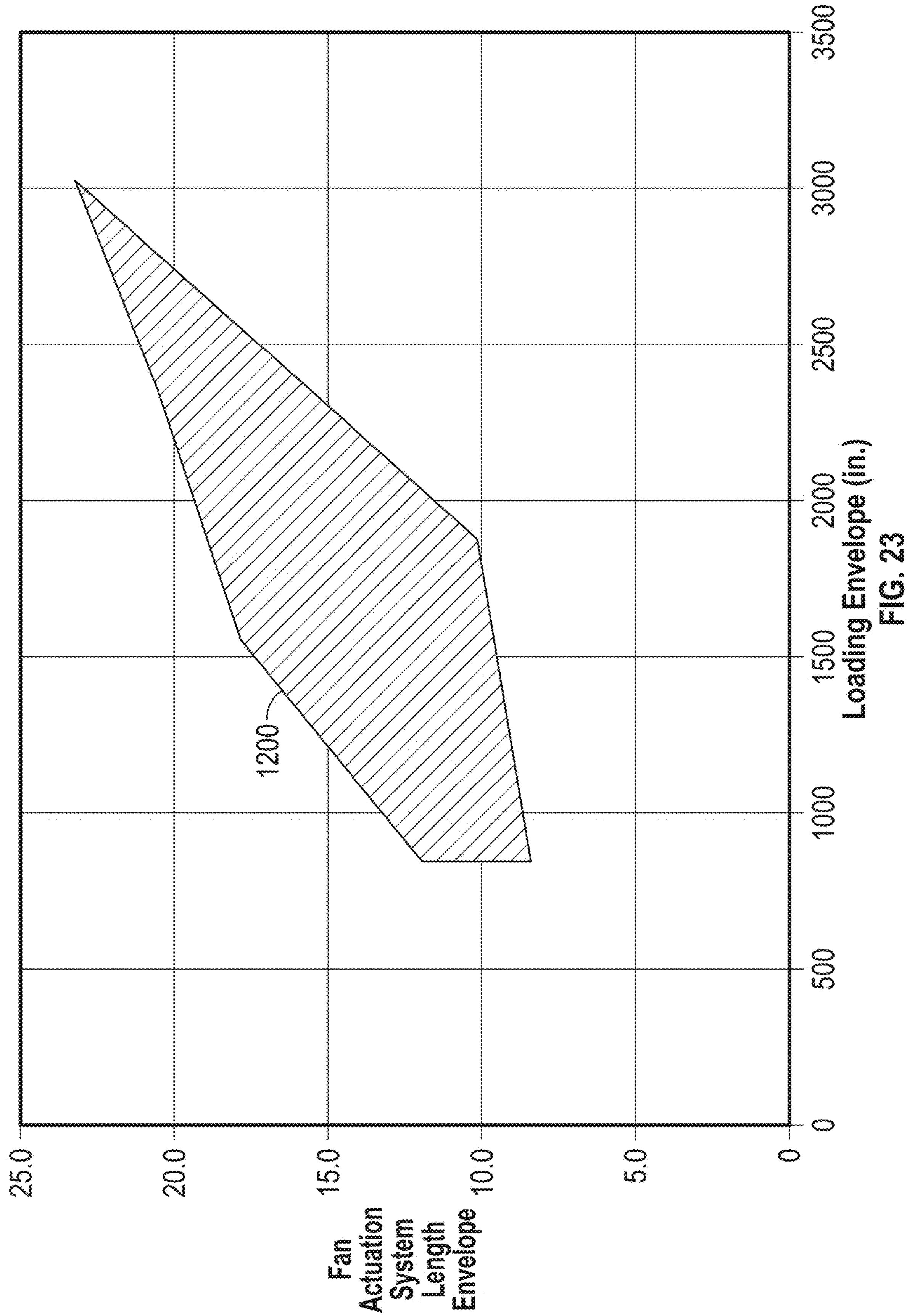
FIG. 23 represents, in graph form, a fan actuation system length envelope as a function of a loading envelope, according to the present disclosure.

FIG. 23 represents, in graph form, the FASL envelope as a function of the loading envelope ($N_{FB}$×$D_{FT}$). An area 1200 represents the boundaries of the FASL envelope. The FASL envelope is in a range of eight point five to twenty-four (8.5 to 24) for a loading envelope in a range of eight hundred forty inches to three thousand twenty-four inches (840 in. to 3,024 in.). TABLE 7 and FIG. 23 show that the FASL envelope increases as the loading envelope increases. In this way, the FASL envelope increases as the number of fan blades $N_{FB}$ or the fan tip diameter $D_{FT}$ increase. The range of the FASL envelope identifies the specific architectures that can accommodate the fan pitch actuation system, accounting for both the mechanisms and structural load paths needed to pitch the fan blades under an aerodynamic loading, but without exceeding the volume available for packaging the pitch actuation system within the limited space of a turbofan engine. For the second range, the FASL envelope is in a range of eight point five to thirteen (8.5 to 13).

Figure 24:
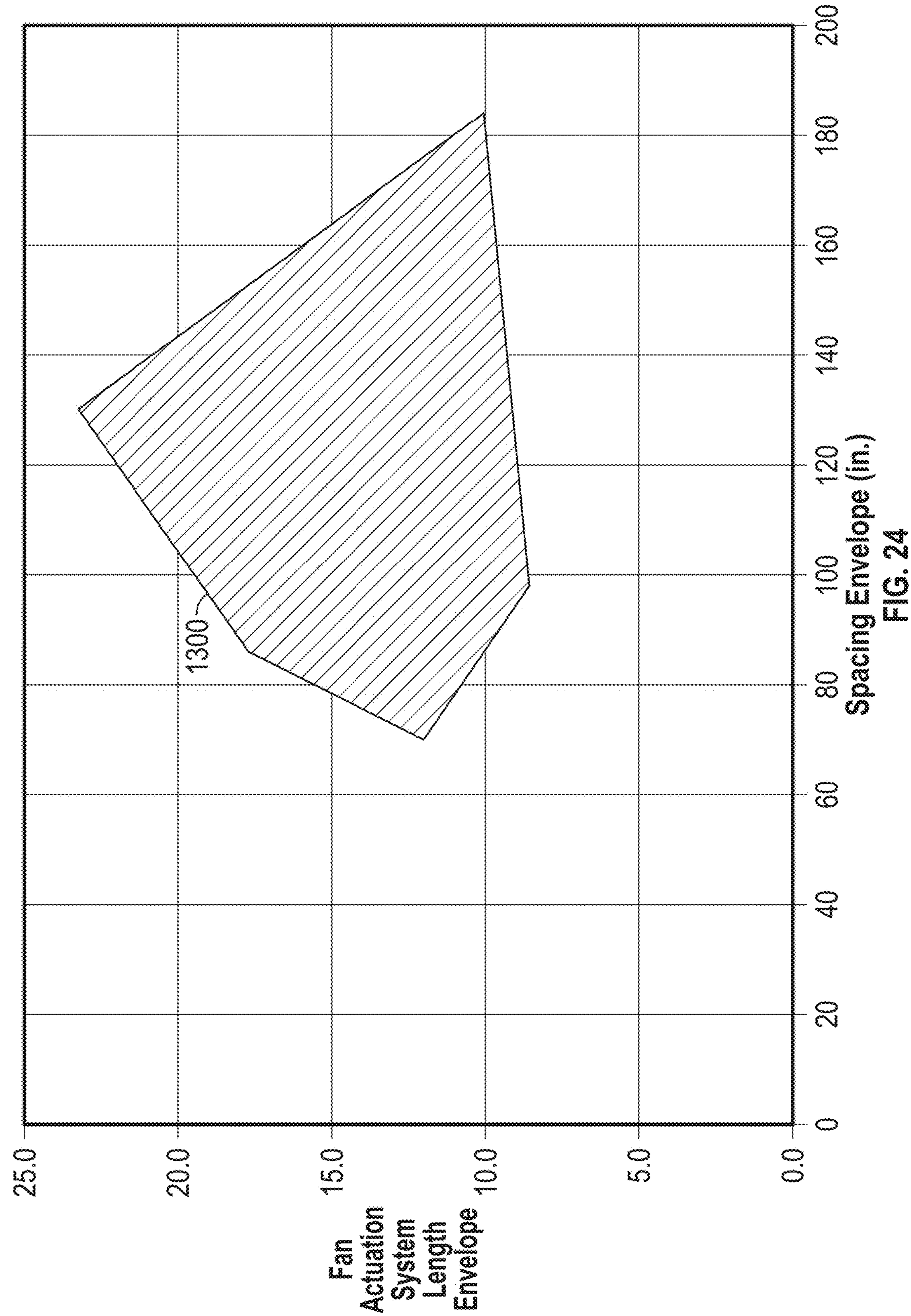
FIG. 24 represents, in graph form, the fan actuation system length envelope as a function of a spacing envelope, according to the present disclosure.

FIG. 24 represents, in graph form, the FASL envelope as a function of the spacing envelope $L_{AXIAL}$×($R_{TB}$/$N_{FB}$). An area 1300 represents the boundaries of the FASL envelope. The FASL envelope is in a range of eight point five to twenty-four (8.5 to 24) for a spacing envelope in a range of seventy square inches to one hundred eighty-five square inches (70 $in.^2$ to 185 $in.^2$). TABLE 7 and FIG. 24 show that the FASL envelope decreases as the spacing envelope increases. In this way, the FASL envelope decreases as the thrust bearing radius $R_{TB}$ increases, or the number of fan blades $N_{FB}$ or the axial length $L_{AXIAL}$ decreases. As mentioned above, in some aspects, the FASL envelope is in a range of eight point five to thirteen (8.5 to 13).

Further aspects of the disclosure are provided by the subject matter of the following clauses.

An aircraft is provided that includes a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach M0 of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in TABLES 1 and 2.

An aircraft is provided including a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D}+\frac{\left(\sqrt{\begin{array}{c}1.4161*\left[1.88978*\sin^2(\theta)-0.0875*\right.\\ \left.\cos^2(\theta)+0.477*\sin(\theta)*\cos(\theta)\right]\end{array}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{array}{c}1.4161*\left[1.88978*\sin^2(\theta)-0.0875*\right.\\ \left.\cos^2(\theta)+0.477*\sin(\theta)*\cos(\theta)\right]\end{array}}+1.764*\sin(\theta)+0.19146*\cos(\theta)\right)}{1.96*\sin^2(\theta)+0.7225*\cos^2(\theta)}<0.$$

In the preceding clause, 0.254<RL/D<1.86 and θ is between 199° and 306°, and the P of the unducted fan propulsor is defined by the following expressions:

$$\frac{RL}{D}+\frac{\left(\sqrt{\begin{array}{c}0.52621*\left[0.7205*\sin^2(\theta)-0.352*\right.\\ \left.\cos^2(\theta)+0.7448*\sin(\theta)*\cos(\theta)\right]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{c}0.52621*\left[0.7205*\sin^2(\theta)-0.352*\right.\\ \left.\cos^2(\theta)+0.7448*\sin(\theta)*\cos(\theta)\right]\end{array}}+0.8476*\sin(\theta)+0.23119*\cos(\theta)\right)}{0.8649*\sin^2(\theta)+0.6084*\cos^2(\theta)}<0.$$

In any of the two preceding clauses, 0.369<RL/D<1.43 and θ is between 204° and 291°, and the P of the unducted fan propulsor is defined by the following expressions:

$$\frac{RL}{D}+\frac{\left(\sqrt{\begin{array}{c}0.52621*\left[0.7205*\sin^2(\theta)-0.352*\right.\\ \left.\cos^2(\theta)+0.7448*\sin(\theta)*\cos(\theta)\right]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{c}0.52621*\left[0.7205*\sin^2(\theta)-0.352*\right.\\ \left.\cos^2(\theta)+0.7448*\sin(\theta)*\cos(\theta)\right]\end{array}}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\begin{array}{c}\sqrt{\begin{array}{c}0.01069156*[0.036*\sin^2(\theta)-0.3485*\\ \cos^2(\theta)+0.5418*\sin(\theta)*\cos(\theta)]\end{array}}+\\ 0.139167*\sin(\theta)+0.020812*\cos(\theta)\end{array}\right)}{0.2209*\sin^2(\theta)+0.0484*\cos^2(\theta)}>0$$

and $$\frac{RL}{D}+\frac{\left(\begin{array}{c}-\sqrt{\begin{array}{c}0.01069156*[0.036*\sin^2(\theta)-0.3485*\\ \cos^2(\theta)+0.5418*\sin(\theta)*\cos(\theta)]\end{array}}+\\ 0.139167*\sin(\theta)+0.020812*\cos(\theta)\end{array}\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach M0 of between 0.70 and 0.85, between 0.5 and 0.9, between 0.7 and 0.9, or between 0.75 and 0.9.

An aircraft is provided that includes a fuselage, an airfoil extending from the fuselage, the airfoil having an airfoil section with a leading edge (LE) and a trailing edge (TE), a chord extending between the LE and TE, and an effective quarter chord point (QC) along the chord measured from the LE, an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other, and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In the of the preceding clauses, 0.15≤RL/D.

In any of the preceding clauses, 0.35≤RL/D, and preferably RL/D is about 0.72.

In any of the preceding clauses, wherein 0 is between 198° and 310°, and preferably between 205° and 285°.

In any of the preceding clauses, the unducted fan propulsor operates at a cruise flight Mach M0 of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of counter-clockwise rotating blades arranged in a forward array and a plurality clockwise rotating blades arranged in a rearward array, wherein one of the forward and rearward array of blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

An aircraft is provided that includes a fuselage, an airfoil extending from the fuselage, the airfoil having an airfoil section and the airfoil section having an effective quarter chord point (QC), and a plurality of rotating blades defining a maximum outer diameter (D), a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, wherein 0.065<RL/D<1.98 and θ is between 187° and 340°, and wherein RL/D and θ of the P of the unducted fan propulsor adhere to the following expressions:

$$\frac{RL}{D}+\frac{\left(\sqrt{\begin{matrix}1.4161*[1.88978*\sin^2(\theta)-0.0875*\\ \cos^2(\theta)+0.477*\sin(\theta)*\cos(\theta)]\end{matrix}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{matrix}1.4161*[1.88978*\sin^2(\theta)-0.0875*\\ \cos^2(\theta)+0.477*\sin(\theta)*\cos(\theta)]\end{matrix}}+1.764*\sin(\theta)+0.19146*\cos(\theta)\right)}{1.96*\sin^2(\theta)+0.7225*\cos^2(\theta)}<0.$$

The aircraft of the preceding clause, wherein 0.254<RL/D<1.86 and θ is between 199° and 306°, and the P of the unducted fan propulsor is defined by the following expressions:

$$\frac{RL}{D}+\frac{\left(\sqrt{\begin{matrix}0.52621*[0.7205*\sin^2(\theta)-0.352*\\ \cos^2(\theta)+0.7448*\sin(\theta)*\cos(\theta)]\end{matrix}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{matrix}0.52621*[0.7205*\sin^2(\theta)-0.352*\\ \cos^2(\theta)+0.7448*\sin(\theta)*\cos(\theta)]\end{matrix}}+0.8476*\sin(\theta)+0.23119*\cos(\theta)\right)}{0.8649*\sin^2(\theta)+0.6084*\cos^2(\theta)}<0.$$

The aircraft of any preceding clause, wherein 0.369<RL/D<1.43 and θ is between 204° and 291°, and the P of the unducted fan propulsor is defined by the following expressions:

$$\frac{RL}{D}+\frac{\left(\sqrt{\begin{matrix}0.09923*[0.2964*\sin^2(\theta)-0.36*\\ \cos^2(\theta)+0.66*\sin(\theta)*\cos(\theta)]\end{matrix}}+0.3675*\sin(\theta)+0.0891*\cos(\theta)\right)}{0.49*\sin^2(\theta)+0.2025*\cos^2(\theta)}>0$$

and $$\frac{RL}{D}+\frac{\left(-\sqrt{\begin{matrix}0.09923*[0.2964*\sin^2(\theta)-0.36*\\ \cos^2(\theta)+0.66*\sin(\theta)*\cos(\theta)]\end{matrix}}+0.3675*\sin(\theta)+0.0891*\cos(\theta)\right)}{0.49*\sin^2(\theta)+0.2025*\cos^2(\theta)}<0.$$

The aircraft of any preceding clause, wherein 0.477<RL/D<0.9455 and θ is between 211° and 274°, and the P of the unducted fan propulsor is defined by the following expressions:

$$\frac{RL}{D}+\frac{\left(\sqrt{\begin{matrix}0.01069156*[0.036*\sin^2(\theta)-0.3485*\\ \cos^2(\theta)+0.5418*\sin(\theta)*\cos(\theta)]\end{matrix}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{matrix}0.01069156*[0.036*\sin^2(\theta)-0.3485*\\ \cos^2(\theta)+0.5418*\sin(\theta)*\cos(\theta)]\end{matrix}}+0.139167*\sin(\theta)+0.020812*\cos(\theta)\right)}{0.2209*\sin^2(\theta)+0.0484*\cos^2(\theta)}<0.$$

The aircraft of any preceding clause, wherein the unducted fan propulsor is undermounted to the airfoil with one or more intermediate structures.

The aircraft of preceding clause, wherein the P of the unducted fan propulsor is variable to accommodate different operating conditions.

An aircraft is provided that includes a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of the preceding clause, wherein 0.15≤RL/D.

The aircraft of any preceding clause, wherein 0.35≤RL/D, and preferably RL/D is about 0.72.

The aircraft of any preceding clause, wherein 0 is between 198° and 310°, and preferably between 205° and 285°.

The aircraft of any preceding clause, wherein the unducted fan propulsor operates at a cruise flight Mach M0 of between 0.5 and 0.9, preferably between 0.7 and 0.9, and more preferably between 0.75 and 0.9.

The aircraft of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any preceding clause, wherein the unducted fan propulsor is undermounted to the airfoil with one or more intermediate structures.

The aircraft of any preceding clause, wherein the P of the unducted fan propulsor is variable to accommodate different operating conditions.

A method of assembly including using an aircraft body including a fuselage and an airfoil extending from the fuselage, wherein the airfoil has an airfoil section defining an effective quarter chord point (QC), and attaching an unducted fan propulsor to the aircraft body relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position, wherein 0.07≤RL/D≤2.0 and θ is between 187° and 342.°.

The method of the preceding clause, wherein 0.15≤RL/D.

The method of any preceding clause, wherein 0.35≤RL/D, and preferably RL/D is about 0.72.

The method of any preceding clause, wherein 0 is between 198° and 310°, and preferably between 205° and 285°.

The method of any preceding clause, wherein the unducted fan propulsor operates at a cruise flight Mach M0 of between 0.5 and 0.9, preferably between 0.7 and 0.9, and more preferably between 0.75 and 0.9.

The method of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of any preceding clause, wherein the unducted fan propulsor is undermounted to the airfoil with one or more intermediate structures.

The method of any preceding clause, wherein the P of the unducted fan propulsor is variable to accommodate different operating conditions.

A method of assembly including using an aircraft body including a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC), and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of the preceding clause, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of any preceding clause, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of any preceding clause, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

An aircraft including a fuselage, a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other, and an airfoil section having an effective quarter chord point QC, a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing, wherein 0.07≤RL/D≤2.0 and θ is between 187° and 342°.

An aircraft including a fuselage, a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC, a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing, wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach M0 of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in TABLES 1 and 2.

An aircraft including a fuselage, an airfoil extending from the fuselage, the airfoil having an airfoil section defining a quarter-chord location (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°, wherein the unducted fan propulsor includes a fan having the plurality of blades of the forward array or the rearward array coupled to a fan shaft having one or more fan bearings, each of the plurality of blades of the fan being rotatable about a pitch axis and extending from a fan hub, and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by:

$$\frac{N_{FB} \times D_{FT}}{L_{AXIAL} \times \left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

The aircraft of any preceding clause, wherein the fan actuation system includes a pressurized pneumatic chamber that is filled with a pressurized gas that biases the plurality of blades of the fan to a feather position.

The aircraft of any preceding clause, wherein the fan actuation system includes one or more counterweights for reducing inertial loading associated with rotation of the plurality of blades of the fan.

The aircraft of any preceding clause, wherein the unducted fan propulsor has a longitudinal centerline axis and includes a core inlet that is annular about the longitudinal centerline axis.

The aircraft of any preceding clause, wherein the fan actuation system includes a hydraulic system that supplies hydraulic fluid for rotating the plurality of blades of the fan about the pitch axis.

The aircraft of any preceding clause, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

The aircraft of any preceding clause, wherein the fan actuation system has a fan actuation system axial length ($A_{FAS}$) defined from an axially forward-most surface of the fan actuation system to the pitch axis of the plurality of blades, $A_{FAS}$ being a maximum of 80% $A_{FH}$.

An aircraft including a fuselage, an airfoil extending from the fuselage, the airfoil having an airfoil section defining an effective quarter chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other, and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position, wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the unducted fan propulsor includes a fan having the plurality of blades of the forward array or the rearward array coupled to a fan shaft having one or more fan bearings, each of the plurality of blades of the fan being rotatable about a pitch axis and extending from a fan hub, and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by $$\frac{N_{FB} \times D_{FT}}{L_{AXIAL} \times \left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

The aircraft of any preceding clause, wherein the fan actuation system includes a pressurized pneumatic chamber that is filled with a pressurized gas that biases the plurality of blades of the fan to a feather position.

The aircraft of any preceding clause, wherein the fan actuation system includes one or more counterweights for reducing inertial loading associated with rotation of the plurality of blades of the fan.

The aircraft of any preceding clause, wherein the unducted fan propulsor has a longitudinal centerline axis and includes a core inlet that is annular about the longitudinal centerline axis.

The aircraft of any preceding clause, wherein the fan actuation system includes a hydraulic system that supplies hydraulic fluid for rotating the plurality of blades of the fan about the pitch axis.

The aircraft of any preceding clause, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

The aircraft of any preceding clause, wherein the fan actuation system has a fan actuation system axial length ($A_{FAS}$) defined from an axially forward-most surface of the fan actuation system to the pitch axis of the plurality of blades, $A_{FAS}$ being a maximum of 80% $A_{FH}$.

An aircraft including a fuselage, an airfoil extending from the fuselage, the airfoil having an airfoil section defining an effective quarter-chord point (QC), an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D), a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other, and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°, and wherein RL/D and θ of the P of the unducted fan propulsor adhere to the following expressions:

$$\frac{RL}{D}+\frac{\left(\frac{\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)}{}\right)}{1.96*\sin^2(\theta)+0.7225*\cos^2(\theta)}>0 \text{ and}$$

$$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0$$

wherein the unducted fan propulsor includes a fan having the plurality of blades of the forward array or the rearward array coupled to a fan shaft having one or more fan bearings, each of the plurality of blades of the fan being rotatable about a pitch axis and extending from a fan hub, and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by $$\frac{N_{FB}\times D_{FT}}{L_{AXIAL}\times\left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

The aircraft of any preceding clause, wherein the fan actuation system includes a pressurized pneumatic chamber that is filled with a pressurized gas that biases the plurality of blades of the fan to a feather position.

The aircraft of any preceding clause, wherein the fan actuation system includes one or more counterweights for reducing inertial loading associated with rotation of the plurality of blades of the fan.

The aircraft of any preceding clause, wherein the unducted fan propulsor has a longitudinal centerline axis and includes a core inlet that is annular about the longitudinal centerline axis.

The aircraft of any preceding clause, wherein the fan actuation system includes a hydraulic system that supplies hydraulic fluid for rotating the plurality of blades of the fan about the pitch axis.

The aircraft of any preceding clause, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

The aircraft of any preceding clause, wherein the fan actuation system includes a hydraulic system that supplies hydraulic fluid for rotating the plurality of fan blades about the pitch axis.

The aircraft of any preceding clause, wherein the cruise operating conditions occur at a mid-level power range of the turbofan engine.

The aircraft of the preceding clause, wherein the mid-level power range is 30% to 85% of a sea level static maximum engine rated thrust for the turbofan engine.

The aircraft of any preceding clause, wherein the turbofan engine is rated for use on a regional aircraft having a maximum takeoff thrust of 10,000 lbf to 20,000 lbf.

The aircraft of any preceding clause, wherein the turbofan engine is rated for use on a narrow body aircraft having a maximum takeoff thrust of 15,000 lbf to 30,000 lbf.

The aircraft of any preceding clause, wherein the turbofan engine is rated for use on a wide body aircraft having a maximum takeoff thrust of 40,000 lbf to 110,000 lbf.

The aircraft of any preceding clause, wherein $N_{FB}$ is in a range from ten to eighteen.

The aircraft of any preceding clause, wherein $N_{FB}$ is in a range from ten to fourteen.

The aircraft of any preceding clause, wherein $D_{FT}$ is in a range from 84.0 inches to 180.0 inches.

The aircraft of any preceding clause, wherein $D_{FT}$ is in a range from 84.0 inches to 120.0 inches.

The aircraft of any preceding clause, wherein $D_{FT}$ is in a range from 120.0 inches to 168.0 inches.

The aircraft of any preceding clause, wherein $R_{TB}$ is in a range from 14 inches to 27 inches.

The aircraft of any preceding clause, wherein $R_{TB}$ is in a range from 14 inches to 19 inches.

The aircraft of any preceding clause, wherein $R_{TB}$ is in a range from 19 inches to 27 inches.

The aircraft of any preceding clause, wherein $M_{cruise}$ is in a range from 0.7 to 0.92.

The aircraft of any preceding clause, wherein $M_{cruise}$ is in a range from 0.75 to 0.9.

The aircraft of any preceding clause, wherein $M_{cruise}$ is in a range from 0.8 to 0.88.

The aircraft of any preceding clause, wherein the fan actuation system includes a pressurized pneumatic chamber that is filled with a pressurized gas that biases the plurality of fan blades to a feather position.

The aircraft of any preceding clause, wherein the fan actuation system is devoid of counterweights for reducing inertial loading associated with rotation of fan blades.

The aircraft of any preceding clause, further comprising core cowl, wherein the turbofan engine has a longitudinal centerline axis, and the core cowl is annular about the longitudinal centerline axis.

The aircraft of the preceding clause, further comprising a core inlet that is annular about the longitudinal centerline axis.

The aircraft of any preceding clause, further comprising a gearbox assembly, wherein the turbine section includes a low-pressure shaft, and the fan has a fan shaft that is coupled to the low-pressure shaft through the gearbox assembly.

The turbofan engine of the preceding clause, wherein the gearbox assembly has a gear ratio in a range 3.5:1 to 5:1 for a ducted engine.

The aircraft of any preceding clause, wherein the gearbox assembly has a gear ratio in a range from 4:1 and 10:1 for an unducted fan engine.

The aircraft of any preceding clause, wherein the low-pressure shaft, the gearbox assembly, and the fan shaft are coaxial along the longitudinal centerline axis.

The aircraft of any preceding clause, wherein the fan actuation system envelope is in a range from 660 to 1020.

The aircraft of any preceding clause, the fan actuation system envelope being in a range from 300 to 660.

The aircraft of any preceding clause, the fan actuation system envelope being in a range from 660 to 1860.

The aircraft of any preceding clause, the fan actuation system envelope being in a range from 660 to 1020.

The aircraft of any preceding clause, further comprising a nacelle that circumferentially surrounds the fan.

The aircraft of any preceding clause, wherein the turbofan engine is an open fan engine.

The aircraft of any preceding clause, further comprising a fan hub, the plurality of fan blades extending radially from the fan hub.

The aircraft of any preceding clause, the fan actuation system being disposed within the fan hub.

The aircraft of any preceding clause, further comprising a compressor section, a combustor, and a turbine section.

The aircraft of any preceding clause, the compressor section including a low-pressure compressor and a high-pressure compressor, and the turbine section including a high-pressure turbine and a low-pressure turbine.

The aircraft of any preceding clause, further comprising a high-pressure shaft that couples the high-pressure compressor and the high-pressure turbine.

The aircraft of any preceding clause, further comprising a low-pressure shaft that couples the low-pressure compressor and the low-pressure turbine.

The aircraft of any preceding clause, the low-pressure shaft being disposed through the high-pressure shaft.

The aircraft of any preceding clause, the gearbox assembly comprising a gear assembly comprising a plurality of gears.

The aircraft of any preceding clause, the gearbox assembly including one or more gear bearings.

The aircraft of any preceding clause, each of the plurality of fan blades extending from a fan root to a fan tip.

The aircraft of any preceding clause, the fan tip diameter DFT being defined from the longitudinal centerline axis to the fan tip of each of the plurality of fan blades.

The aircraft of any preceding clause, the fan actuation system including a trunnion mechanism that includes a plurality of trunnions, each fan blade being disposed in a respective trunnion.

The aircraft of any preceding clause, the fan blades extending from a disk.

The aircraft of any preceding clause, the disk including a plurality of disk segments.

The aircraft of any preceding clause, each fan blade being coupled to a respective disk segment at the trunnion mechanism.

The aircraft of any preceding clause, the plurality of trunnions being rotatable to rotate the plurality of fan blades about the pitch axis.

The aircraft of any preceding clause, the fan actuation system including one or more actuators coupled to the plurality of trunnions.

The aircraft of any preceding clause, the fan actuation system including a plurality of trunnion links and a unison ring, the plurality of trunnion links being coupled to the plurality of trunnions and to the unison ring.

The aircraft of any preceding clause, the plurality of trunnion links including a plurality of forward trunnion links and a plurality of aft trunnion links.

The aircraft of any preceding clause, the unison ring including a plurality of unison rings including a forward unison ring that is positioned forward of the plurality of trunnions and an aft unison ring that is disposed aft of the plurality of trunnions.

The aircraft of any preceding clause, the plurality of forward trunnion links being coupled to the forward unison ring.

The aircraft of any preceding clause, the plurality of aft trunnion links being coupled to the aft unison ring.

The aircraft of any preceding clause, further comprising a plurality of pins that couple the plurality of trunnion links to the unison ring.

The aircraft of any preceding clause, the plurality of forward trunnion links being coupled to the forward unison ring by a plurality of forward pins.

The aircraft of any preceding clause, the plurality of aft trunnion links being coupled to the aft unison ring by a plurality of aft pins.

The aircraft of any preceding clause, the one or more actuators including a hydraulic cylinder and a piston disposed within the hydraulic cylinder.

The turbofan engine of the preceding clause, the hydraulic cylinder and the piston being movable along an axial direction.

The aircraft of any preceding clause, the forward unison ring being coupled to the hydraulic cylinder such that the forward unison ring moves when the hydraulic cylinder moves.

The aircraft of any preceding clause, the aft unison ring being coupled to the piston such that the aft unison ring moves as the piston moves.

The aircraft of any preceding clause, the fan actuation system rotating the plurality of fan blades between a first end position and a second end position.

The aircraft of any preceding clause, the first end position being a feather position in which the plurality of fan blades is substantially aligned with a flow of a volume of air across the plurality of fan blades.

The aircraft of the preceding clause, the fan actuation system rotating the plurality of fan blades to any position between the first end position and the second end position.

The aircraft of any preceding clause, the second end positioned being a reverse position in which the plurality of fan blades exceeds a plane that is transverse to the longitudinal centerline axis by at least 30° to assist with braking the aircraft.

The aircraft of any preceding clause, the fan actuation system moving the hydraulic cylinder in a first direction and moving the piston in a second direction.

The aircraft of any preceding clause, movement of the hydraulic cylinder and the piston causing the plurality of fan blades to rotate about the pitch axis.

The aircraft of any preceding clause, the one or more actuators including a piston retainer.

The aircraft of the preceding clause, the piston retainer being coupled to the fan shaft such that the piston retainer rotates with the fan shaft.

The aircraft of any preceding clause, the piston being coupled to the piston retainer such that the piston rotates with the piston retainer.

The aircraft of any preceding clause, the hydraulic cylinder being axially slidable with respect to the piston and the piston retainer.

The aircraft of any preceding clause, the piston retainer comprising a first portion, a second portion that extends radially outward from the first portion, and a third portion that extends axially from the second portion.

The aircraft of any preceding clause, the third portion of the piston retainer being coupled to the fan shaft.

The aircraft of any preceding clause, the piston being coupled to, and extending forward from, the first portion of the piston retainer.

The aircraft of any preceding clause, the hydraulic cylinder being disposed radially outward of the piston retainer and the piston.

The aircraft of any preceding clause, the hydraulic cylinder being coupled to the unison ring at a joint such that movement of the hydraulic cylinder in the axial direction causes the plurality of fan blades to pitch about the pitch axis.

The aircraft of any preceding clause, the hydraulic cylinder having a first portion, a second portion, a third portion, and a fourth portion.

The aircraft of the preceding clause, the first portion of the hydraulic cylinder extending generally in the axial direction and being coupled to the unison ring at the joint.

The aircraft of any preceding clause, the second portion of the hydraulic cylinder being disposed radially inward of the first portion and being coupled to the first portion and to the unison ring at the joint.

The aircraft of any preceding clause, the third portion of the hydraulic cylinder extending forward from the joint.

The aircraft of any preceding clause, the fourth portion of the hydraulic cylinder being coupled to, and extending axially within, the third portion of the hydraulic cylinder.

The aircraft of any preceding clause, the first portion of the hydraulic cylinder being sealingly engaged with the third portion of the piston retainer.

The aircraft of any preceding clause, the second portion of the piston retainer being sealingly engaged with the first portion of the hydraulic cylinder.

The aircraft of any preceding clause, the piston being sealingly engaged with the second portion and the fourth portion of the hydraulic cylinder.

The aircraft of any preceding clause, the fan actuation system including one or more hydraulic chambers defined between the hydraulic cylinder, the piston, and the piston retainer.

The aircraft of the preceding clause, the one or more hydraulic chambers including a first hydraulic chamber, a second hydraulic chamber, and a third hydraulic chamber.

The aircraft of any preceding clause, the first hydraulic chamber being defined between first portion of the hydraulic cylinder, the second portion of the piston retainer, and the third portion of the piston retainer.

The aircraft of any preceding clause, the second hydraulic chamber being defined between the first portion of the hydraulic cylinder, the second portion of the hydraulic cylinder, the first portion of the piston retainer, and the second portion of the piston retainer.

The aircraft of any preceding clause, the third hydraulic chamber being defined between the second portion of the hydraulic cylinder, an aft end of the piston, and the first portion of the piston retainer, The aircraft of any preceding clause, the first hydraulic chamber and the third hydraulic chamber being supplied with a hydraulic fluid at a first pressure, and the second hydraulic chamber being supplied with the hydraulic fluid at a second pressure.

The aircraft of any preceding clause, the first pressure and the second pressure being increased or decreased to cause the hydraulic cylinder to move axially forward or axially rearward to rotate the plurality of fan blades about the pitch axis.

The aircraft of any preceding clause, the fan actuation system comprising a hydraulic system that supplies the hydraulic fluid to the one or more hydraulic chambers.

The aircraft of any preceding clause, the hydraulic system including a pump to supply the hydraulic fluid to the one or more hydraulic chambers.

The aircraft of the preceding clause, the hydraulic system comprising an oil transfer bearing including a fixed portion with a plurality of fluid lines coupled to the pump.

The aircraft of the preceding clause, the oil transfer bearing including a sleeve that is rotatable about the fixed portion.

The aircraft of any preceding clause, the plurality of fluid lines including a first fluid line in fluid communication with the first hydraulic chamber, a second fluid line in fluid communication with the second hydraulic chamber, and a third fluid line in fluid communication the third hydraulic chamber.

The aircraft of any preceding clause, the plurality of fluid lines being coupled to the sleeve.

The aircraft of any preceding clause, the first hydraulic chamber and the third hydraulic chamber being provided with the hydraulic fluid at the same first pressure.

The aircraft of any preceding clause, the pump supplying the hydraulic fluid to the first hydraulic chamber and the third hydraulic chamber to increase the first pressure P1 and supplying the hydraulic fluid to the second hydraulic chamber to decrease the second pressure P2, to move the hydraulic cylinder in the rearward direction to rotate the plurality of fan blades towards the reverse position.

The aircraft of any preceding clause, the pump supplying the hydraulic fluid to the second hydraulic chamber to increase the second pressure P2 and supplying the hydraulic fluid to the first hydraulic chamber and the third hydraulic chamber to decrease the first pressure P1, to move the hydraulic cylinder in the forward direction to rotate the plurality of fan blades towards the feather position.

The aircraft of any preceding clause, the one or more actuators further comprising a pressurized pneumatic chamber filled with a pressurized gas to bias the hydraulic cylinder to move the plurality of fan blades to the feather position.

The aircraft of any preceding clause, a pressure of the pressurized gas in the pressurized pneumatic chamber being in a range from 720 psi to 920 psi.

The aircraft of any preceding clause, the pressurized gas in the pressurized pneumatic chamber causing the hydraulic cylinder to move rearward when the hydraulic system or the turbofan engine fails or is shut down.

The aircraft of any preceding clause, the fan actuation system not including a pitch lock device.

The aircraft of any preceding clause, the one or more radial thrust bearings being disposed between the plurality of trunnions and the disk such that the plurality of trunnions rotates with respect to the disk to rotate the plurality of fan blades about the pitch axis.

The aircraft of any preceding clause, the one or more radial thrust bearings transmitting a load from the plurality of fan blades to a static structure of the turbofan engine.

The turbofan engine of the preceding clause, wherein the fan actuation system includes a pressurized pneumatic chamber that is filled with a pressurized gas that biases the plurality of fan blades to a feather position.

The aircraft of any preceding clause, wherein the fan actuation system includes one or more counterweights for reducing inertial loading associated with rotation of the plurality of fan blades.

The aircraft of any preceding clause, further comprising a core cowl, wherein the turbofan engine has a longitudinal centerline axis, and the core cowl is annular about the longitudinal centerline axis wherein the core cowl includes a core inlet that is annular about the longitudinal centerline axis.

The aircraft of any preceding clause, wherein the fan actuation system includes a hydraulic system that supplies hydraulic fluid for rotating the plurality of fan blades about the pitch axis.

The aircraft of any preceding clause, wherein $N_{FB}$ is in a range from ten to eighteen.

The aircraft of any preceding clause, wherein $N_{FB}$ is in a range from ten to fourteen.

The aircraft of any preceding clause, wherein $D_{FT}$ is in a range from 84.0 inches to 180.0 inches.

The aircraft of any preceding clause, wherein $D_{FT}$ is in a range from 84.0 inches to 120.0 inches.

The aircraft of any preceding clause, wherein $D_{FT}$ is in a range from 120.0 inches to 180.0 inches.

The aircraft of any preceding clause, wherein $R_{TB}$ is in a range from 12 inches to 27 inches.

The aircraft of any preceding clause, wherein $R_{TB}$ is in a range from 12 inches to 19 inches.

The aircraft of any preceding clause, wherein $R_{TB}$ is in a range from 19 inches to 27 inches.

The aircraft of any preceding clause, wherein a fan radius ratio of the fan is in a range from 0.22 to 0.30.

The aircraft of any preceding clause, wherein $L_{AXIAL}$ is given by $A_{FH}+A_{FB}$, $A_{FH}$ being a fan hub axial length from the fan hub tip to the pitch axis of the plurality of fan blades and $A_{FB}$ being a fan bearing axial length from the pitch axis of the plurality of fan blades to the one or more fan bearings.

The aircraft of any preceding clause, wherein $A_{FH}$ is in a range from 25 inches to 75 inches.

The aircraft of any preceding clause, wherein $A_{FB}$ is in a range from 16 inches to 23 inches.

The aircraft of any preceding clause, wherein the fan actuation system has a fan actuation system axial length ($A_{FAS}$) defined from an axially forward-most surface of the fan actuation system to the pitch axis of the plurality of fan blades, $A_{FAS}$ being a maximum of 80% $A_{FH}$.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. An aircraft comprising:

a fuselage;

an airfoil extending from the fuselage, the airfoil having an airfoil section defining a quarter-chord location (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°, wherein the unducted fan propulsor includes:

a fan having the plurality of blades of the forward array or the rearward array coupled to a fan shaft having one or more fan bearings, each of the plurality of blades of the fan being rotatable about a pitch axis and extending from a fan hub; and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by:

$$\frac{N_{FB}\times D_{FT}}{L_{AXIAL}\times\left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

2. The aircraft of claim 1, wherein the fan actuation system includes a pressurized pneumatic chamber that is filled with a pressurized gas that biases the plurality of blades of the fan to a feather position.

3. The aircraft of claim 1, wherein the fan actuation system includes one or more counterweights for reducing inertial loading associated with rotation of the plurality of blades of the fan.

4. The aircraft of claim 1, wherein the unducted fan propulsor has a longitudinal centerline axis and includes a core inlet that is annular about the longitudinal centerline axis.

5. The aircraft of claim 1, wherein the fan actuation system includes a hydraulic system that supplies hydraulic fluid for rotating the plurality of blades of the fan about the pitch axis.

6. The aircraft of claim 1, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

7. The aircraft of claim 1, wherein the fan actuation system has a fan actuation system axial length ($A_{FAS}$) defined from an axially forward-most surface of the fan actuation system to the pitch axis of the plurality of blades, $A_{FAS}$ being a maximum of 80% $A_{FH}$.

8. An aircraft comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the unducted fan propulsor includes:

a fan having the plurality of blades of the forward array or the rearward array coupled to a fan shaft having one or more fan bearings, each of the plurality of blades of the fan being rotatable about a pitch axis and extending from a fan hub; and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by:

$$\frac{N_{FB} \times D_{FT}}{L_{AXIAL} \times \left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

9. The aircraft of claim 8, wherein the fan actuation system includes a pressurized pneumatic chamber that is filled with a pressurized gas that biases the plurality of blades of the fan to a feather position.

10. The aircraft of claim 8, wherein the fan actuation system includes one or more counterweights for reducing inertial loading associated with rotation of the plurality of blades of the fan.

11. The aircraft of claim 8, wherein the unducted fan propulsor has a longitudinal centerline axis and includes a core inlet that is annular about the longitudinal centerline axis.

12. The aircraft of claim 8, wherein the fan actuation system includes a hydraulic system that supplies hydraulic fluid for rotating the plurality of blades of the fan about the pitch axis.

13. The aircraft of claim 8, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

14. The aircraft of claim 8, wherein the fan actuation system has a fan actuation system axial length ($A_{FAS}$) defined from an axially forward-most surface of the fan actuation system to the pitch axis of the plurality of blades, $A_{FAS}$ being a maximum of 80% $A_{FH}$.

15. An aircraft comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065<RL/D<1.98$ and θ is between 187° and 340°; and wherein RL/D and θ of the P of the unducted fan propulsor adhere to the following expressions:

$$\frac{RL}{D} + \frac{\left(\sqrt{\begin{array}{l}1.4161*[1.88978*\sin^2(\theta)-0.0875*\\ \cos^2(\theta)+0.477*\sin(\theta)*\cos(\theta)]\end{array}} + 1.764*\sin(\theta)+0.19146*\cos(\theta)\right)}{1.96*\sin^2(\theta)+0.7225*\cos^2(\theta)} > 0$$

and $$\frac{RL}{D} + \frac{\left(-\sqrt{\begin{array}{l}1.4161*[1.88978*\sin^2(\theta)-0.0875*\\ \cos^2(\theta)+0.477*\sin(\theta)*\cos(\theta)]\end{array}} + 1.764*\sin(\theta)+0.19146*\cos(\theta)\right)}{1.96*\sin^2(\theta)+0.7225*\cos^2(\theta)} < 0$$

wherein the unducted fan propulsor includes:

a fan having the plurality of blades of the forward array or the rearward array coupled to a fan shaft having one or more fan bearings, each of the plurality of blades of the fan being rotatable about a pitch axis and extending from a fan hub; and a fan actuation system disposed within the fan hub for rotating the plurality of blades about the pitch axis and having one or more radial thrust bearings, wherein the fan actuation system is characterized by a fan actuation system length envelope in a range of 8.5 to 24, the fan actuation system length envelope being given by:

$$\frac{N_{FB} \times D_{FT}}{L_{AXIAL} \times \left(\frac{R_{TB}}{N_{FB}}\right)}$$

wherein $N_{FB}$ is a number of the plurality of blades of the fan, $D_{FT}$ is a fan tip diameter of the plurality of blades, $R_{TB}$ is a thrust bearing radius of the one or more radial thrust bearings, and $L_{AXIAL}$ is an axial length from a fan hub tip of the fan hub to the one or more fan bearings.

16. The aircraft of claim 15, wherein the fan actuation system includes a pressurized pneumatic chamber that is filled with a pressurized gas that biases the plurality of blades of the fan to a feather position.

17. The aircraft of claim 15, wherein the fan actuation system includes one or more counterweights for reducing inertial loading associated with rotation of the plurality of blades of the fan.

18. The aircraft of claim 15, wherein the unducted fan propulsor has a longitudinal centerline axis and includes a core inlet that is annular about the longitudinal centerline axis.

19. The aircraft of claim 15, wherein the fan actuation system includes a hydraulic system that supplies hydraulic fluid for rotating the plurality of blades of the fan about the pitch axis.

20. The aircraft of claim 15, wherein $N_{FB}$ is in a range of ten to sixteen, $D_{FT}$ is in a range of 120.0 inches to 192.0 inches, $R_{TB}$ is in a range of 10 inches to 27 inches, $L_{AXIAL}$ is given by $A_{FH}+A_{FB}$, $A_{FH}$ being a fan hub axial length from the fan hub tip to the pitch axis of the plurality of blades and $A_{FB}$ being a fan bearing axial length from the pitch axis of the plurality of blades to the one or more fan bearings, $A_{FH}$ is in a range of 25 inches to 85 inches, and $A_{FB}$ is in a range of 10 inches to 23 inches.

* * * * *